(12) United States Patent
Hutson

(10) Patent No.: US 9,688,400 B2
(45) Date of Patent: Jun. 27, 2017

(54) UNMANNED AERIAL VEHICLE

(71) Applicant: QUALCOMM Incorporated, San Diego, CA (US)

(72) Inventor: Donald Bolden Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/526,790

(22) Filed: Oct. 29, 2014

(65) Prior Publication Data

US 2016/0122015 A1    May 5, 2016

(51) Int. Cl.
| | |
|---|---|
| *B64C 37/00* | (2006.01) |
| *B64C 39/02* | (2006.01) |
| *B60F 5/02* | (2006.01) |
| *F41H 11/12* | (2011.01) |
| *F41H 11/28* | (2011.01) |

(52) U.S. Cl.
CPC .............. *B64C 39/024* (2013.01); *B60F 5/02* (2013.01); *B64C 2201/024* (2013.01); *B64C 2201/108* (2013.01); *B64C 2201/126* (2013.01); *B64C 2201/162* (2013.01); *F41H 11/12* (2013.01); *F41H 11/28* (2013.01)

(58) Field of Classification Search
CPC ....... B64C 25/405; B64C 25/50; B64C 25/34; B64C 37/00; B64C 2201/00; B64C 39/024; B64D 2205/00; B60Y 2200/80
USPC .............. 244/2, 23 B, 101, 12.3, 50, 21, 62; 446/34, 36
See application file for complete search history.

(56) References Cited

U.S. PATENT DOCUMENTS

| | | |
|---|---|---|
| 2,394,472 A | 2/1946 | Pecker |
| 3,028,130 A | 4/1962 | Burton |
| 3,053,480 A | 9/1962 | Vanderlip |
| 3,605,935 A | 9/1971 | Richard |
| 5,868,357 A | 2/1999 | Gabriel |
| 6,588,701 B2 | 7/2003 | Yavnai |
| 6,626,398 B1 | 9/2003 | Cox et al. |
| 7,497,759 B1 * | 3/2009 | Davis ..................... A63H 27/12 244/23 C |
| 7,959,104 B2 | 6/2011 | Kuntz |

(Continued)

FOREIGN PATENT DOCUMENTS

| | | | | |
|---|---|---|---|---|
| FR | WO 2011131733 A2 * | 10/2011 | ........... | B64C 39/024 |
| FR | 2974760 A1 * | 11/2012 | ............... | B60F 5/02 |

(Continued)

OTHER PUBLICATIONS printout from website http://newstechonline.com/b-unstoppable-the-first-tankcopter-drone-could-be-your.html dated Dec. 19, 2015 Article titled: B-Unstoppable: the first tankcopter drone could be your News tech online.*

(Continued)

*Primary Examiner* — Benjamin P Lee
(74) *Attorney, Agent, or Firm* — Foley & Lardner LLP

(57) ABSTRACT

Unmanned aerial vehicles and methods for providing the same are disclosed. The unmanned aerial vehicles may have various configurations related to a support frame. The unmanned aerial vehicles may have various configurations with a continuous track for ground propulsion. The unmanned aerial vehicles may have various configurations related to payload clamps.

29 Claims, 66 Drawing Sheets

(56) References Cited

U.S. PATENT DOCUMENTS

| | | | |
|---|---|---|---|
| 8,167,234 B1* | 5/2012 | Moore | B64C 37/00 244/17.23 |
| 8,205,820 B2 | 6/2012 | Goossen et al. | |
| 8,322,648 B2 | 12/2012 | Kroetsch et al. | |
| 8,453,962 B2 | 6/2013 | Shaw | |
| 8,464,816 B2* | 6/2013 | Carrier | B62D 53/005 180/24.07 |
| 8,794,564 B2 | 8/2014 | Hutson | |
| 8,794,566 B2 | 8/2014 | Hutson | |
| 8,876,057 B2 | 11/2014 | Alber et al. | |
| 9,061,558 B2* | 6/2015 | Kalantari | A63H 27/12 |
| 9,145,207 B2* | 9/2015 | Moschetta | B64C 25/36 |
| 2003/0066932 A1 | 4/2003 | Carroll | |
| 2006/0113425 A1 | 6/2006 | Rader | |
| 2007/0012817 A1* | 1/2007 | Parmley | B60F 5/00 244/2 |
| 2009/0014583 A1 | 1/2009 | Shelton | |
| 2010/0108801 A1* | 5/2010 | Olm | B64C 1/30 244/17.23 |
| 2010/0193626 A1* | 8/2010 | Goossen | B64C 37/00 244/2 |
| 2010/0326311 A1 | 12/2010 | Simon | |
| 2011/0226892 A1* | 9/2011 | Crowther | B64C 1/30 244/17.23 |
| 2011/0315806 A1* | 12/2011 | Piasecki | G05D 1/102 244/2 |
| 2012/0056041 A1* | 3/2012 | Rhee | B64C 25/32 244/4 R |
| 2013/0068876 A1* | 3/2013 | Radu | B60F 5/02 244/2 |
| 2013/0206915 A1* | 8/2013 | Desaulniers | B64C 39/024 244/165 |
| 2013/0214089 A1 | 8/2013 | Cox et al. | |
| 2014/0061362 A1 | 3/2014 | Olm et al. | |
| 2014/0061376 A1 | 3/2014 | Fisher et al. | |
| 2014/0131510 A1 | 5/2014 | Wang et al. | |
| 2014/0217230 A1 | 8/2014 | Helou, Jr. | |
| 2014/0263823 A1* | 9/2014 | Wang | B64C 39/028 244/17.23 |
| 2014/0332620 A1* | 11/2014 | Earon | B64C 39/024 244/13 |
| 2015/0093956 A1 | 4/2015 | Mielniczek | |
| 2015/0175276 A1 | 6/2015 | Koster | |
| 2015/0203184 A1* | 7/2015 | Sarmiento | B64B 1/24 244/30 |
| 2015/0217613 A1* | 8/2015 | Piasecki | G05D 1/102 701/2 |
| 2015/0274000 A1* | 10/2015 | Meager | B60K 7/00 440/12.66 |
| 2016/0121673 A1 | 5/2016 | Hutson | |
| 2016/0130000 A1 | 5/2016 | Rimanelli | |
| 2016/0229534 A1 | 8/2016 | Hutson | |

FOREIGN PATENT DOCUMENTS

| | | |
|---|---|---|
| WO | 2008085547 A2 | 7/2008 |
| WO | 2011149544 A1 | 12/2011 |
| WO | WO-2012080737 A2 | 6/2012 |
| WO | WO-2013182708 A1 | 12/2013 |
| WO | 2015187259 A1 | 12/2015 |

OTHER PUBLICATIONS

International Search Report and Written Opinion—PCT/US2015/052745—ISA/EPO—Dec. 17, 2015.

Frazer B., et al., "Dronenet," Senior Design 1 Fall 2013, Group 7, Duke Energy, 2013, pp. 1-144.

Mellinger D., et al., "Design, Modeling, Estimation and Control for Aerial Grasping and Manipulation," 2011 IEEE/RSJ International Conference on Intelligent Robots and Systems, 2011, pp. 2668-2673.

Van Hoosear C.A., "Surface Hardness Classification via Unmanned Aerial Vehicles Gripper Finger Deflection," 2013, pp. 1-89.

* cited by examiner

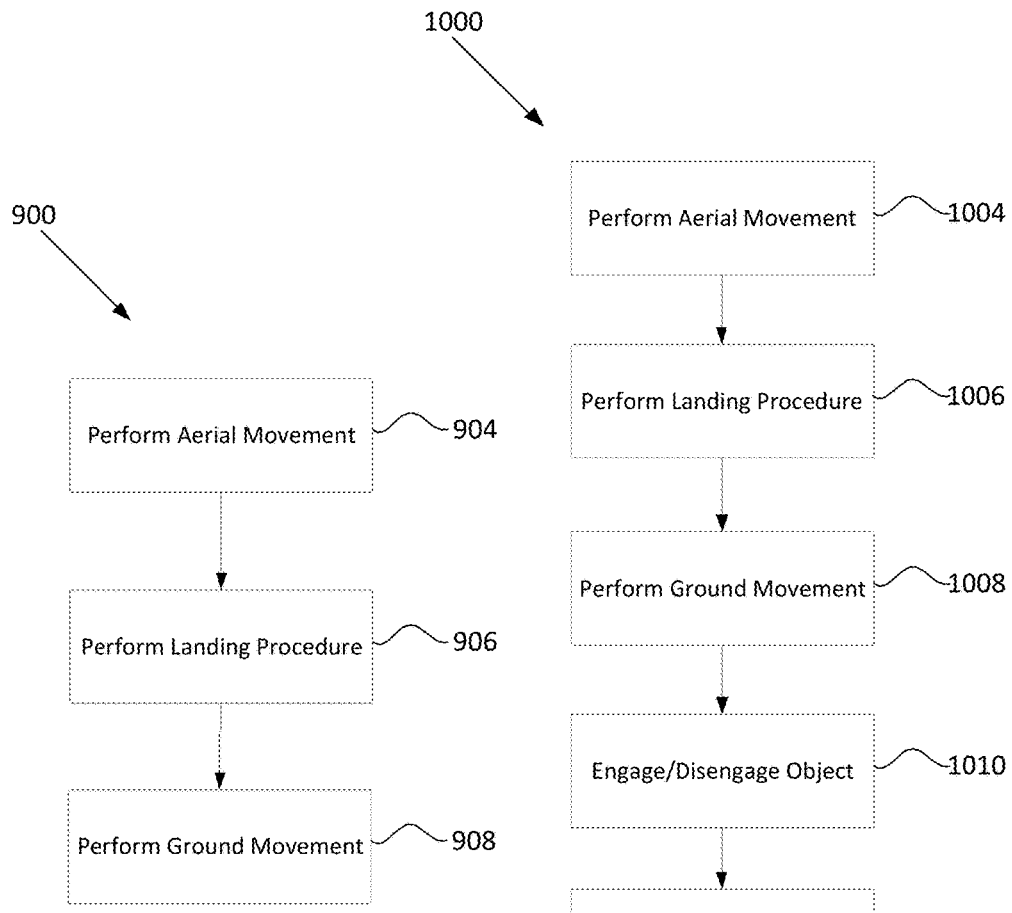

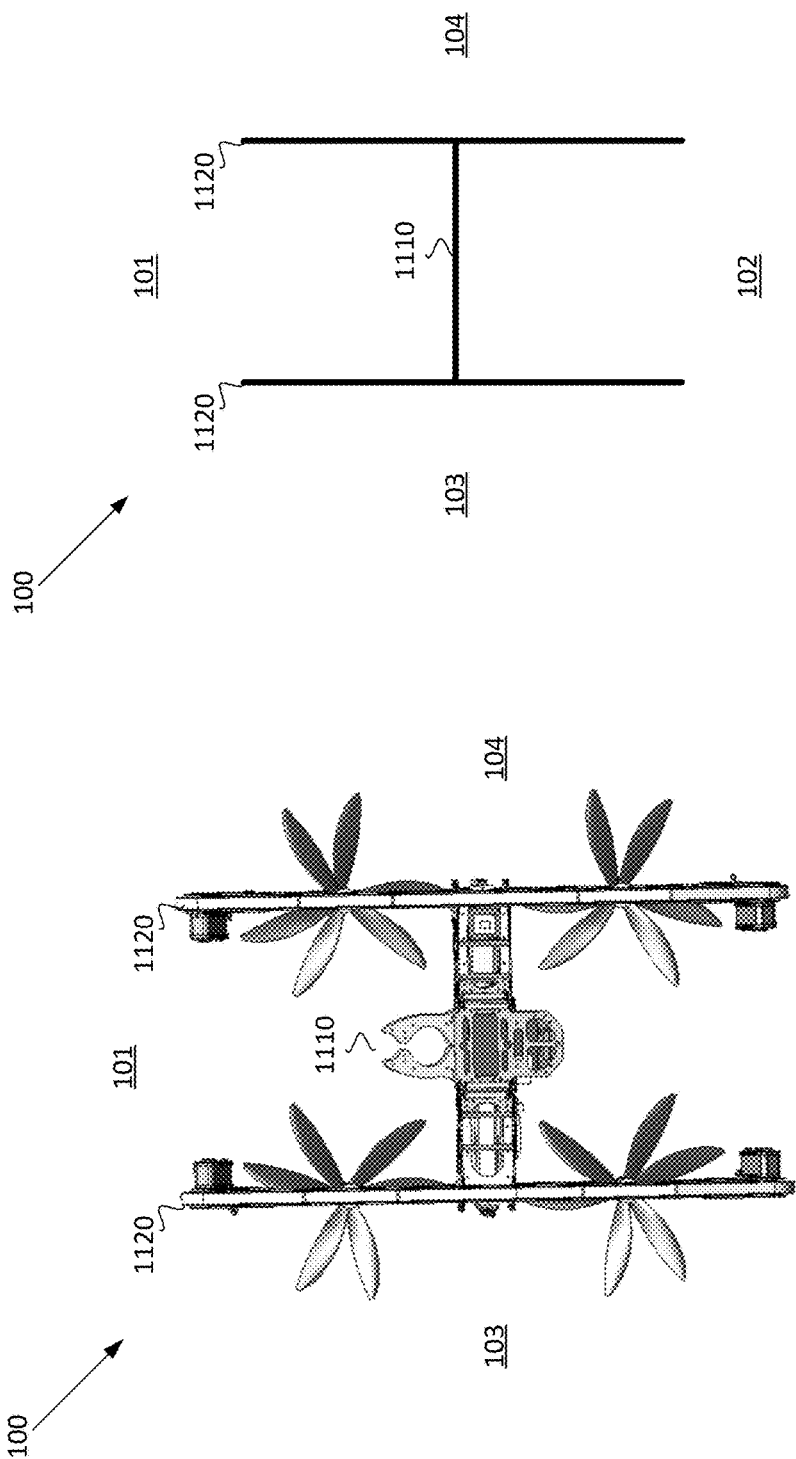

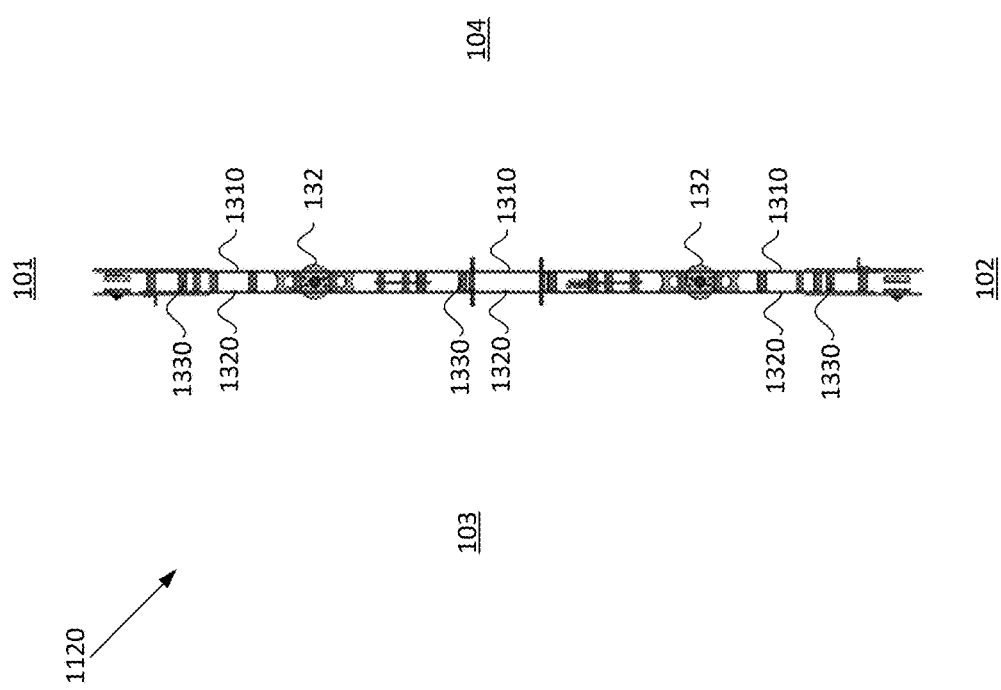

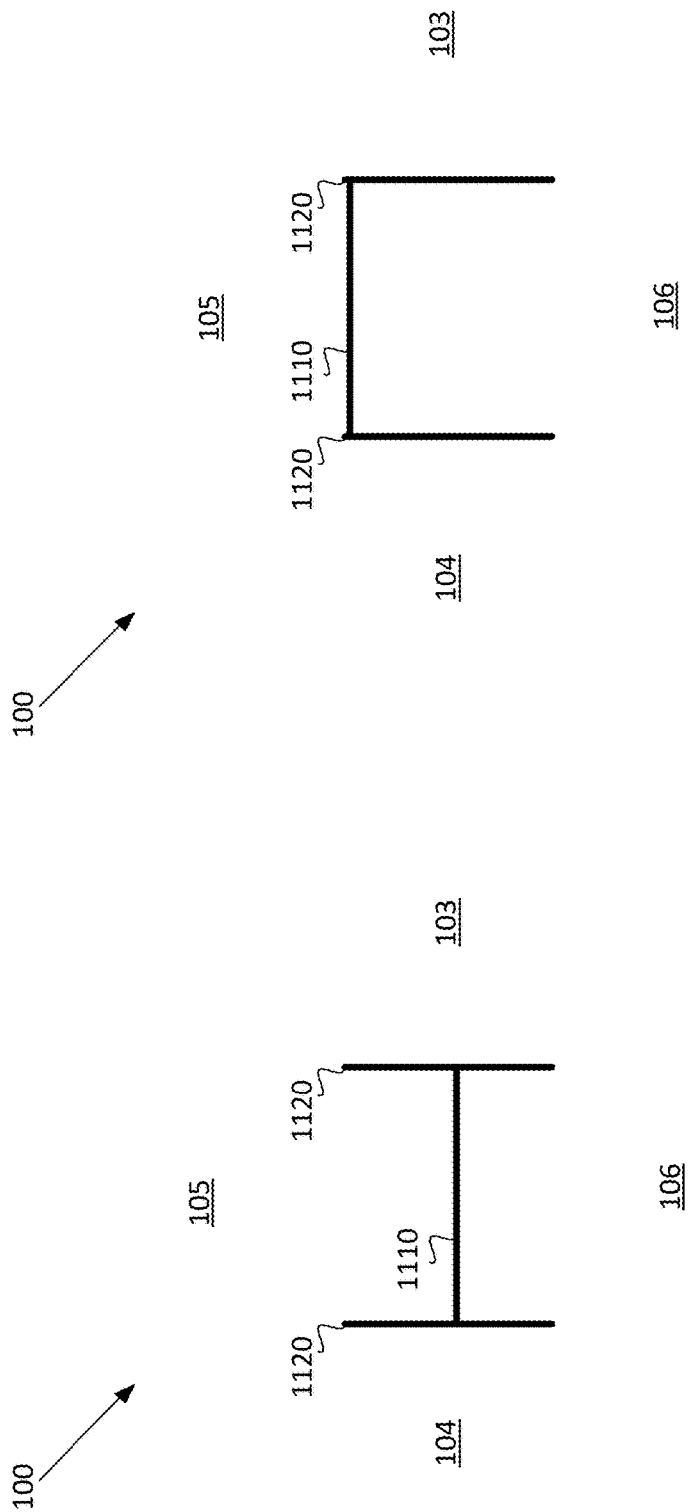

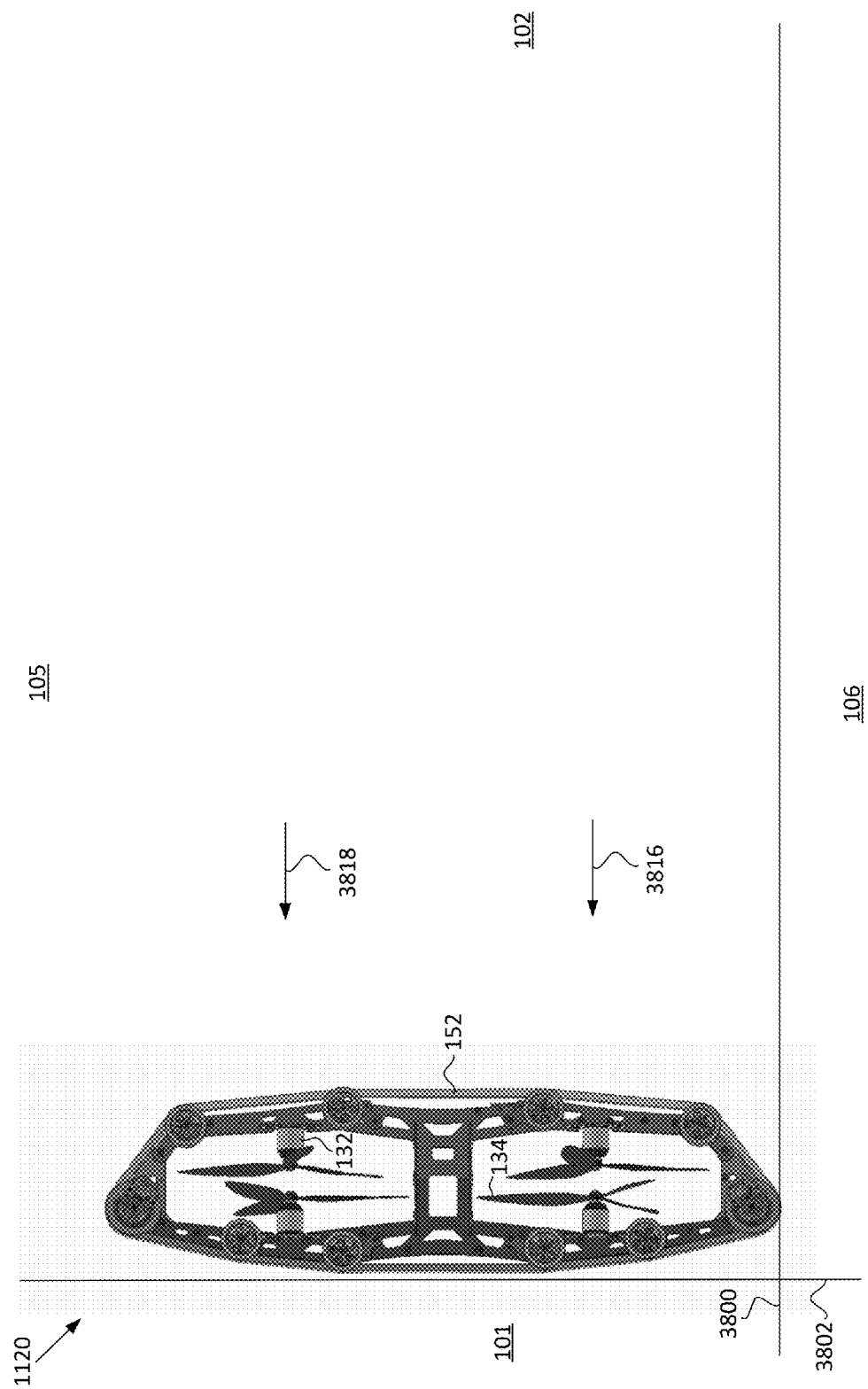

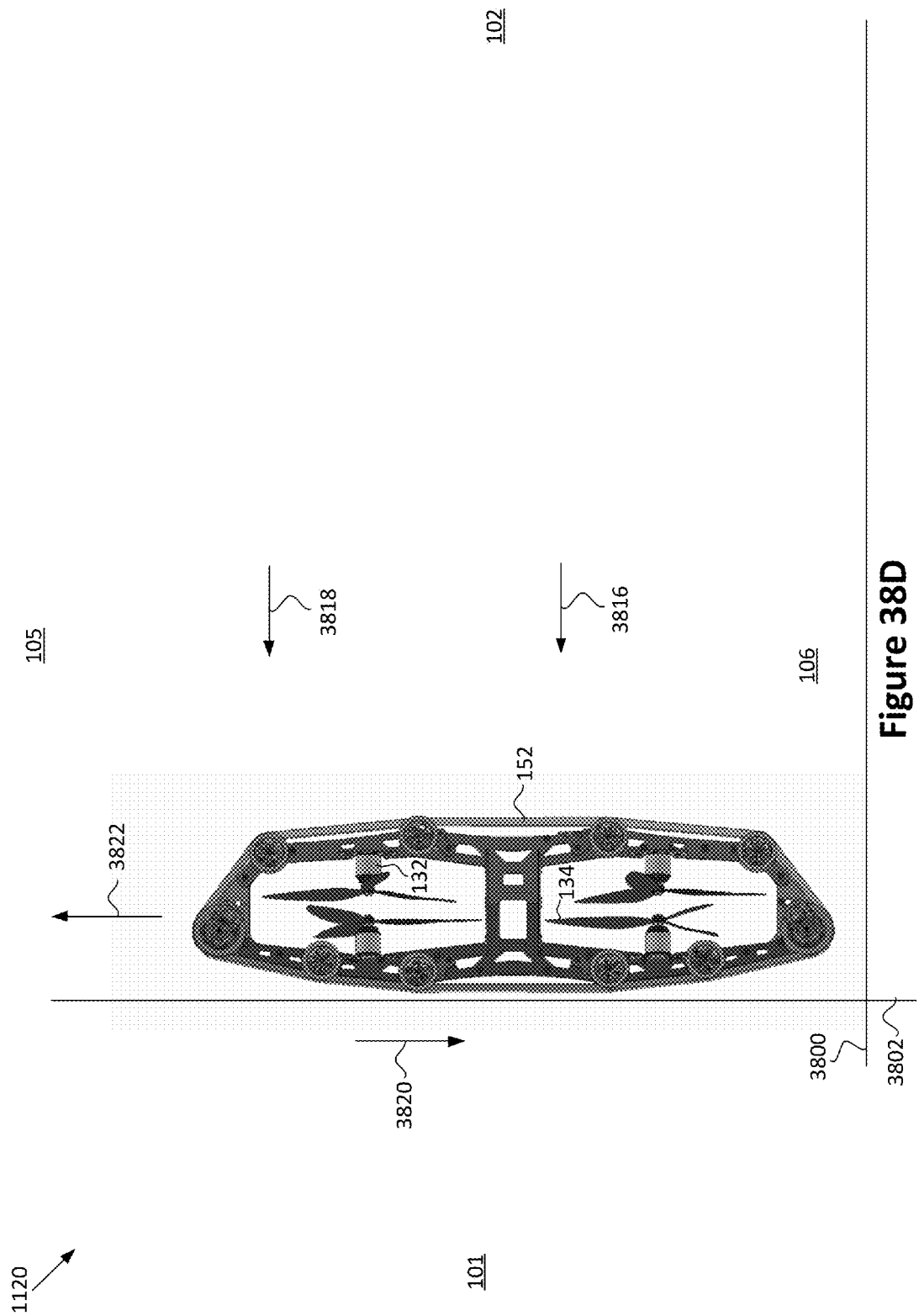

UNMANNED AERIAL VEHICLE

BACKGROUND

Field

Subject matter described herein relates generally to unmanned aerial vehicles, and more particularly to unmanned aerial vehicles with various configurations related to a support frame, a continuous track for ground propulsion, and various configurations related to payload clamps.

Background

A variety of unmanned aerial vehicles have been developed, including RC planes for the hobby culture and more advanced military "drones" or unmanned aerial vehicles ("UAVs"). Recent years have seen the proliferation of drones for commercial and hobby purposes, exemplified by the common "quadcopter" design of a four-rotor drone.

SUMMARY

Embodiments relate to unmanned aerial vehicles.

According to an embodiment, an unmanned aerial vehicle is provided. The unmanned aerial vehicle includes a frame portion. The frame portion includes a first assembly, a second assembly, and a third assembly. The unmanned aerial vehicle includes one or more air propulsion devices configured to propel the frame portion through the air. The unmanned aerial vehicle includes one or more ground propulsion devices configured to propel the frame portion along the ground. The third assembly is disposed between and coupled to the first assembly and the second assembly. At least one of the one or more air propulsion devices is coupled to the first assembly. At least one of the one or more air propulsion devices is coupled to the second assembly.

In some embodiments, the third assembly is perpendicular to the first assembly and the second assembly, and the first assembly and the second assembly are substantially parallel to one another.

In some embodiments, at least one of the one or more ground propulsion devices is coupled to the first assembly. In such embodiments, at least one of the one or more ground propulsion devices is coupled to the second assembly.

In some embodiments, the first assembly is formed in at least one annular shape on at least a first plane. In such embodiments, the second assembly is formed in at least one annular shape on at least a first plane.

In some embodiments, at least one of the one or more air propulsion devices is disposed in an opening of the at least one annular shape of the first assembly. In such embodiments, at least one of the one or more air propulsion devices is disposed in an opening of the at least one annular shape of the first assembly.

In some embodiments, the at least one of the one or more ground propulsion devices coupled to the first assembly comprises a continuous track disposed around the at least one annular shape of the first assembly. In such embodiments, the at least one of the one or more ground propulsion devices coupled to the second assembly comprises a continuous track disposed around the at least one annular shape of the second assembly.

In some embodiments, the first assembly is formed in at least a second annular shape on at least the first plane. In such embodiments, the second assembly is formed in at least a second annular shape on at least the first plane.

In some embodiments, at least one of the one or more air propulsion devices is disposed in an opening of the at least a second annular shape of the first assembly. In such embodiments, at least one of the one or more air propulsion devices is disposed in an opening of the at least a second annular shape of the first assembly.

In some embodiments, the first assembly is formed in an annular shape on at least a first plane. In such embodiments, the second assembly is formed in an annular shape on at least the first plane.

In some embodiments, one or more of the annular shape of the first assembly and the annular shape of the second assembly is configured to receive a battery inserted through an opening of the respective annular shape of the first assembly and the annular shape of the second assembly.

In some embodiments, the first assembly is attachable to and detachable from the third assembly. In such embodiments, the second assembly is attachable to and detachable from the third assembly.

In some embodiments, the first assembly is detachable from the third assembly with a mechanical force.

In some embodiments, the mechanical force is applied to detach the first assembly from the third assembly based on a determination by a controller provided as part of the first assembly.

In some embodiments, the mechanical force is applied to detach the first assembly from the third assembly based on a determination that is not made by a human operator.

In some embodiments, the first assembly is configured to perform aerial flight independently of the third assembly after detaching from the third assembly.

In some embodiments, the first assembly is formed as a double wall structure. In such embodiments, the second assembly is formed as a double wall structure. In such embodiments, the first assembly supports wheels of at least one of the one or more ground propulsion devices between two walls of the double wall structure of the first assembly. In such embodiments, the second assembly supports wheels of at least one of the one or more ground propulsion devices between two walls of the double wall structure of the second assembly.

In some embodiments, component pieces of the frame assembly are cut from one or more sheets of a rigid source material.

In some embodiments, the component pieces of the frame assembly are cut from a single sheet of the rigid source material.

In some embodiments, the rigid source material is printed circuit board.

In some embodiments, one or more of the component pieces of the frame assembly include conductive tracks printed on the pieces. In such embodiments, the conductive tracks provide an electrical connection between at least one of the one or more air propulsion devices and a controller provided as part of the unmanned aerial vehicle.

In some embodiments, the at least one of the one or more ground propulsion devices coupled to the first assembly comprises a continuous track disposed around the first assembly. In such embodiments, the at least one of the one or more ground propulsion devices coupled to the second assembly comprises a continuous track disposed around the second assembly.

According to an embodiment, a method of manufacturing an unmanned aerial vehicle is provided. The method includes providing a frame portion. The frame portion includes a first assembly, a second assembly, and a third assembly. The method further includes providing one or more air propulsion devices configured to propel the frame portion through the air. The method further includes providing one or more ground propulsion devices configured to propel the frame portion along the ground. The third assembly is disposed between and coupled to the first assembly and the second assembly. At least one of the one or more air propulsion devices is coupled to the first assembly. At least one of the one or more air propulsion devices is coupled to the second assembly.

In some embodiments, at least one of the one or more ground propulsion devices is coupled to the first assembly. In such embodiments, at least one of the one or more ground propulsion devices is coupled to the second assembly.

In some embodiments, the first assembly is formed in at least one annular shape on at least a first plane. In such embodiments, the second assembly is formed in at least one annular shape on at least a first plane.

In some embodiments, at least one of the one or more air propulsion devices is disposed in an opening of the at least a second annular shape of the first assembly. In such embodiments, at least one of the one or more air propulsion devices is disposed in an opening of the at least a second annular shape of the first assembly.

In some embodiments, the at least one of the one or more ground propulsion devices coupled to the first assembly comprises a continuous track disposed around the first assembly. In such embodiments, the at least one of the one or more ground propulsion devices coupled to the second assembly comprises a continuous track disposed around the second assembly.

According to an embodiment, an unmanned aerial vehicle is provided. The unmanned aerial vehicle includes frame means which includes a first assembly, a second assembly, and a third assembly. The unmanned aerial vehicle further includes air propulsion means for propelling the frame means through the air. The unmanned aerial vehicle further includes ground propulsion means for propelling the frame means along the ground. The third assembly is disposed between and coupled to the first assembly and the second assembly. At least one of the air propulsion means is coupled to the first assembly. At least one of the air propulsion means is coupled to the second assembly.

BRIEF DESCRIPTION OF THE DRAWINGS

FIG. 9 shows a flow diagram of a process for operating an unmanned aerial vehicle according to some embodiments.

FIG. 10 shows a flow diagram of a process for operating an unmanned aerial vehicle according to some embodiments.

FIG. 12A shows a top view of an unmanned aerial vehicle according to some embodiments.

FIG. 12B shows a conceptual diagram from a top view of an unmanned aerial vehicle according to some embodiments.

FIG. 15A shows a top view of a side assembly according to some embodiments.

FIG. 16B shows a conceptual diagram from a front view of an unmanned aerial vehicle according to some embodiments.

FIG. 16C shows a conceptual diagram from a front view of an unmanned aerial vehicle according to some embodiments.

FIG. 38C shows a left view of a side assembly according to some embodiments.

FIG. 38D shows a left view of a side assembly according to some embodiments.

DETAILED DESCRIPTION

Embodiments relate to apparatuses, systems, and methods for unmanned aerial vehicles. In particular, embodiments are related to unmanned aerial vehicles with various configurations related to a support frame, a continuous track for ground propulsion, and various configurations related to payload clamps.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

The embodiments described herein provide various benefits over conventional unmanned aerial vehicles. Some embodiments described herein may provide an unmanned aerial vehicle with greater maneuverability than conventional unmanned aerial vehicles. Some embodiments described herein may provide an unmanned aerial vehicle with greater modularity of its component parts than conventional unmanned aerial vehicles. Some embodiments described herein may provide an unmanned aerial vehicle with better payload hauling capabilities than conventional unmanned aerial vehicles. Based on these and other benefits, embodiments described herein may provide unmanned aerial vehicles that both better perform existing functions of unmanned aerial vehicles and allow new uses of unmanned aerial vehicles.

Figure 1:
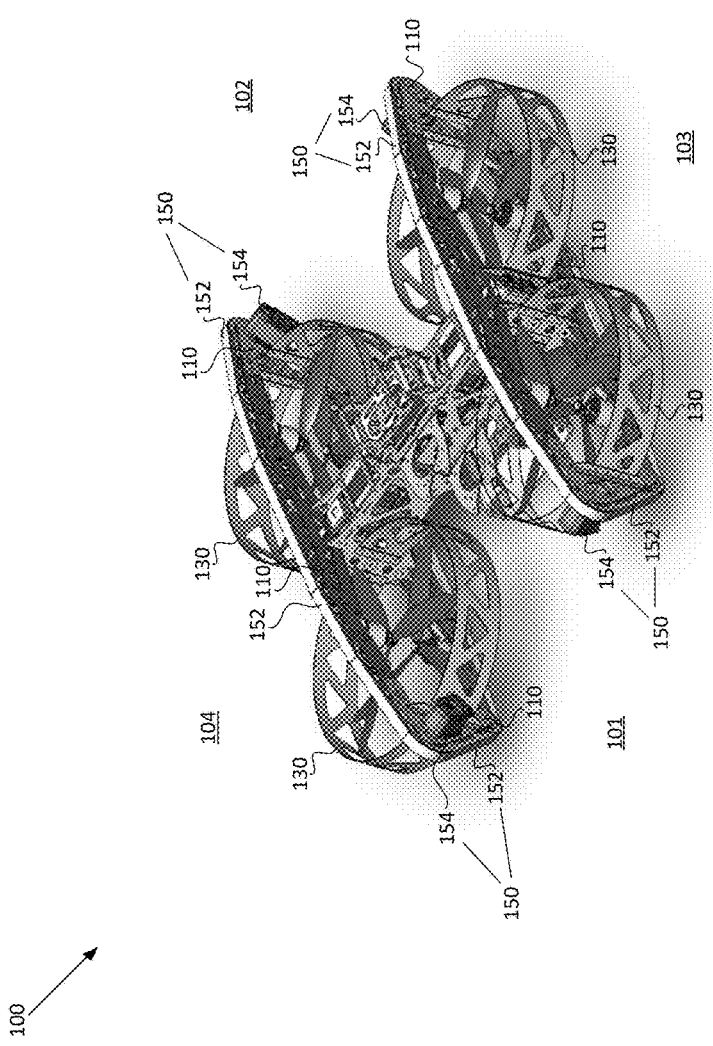
FIG. 1 shows a perspective view of an unmanned aerial vehicle according to some embodiments.

FIG. 1 shows a perspective view of an unmanned aerial vehicle 100 according to some embodiments. The unmanned aerial vehicle 100 is shown with respect to various reference directions. A front direction 101, rear direction 102, a left direction 103, and a right direction 104 are shown. Top and bottom directions are not shown for the sake of clarity but will be identified in other figures.

The unmanned aerial vehicle 100 may have a frame or frame portion 110. The phrases "frame" and "frame portion" are used synonymously in the present description. The frame 110 is identified at various parts of the unmanned aerial vehicle 100. However, many parts of the frame 110 are not so identified. The frame 110 may be a substantially fixed structure on which other elements of the unmanned aerial vehicle 100 may be mounted.

The unmanned aerial vehicle 100 may have one or more aerial propulsion devices 130. The aerial propulsion devices 130 are illustrated as propeller assemblies in the figure. The aerial propulsion devices 130 may each include a pair of rotor/propeller assemblies facing one another as well as a propeller guard. Each of these elements will be illustrated in greater detail in other figures. The unmanned aerial vehicle 100 may have four pairs of rotor/propeller assemblies. Aerial propulsion devices of types different than those shown may be used in other embodiments.

The unmanned aerial vehicle 100 may have ground propulsion devices 150 made up of continuous tracks 152 and continuous track motors 154. The unmanned aerial vehicle 100 may have two continuous tracks 152 and four continuous track motors 154. Each continuous track 152 may be a substantially flexible annular shaped object that wraps around the frame 110 of the unmanned aerial vehicle 100. Each continuous track 152 may be driven by one or more continuous track motors 154. The ground propulsion device 150 made up of a continuous track 152 with one or more continuous track motors 154 may be capable of moving the unmanned aerial vehicle 100 along a ground surface. In some situations, the continuous track 152 may be more commonly referred to as a "continuous tread," "tank tread," or "tank track." The phrase "continuous track" will be used in the present description for consistency. The front-most and rear-most surfaces of unmanned aerial vehicle 100 may be formed by the continuous tracks 152. In this way, the continuous tracks 152 may be the first parts of the unmanned aerial vehicle 100 to contact a surface either in front of or behind the unmanned aerial vehicle 100.

Figure 2:
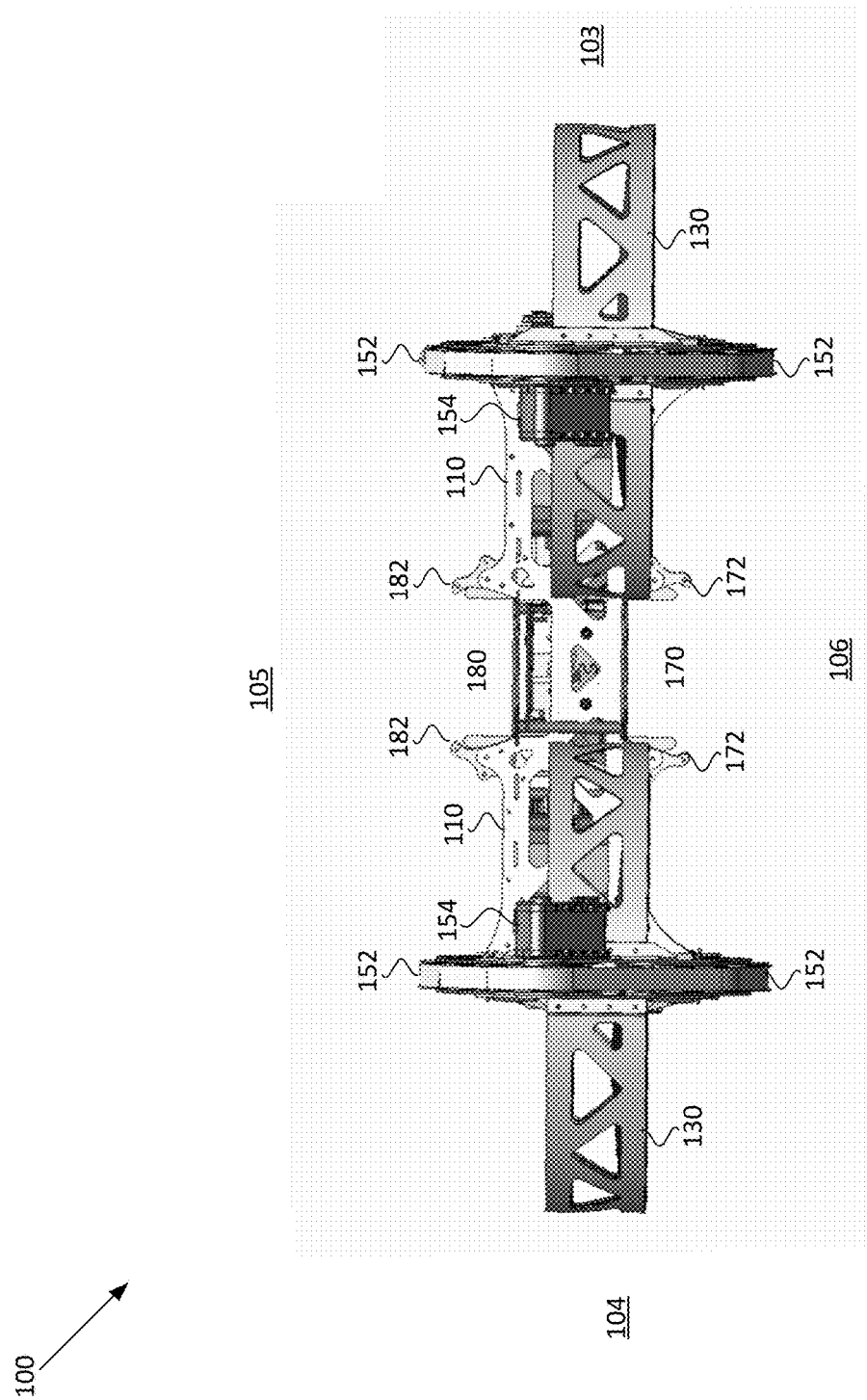
FIG. 2 shows a front view of an unmanned aerial vehicle according to some embodiments.
Figure 3:
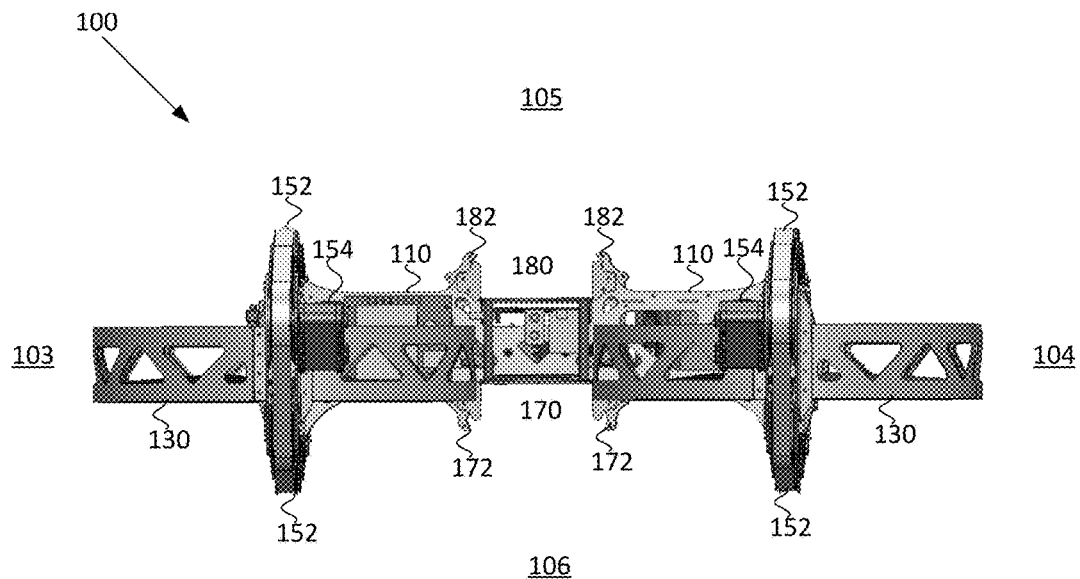
FIG. 3 shows a rear view of an unmanned aerial vehicle according to some embodiments.

FIG. 2 shows a front view of the unmanned aerial vehicle 100 according to some embodiments. FIG. 3 shows a rear view of the unmanned aerial vehicle 100 according to some embodiments. With reference to FIGS. 1-3, the unmanned aerial vehicle 100 is shown with respect to various reference directions. A top direction 105, a bottom direction 106, the left direction 103, and the right direction 104 are shown. The unmanned aerial vehicle 100 is shown having various features as previously identified (e.g., with respect to FIG. 1), including: the frame 110, the aerial propulsion devices 130, and the ground propulsion devices 150.

In addition, the unmanned aerial vehicle 100 may have first payload interface 170. The first payload interface 170 may be a portion of the unmanned aerial vehicle 100 provided towards the bottom direction 106. The first payload interface 170 may be designed engage with various payload objects. Engaging with payload objects may include gripping the payload objects in order to lift them up and carry them away. Engaging with payload objects may include releasing the payload objects in order to leave them where released. The first payload interface 170 may have various gripper fingers 172. The gripper fingers 172 may be individually articulating fingers driven by one or more motors in order to control engaging with payload objects. Payload interfaces of types different than those shown may be used in other embodiments.

In addition, the unmanned aerial vehicle 100 may have second payload interface 180 with gripper fingers 182. The second payload interface 180 may be provided in a similar manner as just described for the first payload interface 170, except that the second payload interface 180 is configured to engage payload objects positioned above the unmanned aerial vehicle 100. Payload interfaces of types different than those shown may be used in other embodiments.

Figure 4:
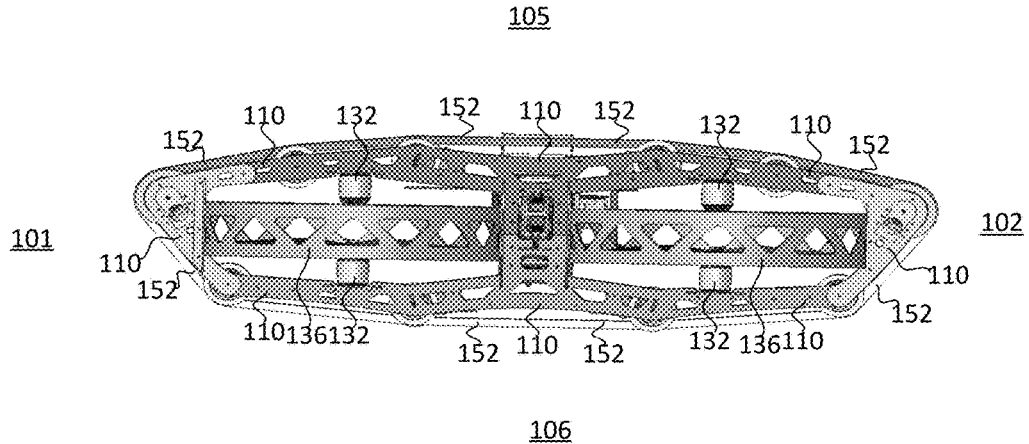
FIG. 4 shows a left view of an unmanned aerial vehicle according to some embodiments.
Figure 5:
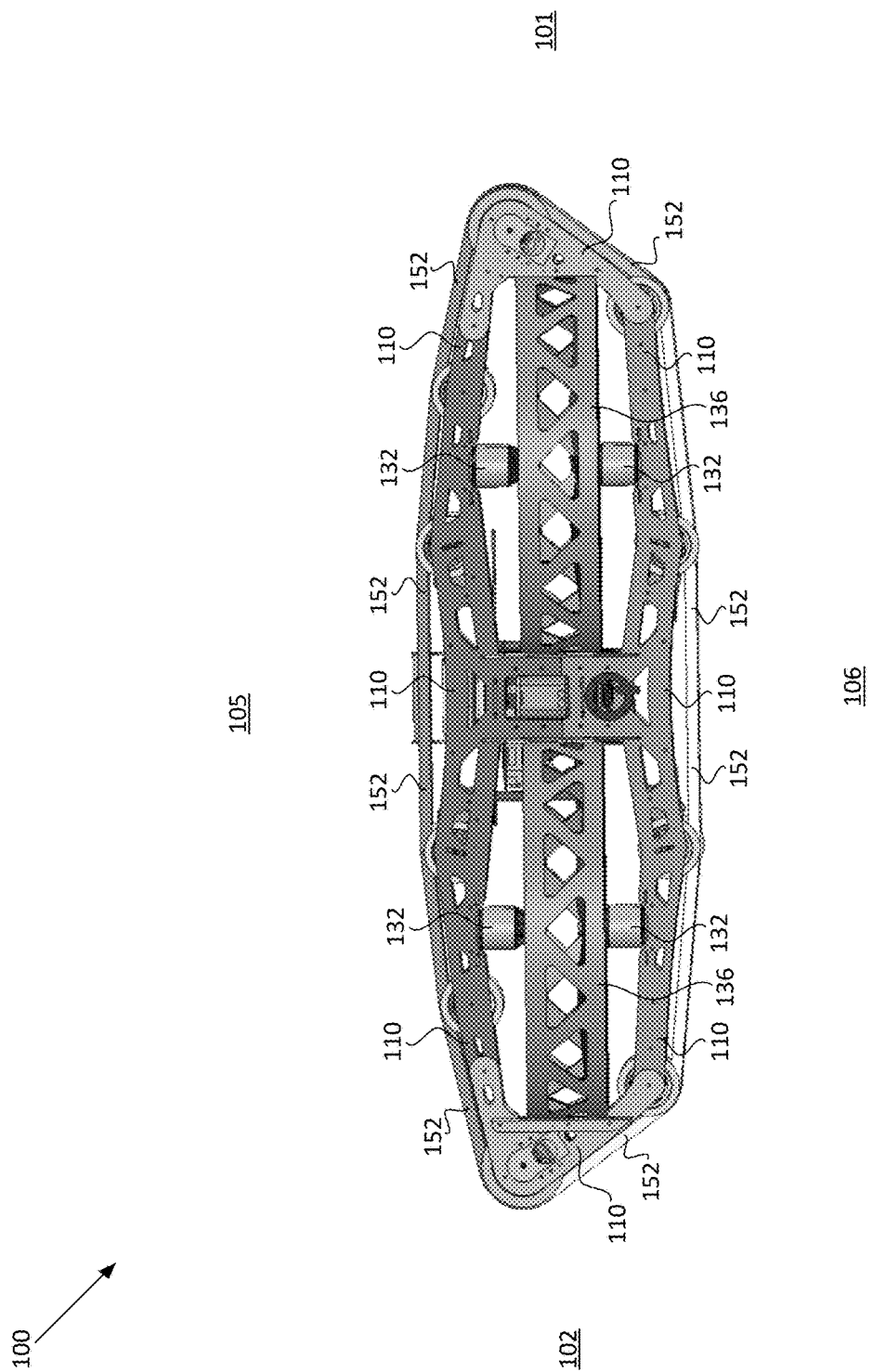
FIG. 5 shows a right view of an unmanned aerial vehicle according to some embodiments.

FIG. 4 shows a left view of the unmanned aerial vehicle 100 according to some embodiments. FIG. 5 shows a right view of the unmanned aerial vehicle 100 according to some embodiments. With reference to FIGS. 1-5, the unmanned aerial vehicle 100 may have rotor motors 132, included as part of aerial propulsion devices 130. Each rotor motor 132 may drive a set of propellers (e.g., 134 in FIGS. 6-7) in order to provide aerial propulsion to the unmanned aerial vehicle 100. The speed of revolution of the rotor motors 132 may be controlled by a central processor (e.g., 802 in FIG. 8) provided as part of the unmanned aerial vehicle 100. The central processor may use differences in rotational speeds of the various rotor motors 132 in order to control the motion of the unmanned aerial vehicle 100 in the air. Techniques similar to those used with quadcopters or the like may be used with the rotor motors 132 in order to control motion of the unmanned aerial vehicle 100 through the air. In some embodiments, each rotor motor 132 is provided facing another rotor motor 132. In this configuration, the rotor motor 132 may spin in an opposite direction as the rotor motor 132 that the rotor motor 132 faces, so as not to cancel the lifting forcing provided by the other motor rotor 132. Configuration of rotor motors different than that shown may be used in other embodiments.

In addition, the unmanned aerial vehicle 100 may have propeller guards 136. The propeller guards 136 may be a substantially rigid structure that prevents the propellers of the various aerial propulsion devices 130 from striking objects to one or more sides (e.g., the left direction and right direction) of the unmanned aerial vehicle 100. The propeller guards 136 may not be necessary for the functioning of the unmanned aerial vehicle 100. However, the propeller guards 136 may be desirable in order to prevent damage to the propellers or objects that may be struck by the propellers.

Figure 6:
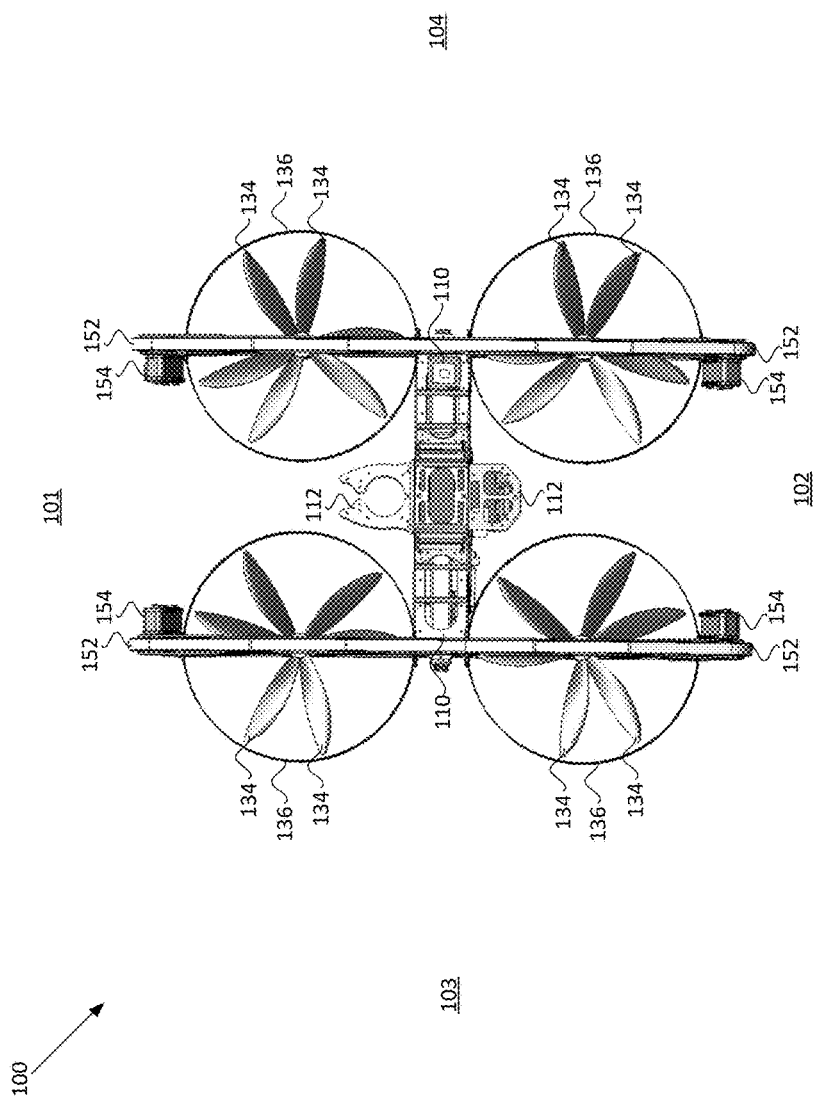
FIG. 6 shows a top view of an unmanned aerial vehicle according to some embodiments.
Figure 7:
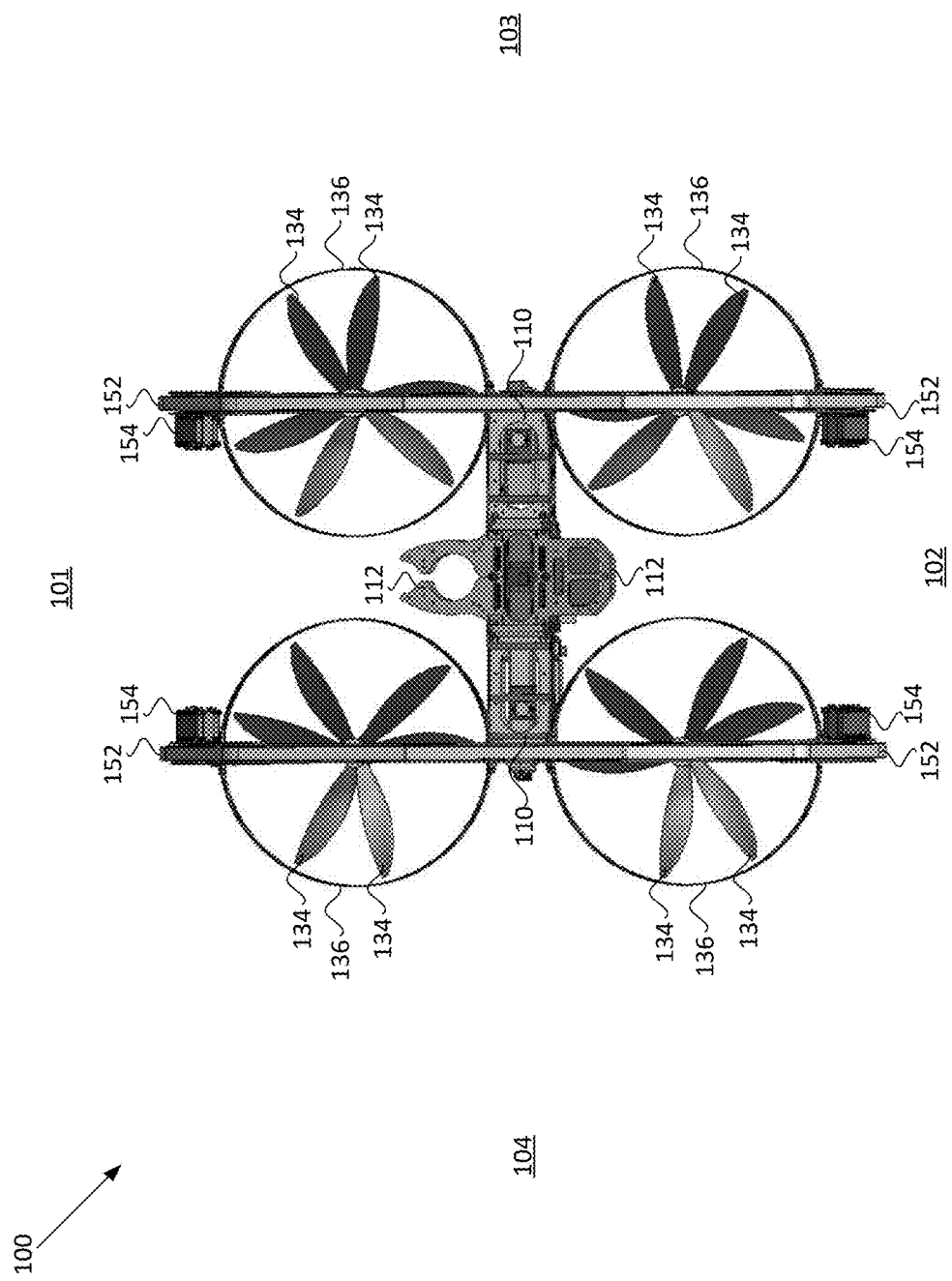
FIG. 7 shows a bottom view of an unmanned aerial vehicle according to some embodiments.

FIG. 6 shows a top view of the unmanned aerial vehicle 100 according to some embodiments. FIG. 7 shows a bottom view of the unmanned aerial vehicle 100 according to some embodiments. With reference to FIGS. 1-7, the unmanned aerial vehicle 100 may have propellers 134. The propellers 134 may be driven by rotors and accompanying rotor motors 132 as described. In some embodiments, a total of six propellers 134 are shown for each pair of rotor motors 132. As such, each rotor motor 132 drives three propellers 134. Configuration of propellers different than such may be used in other embodiments.

In addition, the unmanned aerial vehicle 100 is shown as having one or more frame fixtures 112. The frame fixtures 112 may be components of the frame 110. The frame fixtures 112 may be designed to allow the attachment of various components or devices (e.g., sensor devices) to the unmanned aerial vehicle 100. For example, a first frame fixture 112 provided towards the front direction 101 of the unmanned aerial vehicle 100 may allow the connection of a vision sensor, such as a camera, LIDAR, or other vision system. As another example, a second frame fixture 112 provided towards the rear direction 102 of the unmanned aerial vehicle 100 may allow the connection of an audio sensor, such as a microphone or other audio system. Configuration of frame fixtures and sensor attachment points other than that shown may be used in other embodiments.

Figure 8:
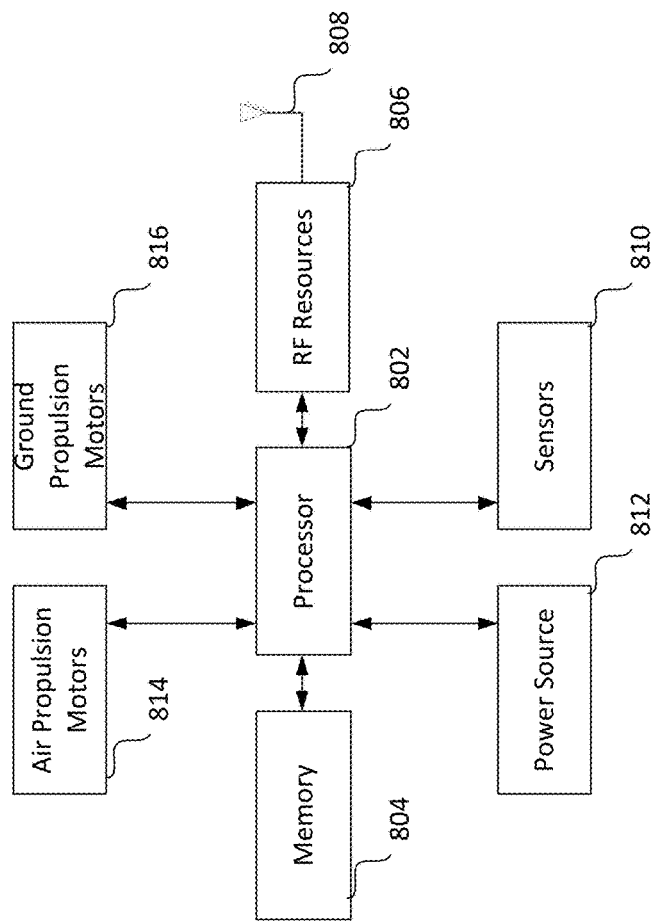
FIG. 8 shows a schematic diagram of various components of an unmanned aerial vehicle according to some embodiments.

FIG. 8 shows a schematic diagram of various components of the unmanned aerial vehicle 100 according to some embodiments. With reference to FIGS. 1-8, the unmanned aerial vehicle 100 is shown as having a processor 802 and a memory 804. The processor 802 and the memory 804 may be effective together to store and run software related to controlling the operation of the unmanned aerial vehicle 100. The processor 802 may process software related to controlling speed of rotation of air propulsion motors 814 (which may correspond to and/or be associated with the rotor motors 132 of the aerial propulsion devices 130) and ground propulsion motors 816 (which may correspond to and/or be associated with the continuous track motors 154 of the ground propulsion devices 150). The processor 802 may process software related to storing or processing data received from sensors 810. The processor 802 may process software related to performing wireless communications with another device using one or more RF resources 806 and antenna 808. The processor 802 along with other components of the unmanned aerial vehicle 100 may receive electrical power from power source 812 (e.g., one or more batteries).

FIG. 9 shows a flow diagram of a process 900 for operating unmanned aerial vehicle 100 according to some embodiments. The process 900 is described with reference to FIGS. 1-9.

At block 904, the unmanned aerial vehicle 100 performs aerial movement. The block 904 may involve the unmanned aerial vehicle 100 moving through the air based on propulsion from the aerial propulsion devices 130 as described.

At block 906, the unmanned aerial vehicle 100 performs a landing procedure. The block 906 may involve the unmanned aerial vehicle 100 landing on a ground surface. The unmanned aerial vehicle 100 may perform a landing procedure in order to transition from aerial movement to ground movement.

At block 908, the unmanned aerial vehicle 100 performs ground movement. The block 908 may involve the unmanned aerial vehicle 100 moving along a ground surface based on propulsion from ground propulsion devices (such as the ground propulsion device 150 with the continuous track 152 and the continuous track motor 154) as described.

FIG. 10 shows a flow diagram of a process 1000 for operating the unmanned aerial vehicle 100 according to some embodiments. The process 1000 is described with reference to FIGS. 1-10.

At block 1004, the unmanned aerial vehicle 100 performs aerial movement. The block 1004 may involve the unmanned aerial vehicle 100 moving through the air based on propulsion from the aerial propulsion devices 130 as described.

At block 1006, the unmanned aerial vehicle 100 performs a landing procedure. The block 1006 may involve the unmanned aerial vehicle 100 landing on a ground surface. The unmanned aerial vehicle 100 may perform a landing procedure in order to transition from aerial movement to ground movement.

At block 1008, the unmanned aerial vehicle 100 performs ground movement. The block 1008 may involve the unmanned aerial vehicle 100 moving along a ground surface based on propulsion from ground propulsion devices (such as the ground propulsion device 150 with the continuous track 152 and the continuous track motor 154) as described.

At block 1010, the unmanned aerial vehicle 100 engages/disengages an object. The block 1010 may involve the unmanned aerial vehicle 100 picking up a payload object for transport to another location. The block 1010 may involve the unmanned aerial vehicle 100 dropping off a payload object that the unmanned aerial vehicle 100 has transported to the current location of the unmanned aerial vehicle 100.

At block 1012, the unmanned aerial vehicle 100 performs a take-off procedure. The block 1012 may involve the unmanned aerial vehicle 100 taking off from a ground surface into the air.

At block 1014, the unmanned aerial vehicle 100 performs aerial movement. The block 1014 may involve the unmanned aerial vehicle 100 moving through the air based on propulsion from the aerial propulsion devices 130 as described. The block 1014 may be performed in order to transport a payload object to another location. The block 1014 may be performed in order to return from having transported a payload object to some location.

Figures 11A, 11B:
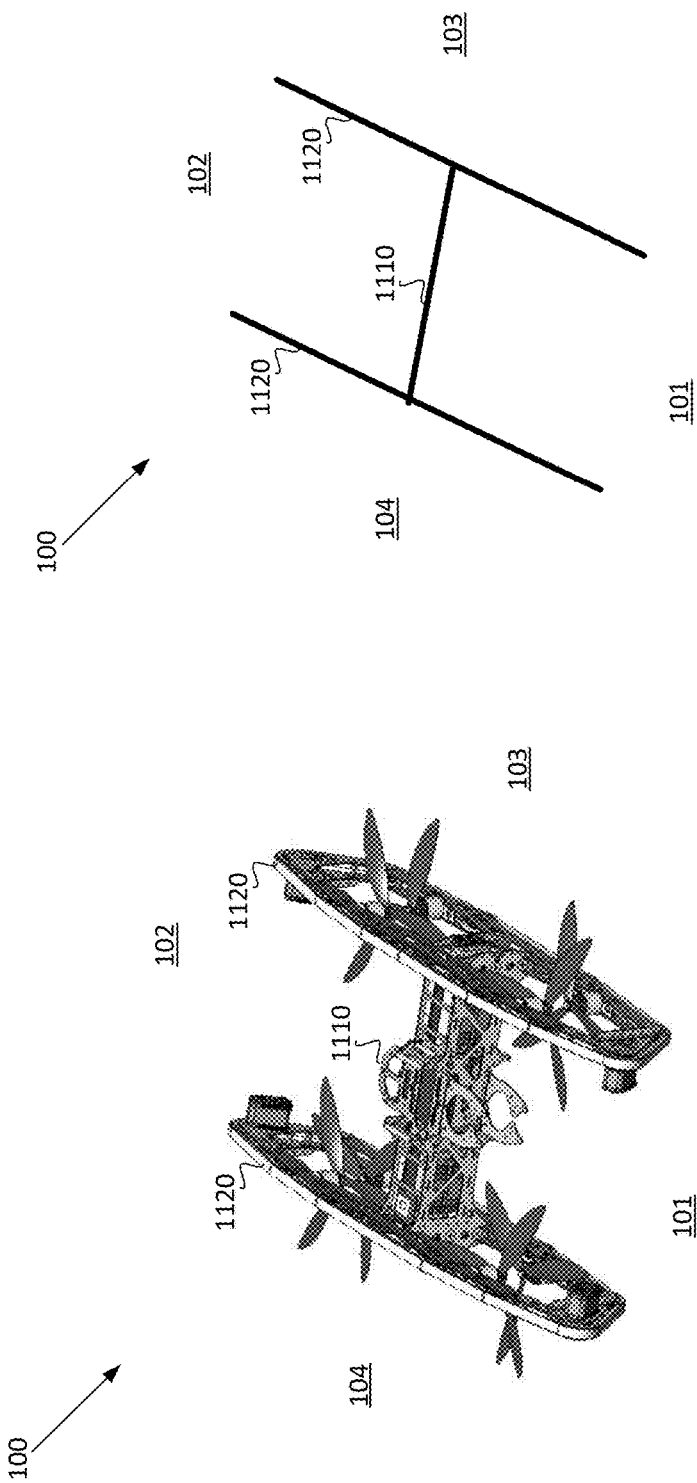
FIG. 11A shows a perspective view of an unmanned aerial vehicle according to some embodiments.
FIG. 11B shows a conceptual diagram from a perspective view of an unmanned aerial vehicle according to some embodiments.

FIG. 11A shows a perspective view of the unmanned aerial vehicle 100 according to some embodiments. FIG. 12A shows a top view of the unmanned aerial vehicle 100 according to some embodiments. With reference to FIGS. 1-12B, the unmanned aerial vehicle 100 may include a center assembly 1110 and two side assemblies 1120. The center assembly 1110 may be provided between the side assemblies 1120. In particular embodiments, the center assembly 1110 is a structure provided roughly perpendicularly between the roughly parallel side assemblies 1120. The center assembly 1110 may be connected on each end to one of the side assemblies 1120. In this way, the unmanned aerial vehicle 100 may have a shape or form generally in the shape of an "H." This structure may be referred to in the present description as an "H frame," "H shape," "H form," or similarly. This shape is highlighted in FIGS. 11B and 12B, which provide a conceptual diagram of unmanned aerial vehicle 100 from the same perspectives as those shown in FIGS. 11A and 12A, respectively. In other embodiments, the unmanned aerial vehicle 100 may have a frame in a different shape or form, such as but not limited to, a shape or form generally in the shape of an "X," "Y," "T," or other suitable shape or form.

With reference to FIGS. 1-12B, the H shape for the unmanned aerial vehicle 100 may provide particular benefits in embodiments where the H-shape is used. First, the parallel side assemblies provide symmetrical locations for mounting aerial propulsion devices (e.g., the aerial propulsion devices 130) and ground propulsion devices (e.g., the ground propulsion devices 150). Second, the center assembly 1110 may allow concentration of controllers, sensors, batteries, and other electronics that may have substantial weight in a single location provided near a center of mass of the unmanned aerial vehicle 100. Third, the center assembly 1110 may allow placement of a payload interface (e.g., the first payload interface 170, the second payload interface 180) at a center of mass of the unmanned aerial vehicle 100 so that any cargo being carried is properly located for load bearing by the aerial propulsion devices and ground propulsion devices. Fourth, the parallel side assemblies 1120 provide a structure that allows use of large continuous tracks for ground propulsion devices. Other benefits of the H shape may be particularly relevant in other embodiments.

Figure 13:
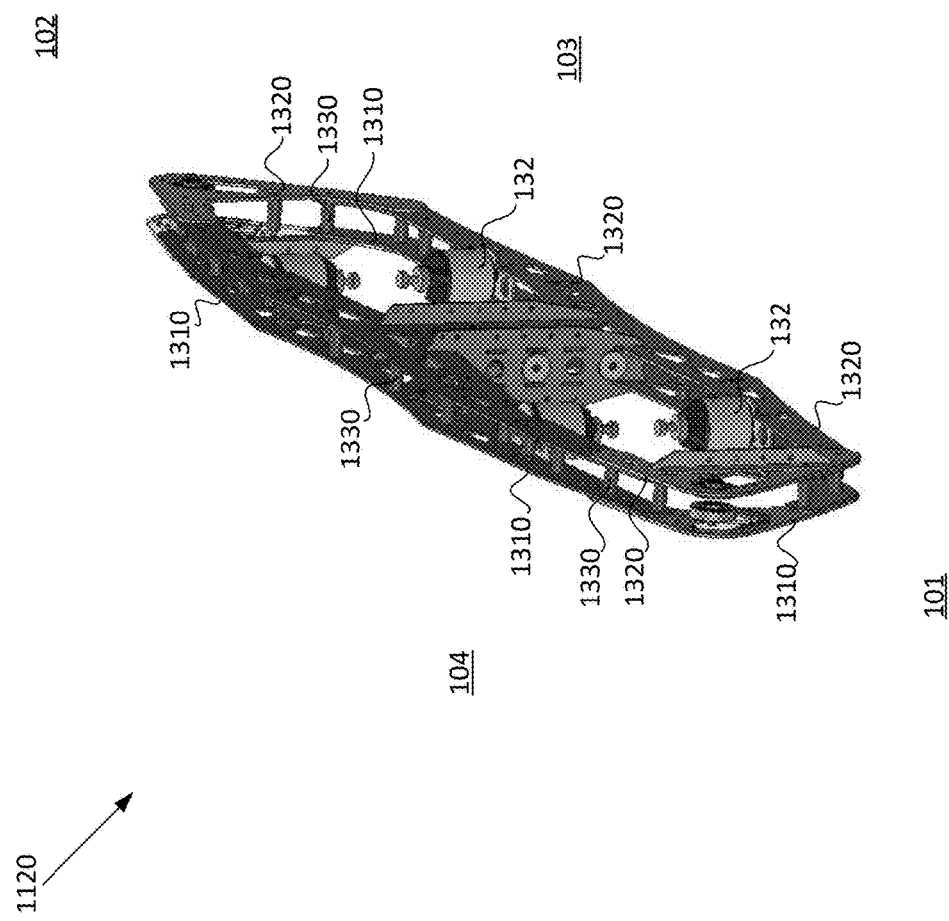
FIG. 13 shows a perspective view of a side assembly according to some embodiments.

FIG. 13 shows a perspective view of the side assembly 1120 according to some embodiments.

With reference to FIGS. 1-13, the side assembly 1120 may include a double wall structure. The double wall structure of the side assembly 1120 is made up of a first frame wall 1310 and a second frame wall 1320. The first frame wall 1310 and the second frame wall 1320 are separated by various spacer elements 1330. Each of the first frame wall 1310, the second frame wall 1320, and the spacer elements 1330 may be considered as components of the frame 110. The double wall structure may allow the side assembly 1120 to have a sufficient width for supporting various features, such as the continuous track 152 and a variety of wheels supporting the continuous track 152. At the same time, the double wall structure allows the side assembly 1120 to create the sufficient width just described with only minimal weight increase, namely the weight introduced by the spacer elements 1330.

Additionally, the use of the spacer elements 1330 to separate the first frame wall 1310 from the second frame wall 1320 allows air to pass freely in the open spaces between the first frame wall 1310 and the second frame wall 1320. This may be advantageous during aerial movement. First, the open spaces between the first frame wall 1310 and the second frame wall 1320 allow air to flow freely over the propellers 134 without substantial blockage of that airflow by a fully enclosed structure. Second, the open spaces between the first frame wall 1310 and the second frame wall 1320 allow the creation of a smaller surface area for being impacted by air generally or wind gusts more particularly. This may have the result of making the unmanned aerial vehicle 100 more efficient and stable during aerial movement.

In some embodiments, a single wall structure may be used in the unmanned aerial vehicle 100, along with other features of the unmanned aerial vehicle 100 described herein.

Figure 14A:
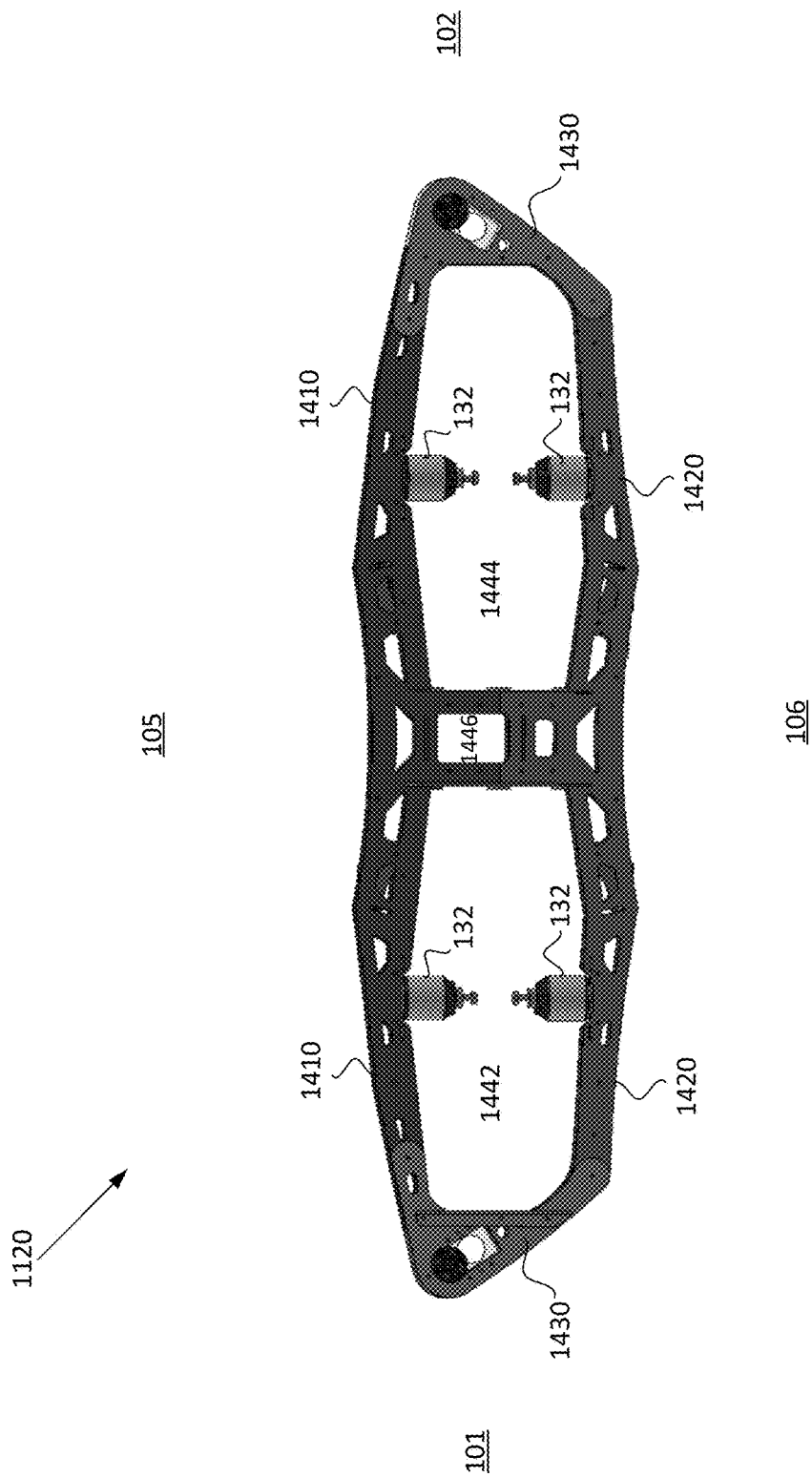
FIG. 14A shows a left view of a side assembly according to some embodiments.

FIG. 14A shows a left view of the side assembly 1120 according to some embodiments. With reference to FIGS. 1-14C, the side assembly 1120 may include a top frame piece 1410, a bottom frame piece 1420, and end frame pieces 1430. Each of the top frame piece 1410, the bottom frame piece 1420, and the end frame pieces 1430 may be considered as components of the second frame wall 1320 as discussed. Additionally, each of the top frame piece 1410, the bottom frame piece 1420, and the end frame pieces 1430 may be considered as components of the frame 110 as discussed. The use of separate frame pieces 1410, 1420, and 1430 may allow a more efficient use of a source material from which those pieces are cut, as described.

The side assembly 1120 may form numerous annular portions. The side assembly 1120 may have a first annular portion 1442 with an opening therein. The first annular portion 1442 may be formed by an annular portion of the frame 110. The first annular portion 1442 may be a front-most annular portion. The rotor motors 132 are shown disposed within the first annular portion 1442. In this way, one or more of the aerial propulsion devices 130 provided as part of the unmanned aerial vehicle 100 may be provided within the first annular portion 1442. Similarly, the side assembly 1120 may have a second annular portion 1444 with an opening therein. The second annular portion 1444 may be formed by an annular portion of the frame 110. The second annular portion 1444 may be a rear-most annular portion. One or more of the aerial propulsion devices 130 provided as part of the unmanned aerial vehicle 100 may be provided within the second annular portion 1444.

The annular shapes of the side assembly 1120 with the annular portions 1442 and 1444 may be particularly beneficial in some embodiments. First, when the aerial propulsion device 130 is disposed within the annular portions 1442 or 1444, the frame may provide protection to that propulsion device 130 in numerous directions. For instance, the rotor motors 132 drive the propellers 134 in a rotating form on a first plane. The frame 110 of the side assembly 1120 then provides protection to the propellers 134 in all of the top, bottom, front, and rear directions. In such embodiments, the only directions of the propellers 134 not directly protected by the side assembly 1120 are left and right directions. The propeller guards 136 may be used to provide protection in those directions. Second, the annular portions 1442 and 1444 formed by the annular shapes of the side assembly 1120 provide significant reduction in weight of the unmanned aerial vehicle 100 as compared to a configuration using a solid frame section (without the annular portions 1442 and 1444) for the side assembly 1120. With this reduction in weight, the unmanned aerial vehicle 100 may be more efficient in aerial movement. Third, the annular portions 1442 and 1444 may allow air to pass more freely through the frame 110 of the unmanned aerial vehicle 100. This may allow more free flow of air over the propellers 136 and/or reduced surface area for wind resistance when in aerial movement. Either of these effects may have the result of making the unmanned aerial vehicle 100 more efficient and stable during aerial movement.

The side assembly 1120 may have a third annular portion 1446 with an opening therein. The third annular portion 1446 may provide similar benefits in reduced weight and less air resistance as described with respect to the annular portions 1442 and 1444. In addition, the third annular portion 1446 may be provided so as to align with an interior channel of the center assembly 1110. An object may be inserted through the third annular portion 1446 ("into the page" with the view from FIG. 14A) and thereby enter an interior channel of the center assembly 1110. In some embodiments, this form of access may be useful to allow insertion of batteries or other components through the third annular portion 1446 and into an interior channel of the center assembly 1110.

Figure 14B:
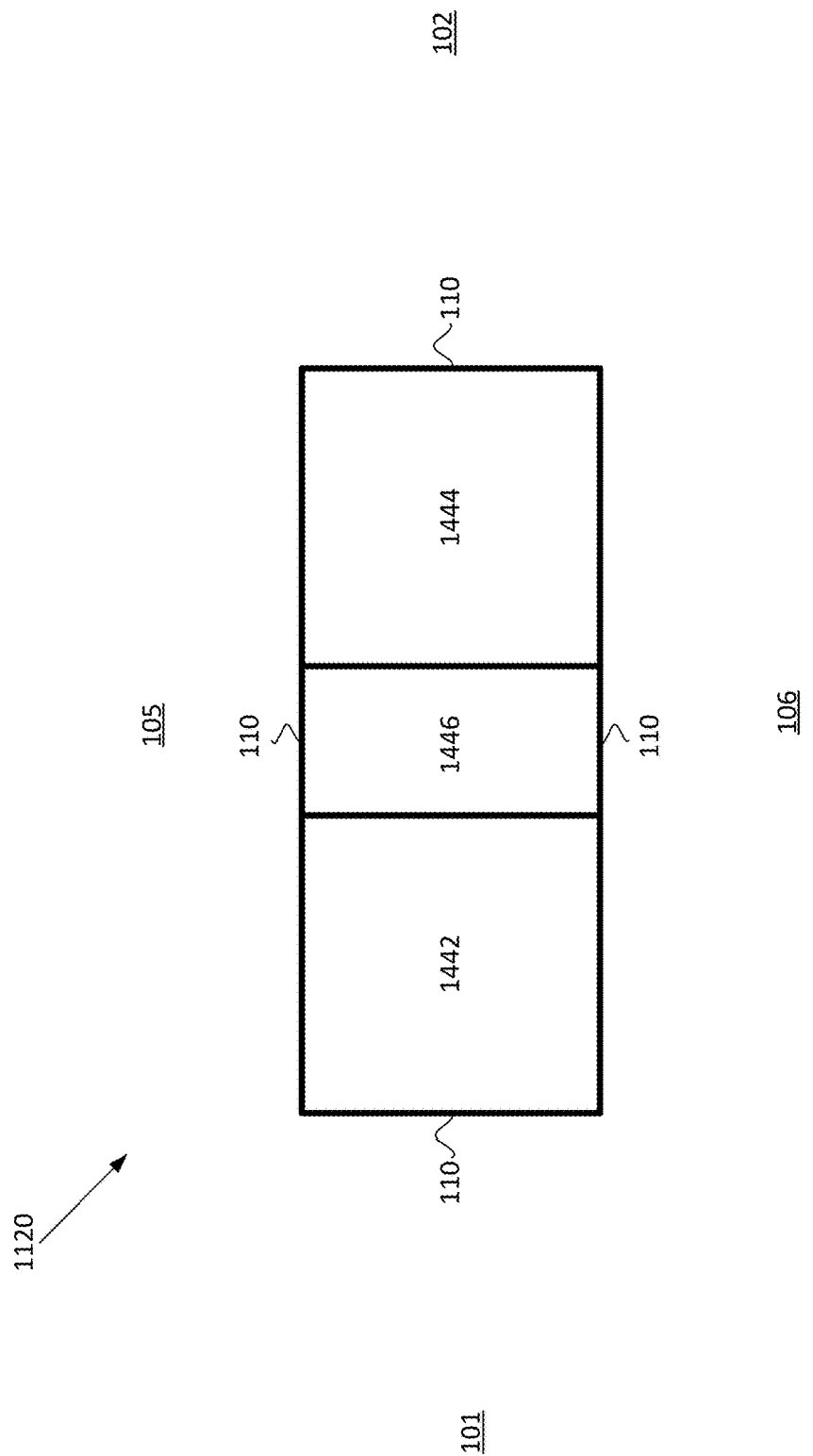
FIG. 14B shows a conceptual diagram from a left view of a side assembly according to some embodiments.
Figure 14C:
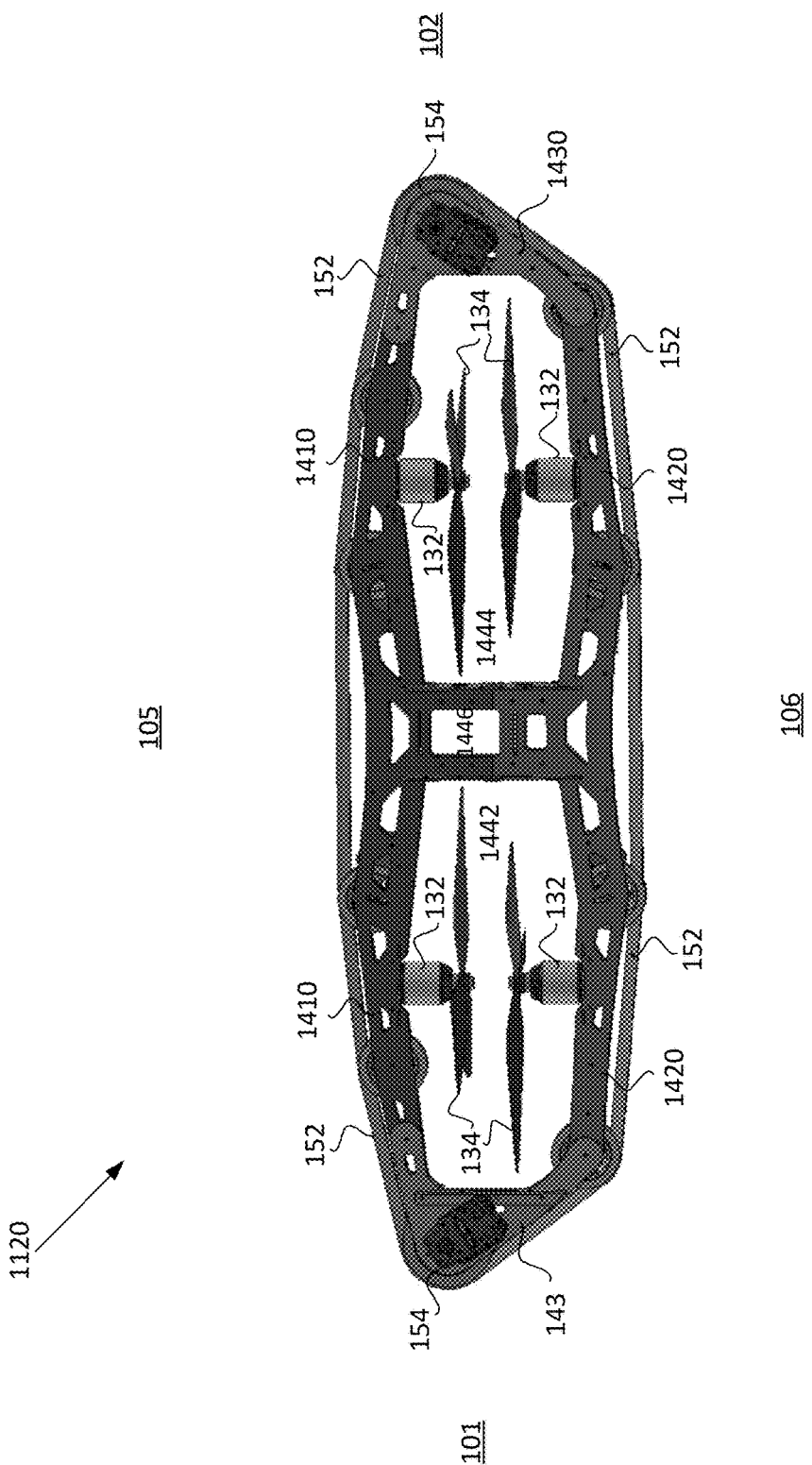
FIG. 14C shows a left view of a side assembly according to some embodiments.

The various annular portions and related openings of the side assembly 1120 are further highlighted in FIG. 14B, which provides a conceptual diagram of the side assembly 1120 from the same perspective as that shown in FIG. 14A.

Figure 15B:
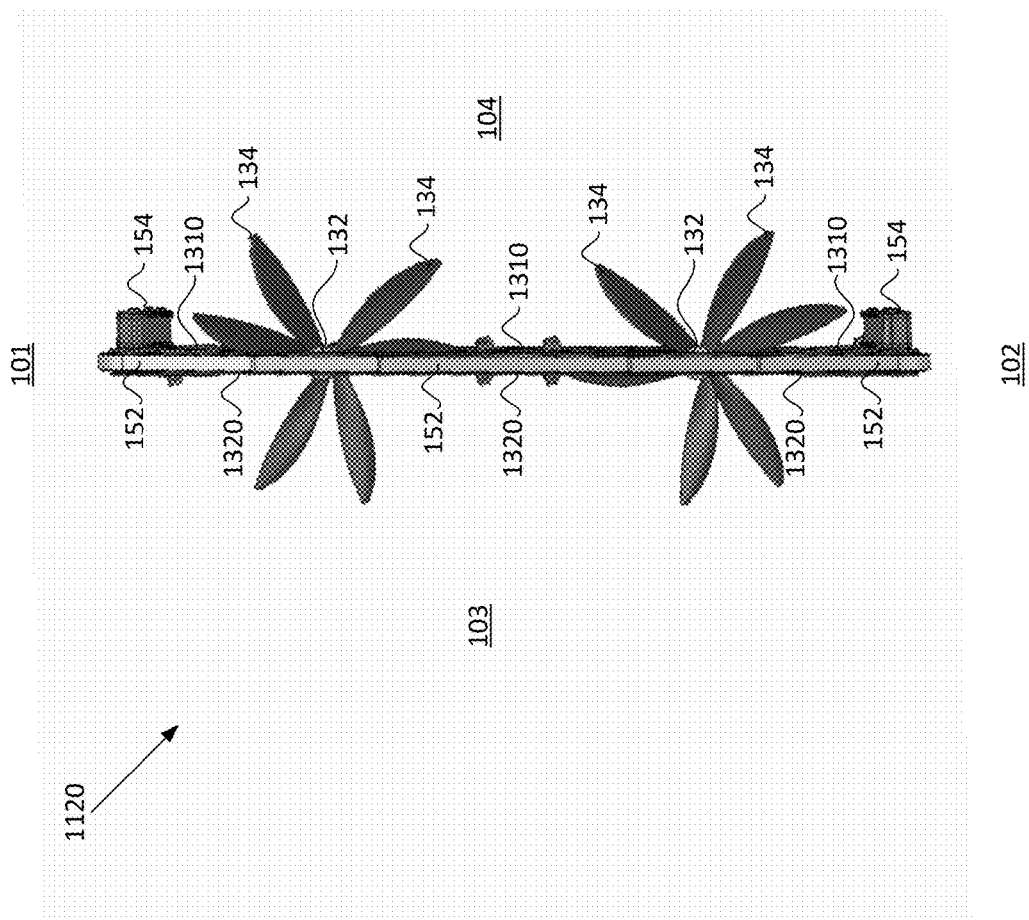
FIG. 15B shows a top view of a side assembly according to some embodiments.

FIG. 15A shows a top view of the side assembly 1120 according to some embodiments. In the side assembly 1120 of FIG. 15A, various features shown in previous figures have been removed to assist in viewing other features. Features not shown here include: the propellers 134, the propeller guards 136, the continuous track 152, and the continuous track motors 154. Some features, including the rotor motors 132, are shown to assist in understanding the other features shown. FIG. 15A assists in viewing the double wall structure formed by the first frame wall 1310, the second frame wall 1320, and the spacer elements 1330. FIG. 15B shows the same top view of the side assembly 1120 as shown in FIG. 15A. However, FIG. 15B shows additional elements, including the propellers 134, the continuous track 152, and the continuous track motors 154, so that the features of the side assembly 1120 can be illustrated with a fuller complement of features.

Figure 16A:
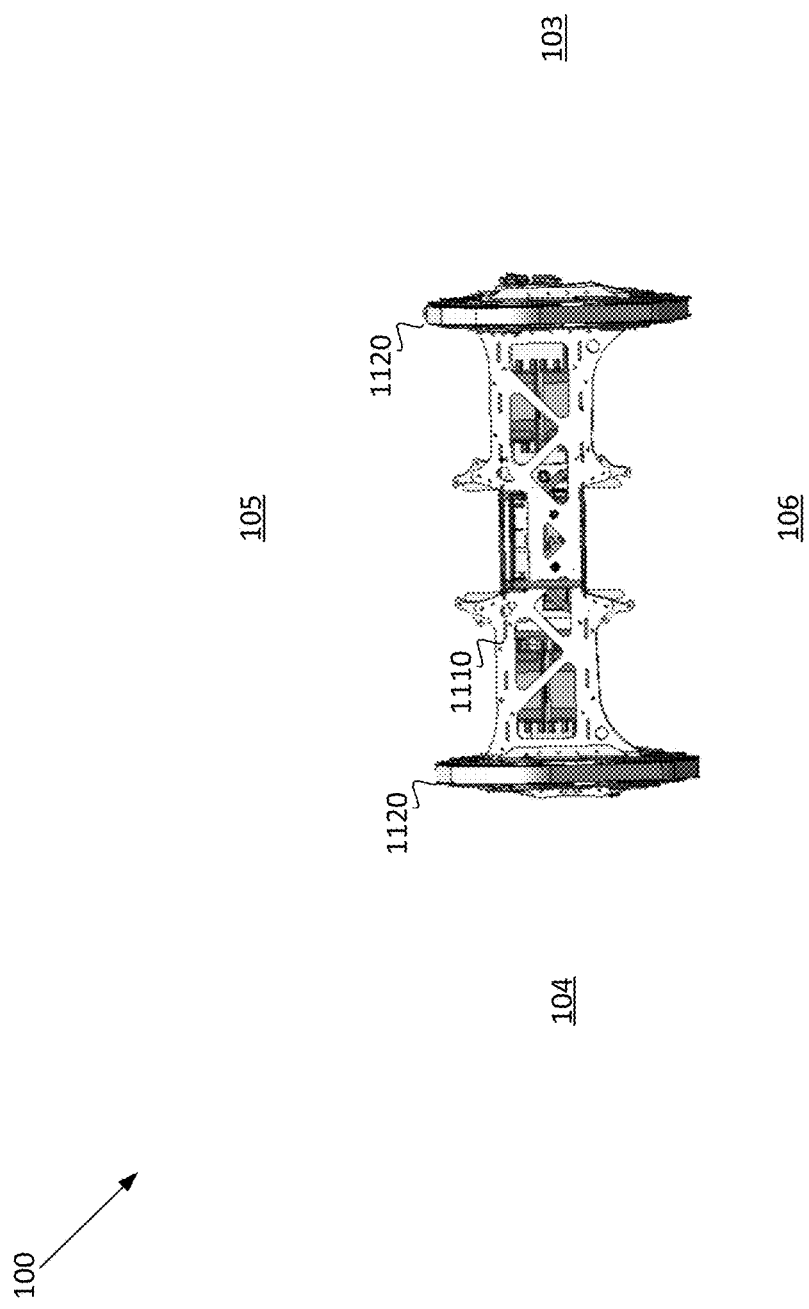
FIG. 16A shows a front view of an unmanned aerial vehicle according to some embodiments.

FIG. 16A shows a front view of the unmanned aerial vehicle 100 according to some embodiments. With reference to FIGS. 1-16A, the center assembly 1110 may be disposed between the side assemblies 1120. With reference to FIGS. 1-16A, the bottom-most portions of the center assembly 1110 are shown with a location above that of the bottom-most portions of the side assemblies 1120. Likewise, the top-most portions of the center assembly 1110 are shown with a location below that of the top-most portions of the side assemblies 1120. In this way, the continuous tracks 152 provided on the side assemblies 1120 may form both the top-most and bottom-most surfaces of the unmanned aerial vehicle 100.

In particular, embodiments the center assembly 1110 may have a greater clearance from the bottom-most portions of the side assemblies 1120 than from the top-most portions of the side assemblies 1120. This configuration may be advantageous in allowing unmanned aerial vehicle to maneuver on the ground (along a plane below the unmanned aerial vehicle 100) to a position above an object. The unmanned aerial vehicle 100 may then be able to engage the object with a payload interface, which may result in lifting the object slightly. In this way, the unmanned aerial vehicle 100 may then be able to continue maneuvering on the ground with the object suspended below the center assembly 1110 without the object coming into contact with or otherwise obstructing the ground.

Various other vertical placements of the center assembly 1110 relative to the side assemblies 1120 are shown in FIGS. 16B and 16C, which provide conceptual diagrams of the unmanned aerial vehicle 100 from the same perspective as that shown in FIG. 16A. In particular, FIG. 16B shows a configuration where the center assembly 1110 is provided essentially equidistant between the top-most surface of the side assemblies 1120 and the bottom-most surface of the side assemblies 1120. FIG. 16C shows a configuration where the center assembly 1110 is provided essentially even with the top-most surface of the side assemblies 1120.

Figure 17:
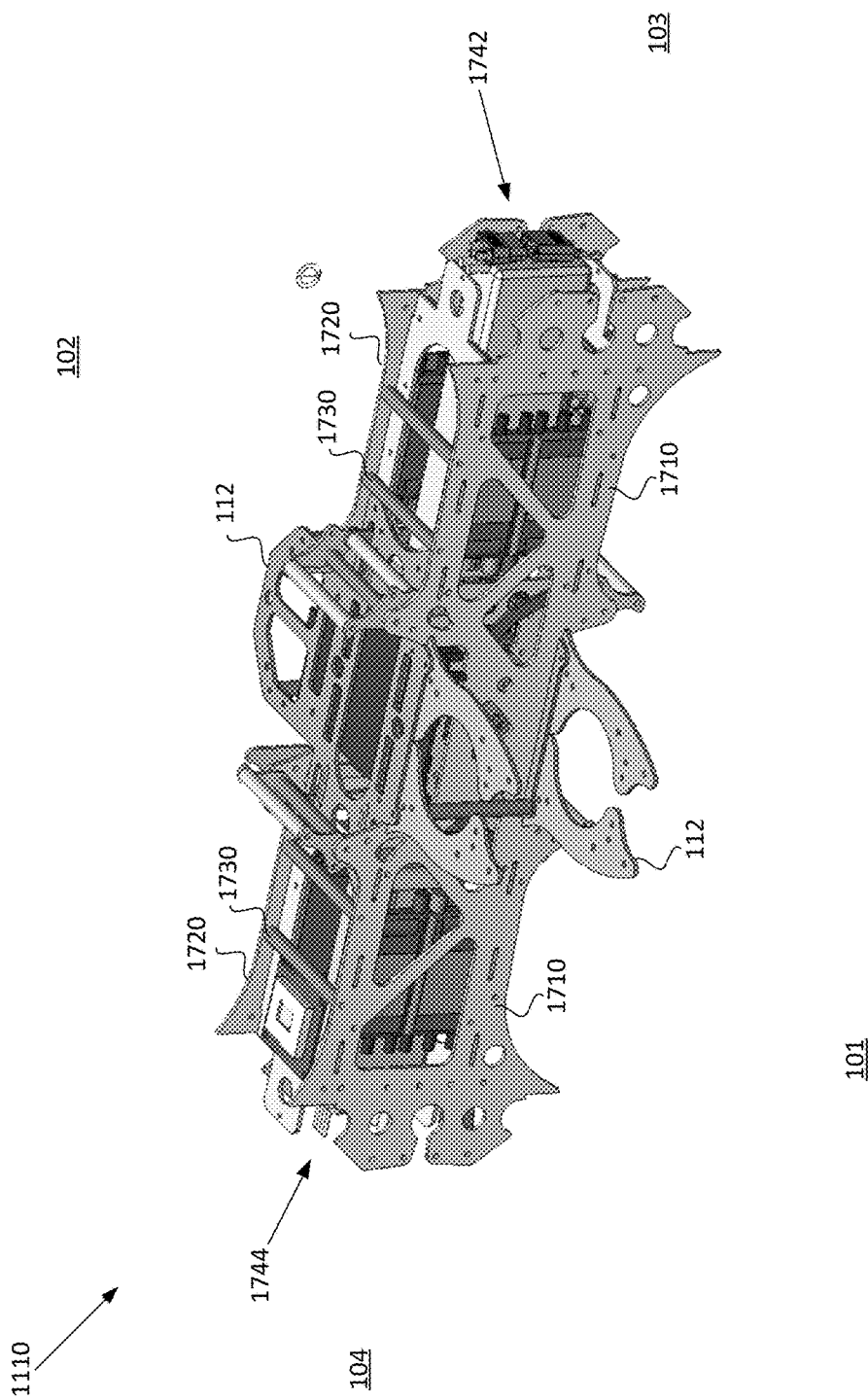
FIG. 17 shows a top-front view of a center assembly according to some embodiments.

FIG. 17 shows a top-front view of the center assembly 1110 according to some embodiments. With reference to FIGS. 1-17, the center assembly 1110 may include double wall structure. The double wall structure of the center assembly 1110 is made up of the front frame wall 1710 and the rear frame wall 1720. The front frame wall 1710 and the rear frame wall 1720 are separated by various spacer elements 1730. Each of the front frame wall 1710, the rear frame wall 1720, and the spacer elements 1730 may be considered as components of the frame 110 discussed previously. The double wall structure may allow the center assembly 1110 to have a sufficient width for supporting various features, such electronics, batteries, and payload interface motors. At the same time, the double wall structure allows the center assembly 1110 to create the sufficient width just described with only minimal weight increase, namely the weight introduced by the spacer elements 1730.

The double wall structure of the center assembly 1110 may include an opening 1742 on the left side of the center assembly 1110 and an opening 1744 on the right side of the center assembly 1110. The openings 1742 and 1744 may be used to provide access to as well as to form an interior channel of the center assembly 1110. The openings 1742 and 1744 may align with the third annular portions 1446 of the side assemblies 1120. When the side assemblies 1120 are attached to the center assembly 1110, the third annular portions 1446 of the side assemblies 1120 may be used to insert and remove objects, such as batteries, into the interior channel of the center assembly 1110, as discussed. When the side assemblies 1120 are not attached to the center assembly 1110, objects may be inserted and removed using the openings 1742 and 1744. For example, the center assembly 1110 may include an electronics module in the center of the interior channel, the electronics module containing a processor and other electronic components for controller operation of the unmanned aerial vehicle 100. The electronics module may be easily removed by sliding the electronics module out through either the openings 1742 or 1744. In this way, the openings 1742 and 1744 and the modular nature of the electronics module may allow easy replacement and repair of the controller electronics for the unmanned aerial vehicle 100.

Figure 18:
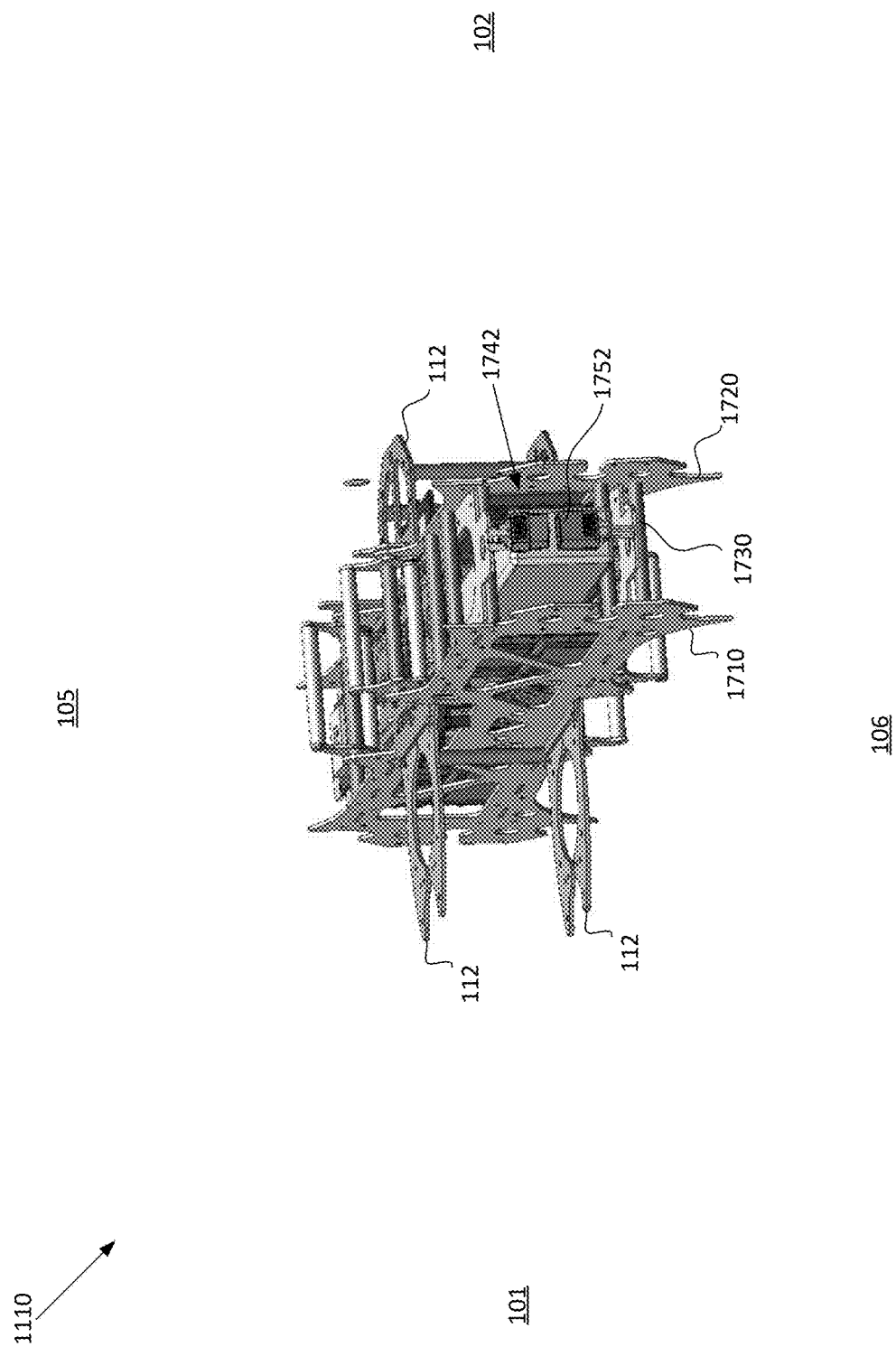
FIG. 18 shows a semi-left view of a center assembly according to some embodiments.

FIG. 18 shows a semi-left view of the center assembly 1110 according to some embodiments. FIG. 18 shows features similar to those described with respect to FIG. 17. However, FIG. 18 more clearly shows the opening 1742 and the interior channel of the center assembly 1110. In FIG. 18, an electronic component 1752, such as a battery, has been inserted through the opening 1742 and into the interior channel of the center assembly 1110.

Figure 19:
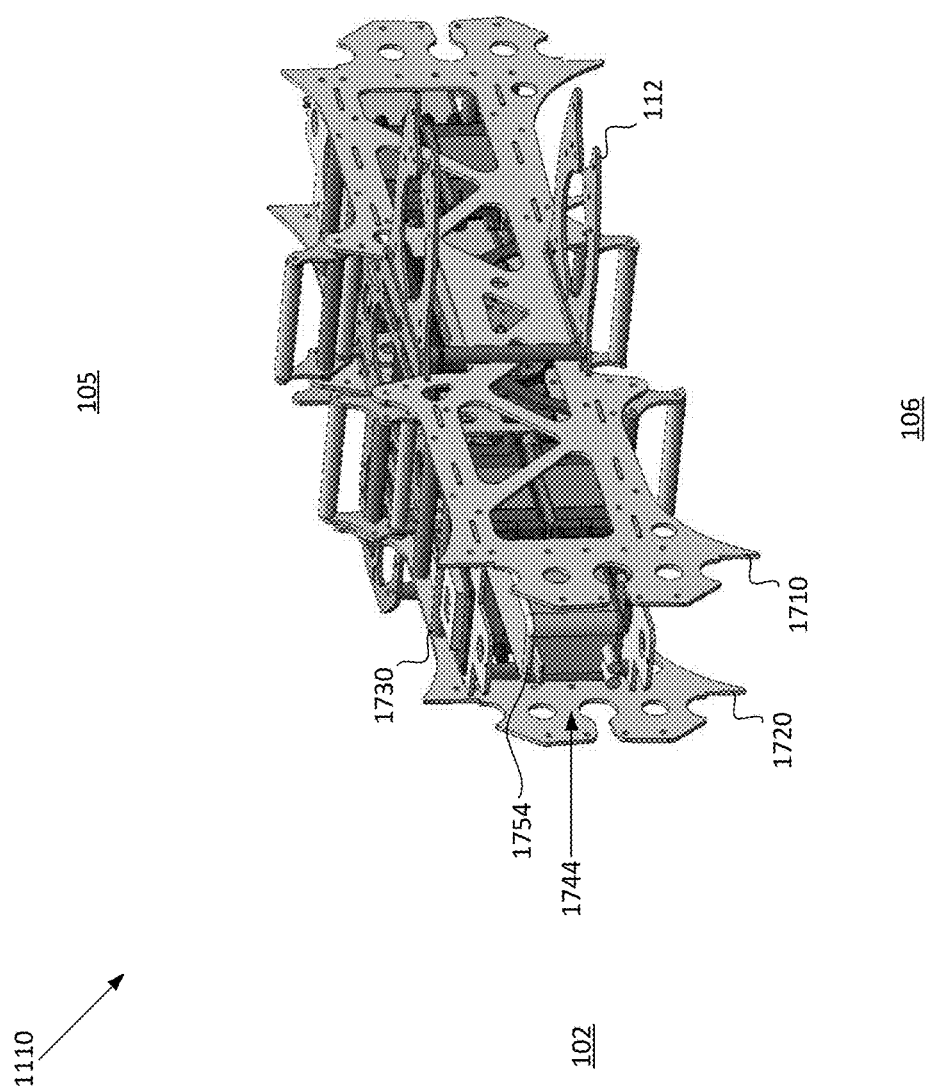
FIG. 19 shows a semi-right view of a center assembly according to some embodiments.

FIG. 19 shows a semi-right view of the center assembly 1110 according to some embodiments. FIG. 19 shows features similar to those described with respect to FIG. 17. However, FIG. 19 more clearly shows the opening 1744 and the interior channel of the center assembly 1110. In FIG. 19, the electronic component 1754, such as a battery, has been inserted through the opening 1744 and into the interior channel of the center assembly 1110.

Figure 20:
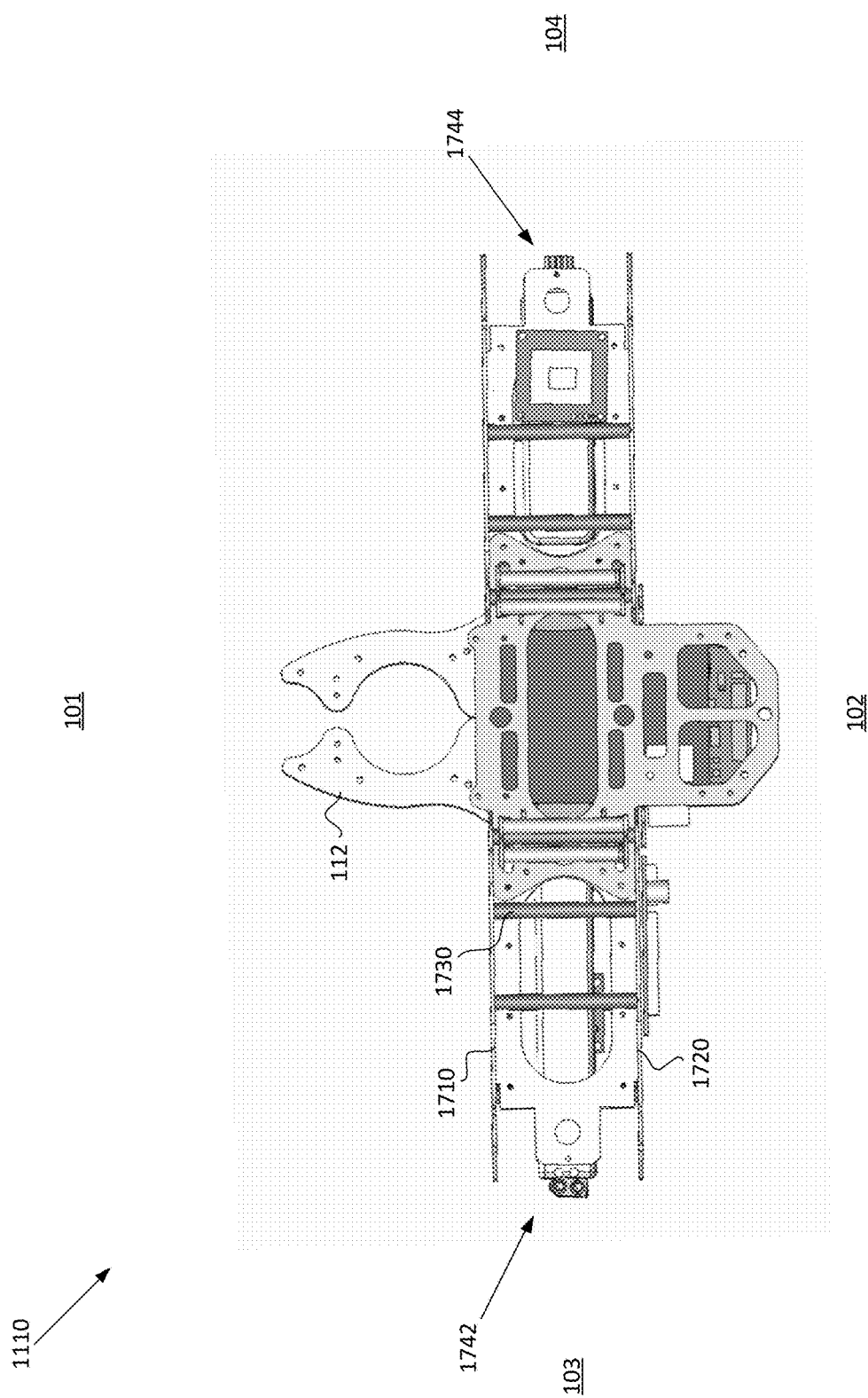
FIG. 20 shows a top view of a center assembly according to some embodiments.

FIG. 20 shows a top view of the center assembly 1110 according to some embodiments. FIG. 20 assists in viewing the double wall structure formed by the front frame wall 1710, the rear frame wall 1720, and the spacer elements 1730.

Figure 21:
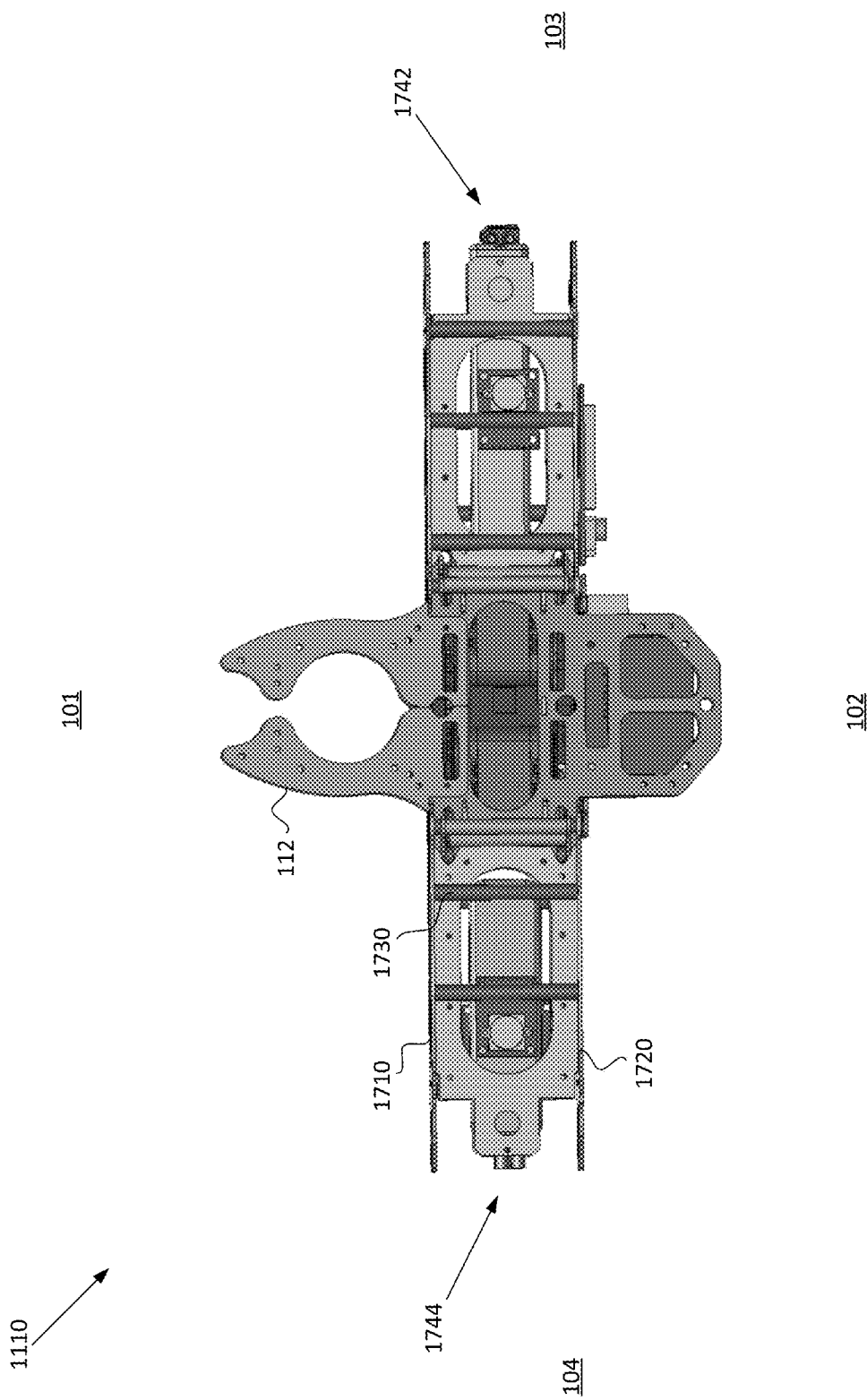
FIG. 21 shows a bottom view of a center assembly according to some embodiments.

FIG. 21 shows a bottom view of the center assembly 1110 according to some embodiments. FIG. 21 assists in viewing the double wall structure formed by the front frame wall 1710, the rear frame wall 1720, and the spacer elements 1730.

Figure 22:
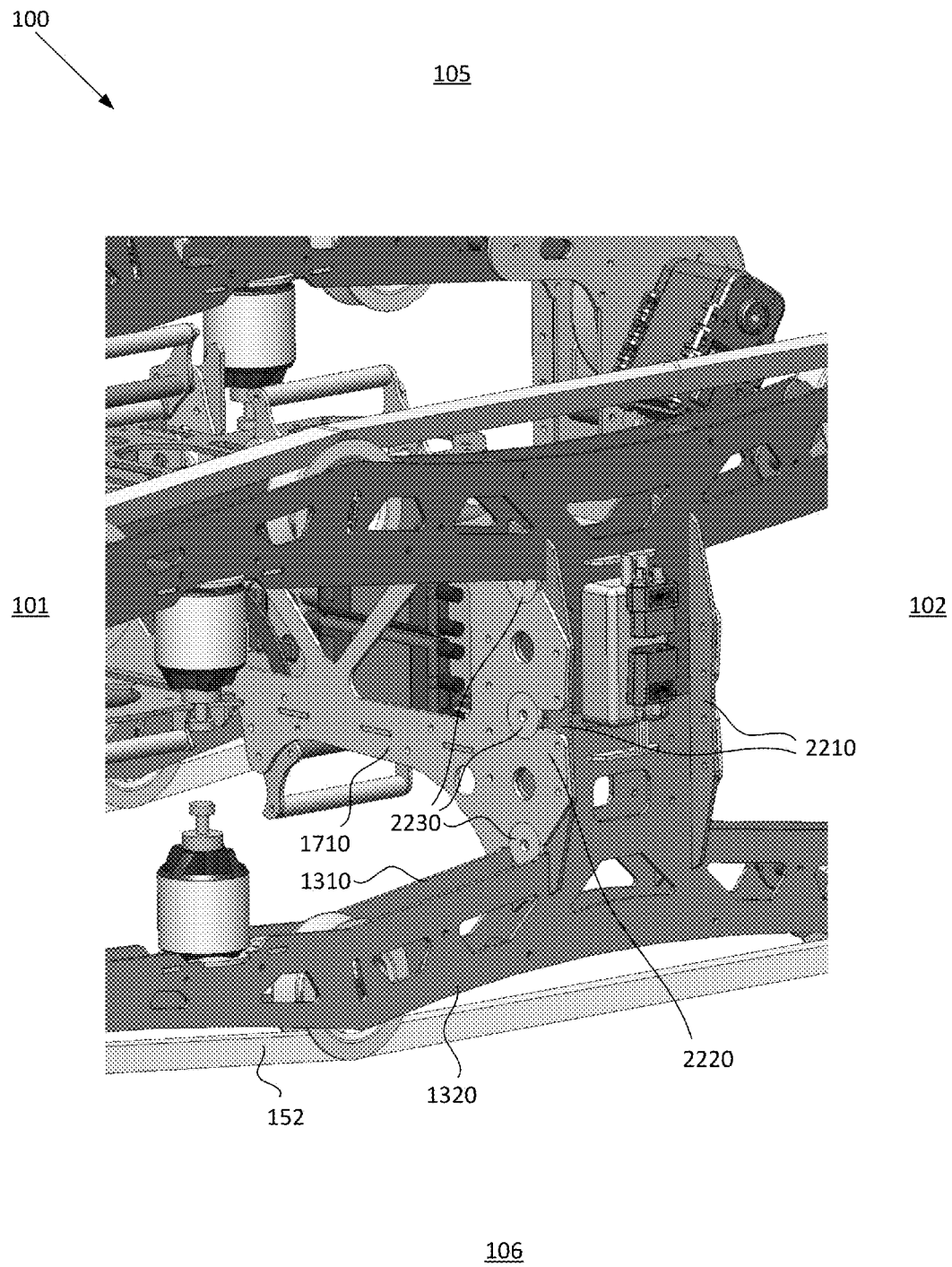
FIG. 22 shows an attachment point of a center assembly to a side assembly according to some embodiments.

FIG. 22 shows an attachment point of the center assembly 1110 to the side assembly 1120 according to some embodiments. The view of FIG. 22 is taken from the left side looking through the side assembly 1120 and onto the center assembly 1110. The center assembly 1110 is indicated based on the front frame wall 1710. The side assembly 1720 is indicated based on the continuous track 152, the first frame wall 1310, and the second frame wall 1320. Some features, such as the propellers 134 and the propeller guards 136 have been removed for clarity.

With reference to FIGS. 1-22, the unmanned aerial vehicle 100 may include attachment components 2210 of the side assembly 1120 for attaching or otherwise coupling with attachment component 2220 of the center assembly 1110. The attachment components 2210 and 2220 are shown as frame pieces provided parallel to one another in order to provide a surface upon which to fix the attachment components 2210 and 2220. In some embodiments, one or more attachment components 2230 may be provided to fix, attach, or otherwise couple the attachment component 2220 onto the attachment component 2210. In particular embodiments, the attachment component 2220 may be specially designed to receive the attachment component 2230 in order to fix the attachment component 2220 onto the surface provided by the attachment component 2210. In some embodiments, each of the attachment components 2230 may be made up of a plastic screw and washer. In other embodiments, each of the attachment components 2230 may be made up of a plastic rivet. In yet other embodiments, any suitable attachment components 2230 may be implemented.

In some embodiments, minimal, non-permanent attachment components may be desirable for attaching the center assembly 1110 to the side assemblies 1120 in some embodiments. It may be beneficial in some embodiments to allow easy attachment and detachment of the side assemblies 1120 to the center assembly 1110. This may be beneficial in order to allow repair and replacement of only either the center assembly 1110 or the side assembly 1120 when only one of the two has malfunctioned. Also, as stated previously, easy detachment of the side assembly 1120 may allow for greater access to an interior channel of the center assembly 1110, such as for insertion of objects there into or removal of objects therefrom.

In some embodiments, the attachment components 2230 may be controllable by the unmanned aerial vehicle 100. In particular, either a controller provided as part of the side assembly 1120 and/or a controller provided as part of the center assembly 1110 may be able to engage and/or disengage the attachment components 2230 without physical intervention by a human or other machine. In some embodiments, the attachment components 2230 may be electro-magnetic couplings that fix the attachment component 2220 to the attachment component 2210. A controller provided in the center assembly 1110 or the side assembly 1120 may be able to disengage the electro-magnetic coupling and thereby separate the center assembly 1110 from the side assembly 1120. In some embodiments, the attachment components 2230 may be plastic rivets that fix the attachment component 2220 to the attachment component 2210. A controller provided in the center assembly 1110 or the side assembly 1120 may be able to activate a motor that causes a force to be applied to the plastic rivets in order to break them (such as by a cutting device), thereby separating the center assembly 1110 from the side assembly 1120. In some embodiments, the attachment components 2230 may be clamps that alternate between an open position and a closed position. In a closed position, the clamps may fix the attachment component 2220 to the attachment component 2210. A controller provided in the center assembly 1110 or the side assembly 1120 may be able to activate a motor that causes the clamps to change to the open position, thereby separating the center assembly 1110 from the side assembly 1120. An opposite action may be taken to join the center assembly 1110 to the side assembly 1120 when the two assemblies are not attached.

Figure 23:
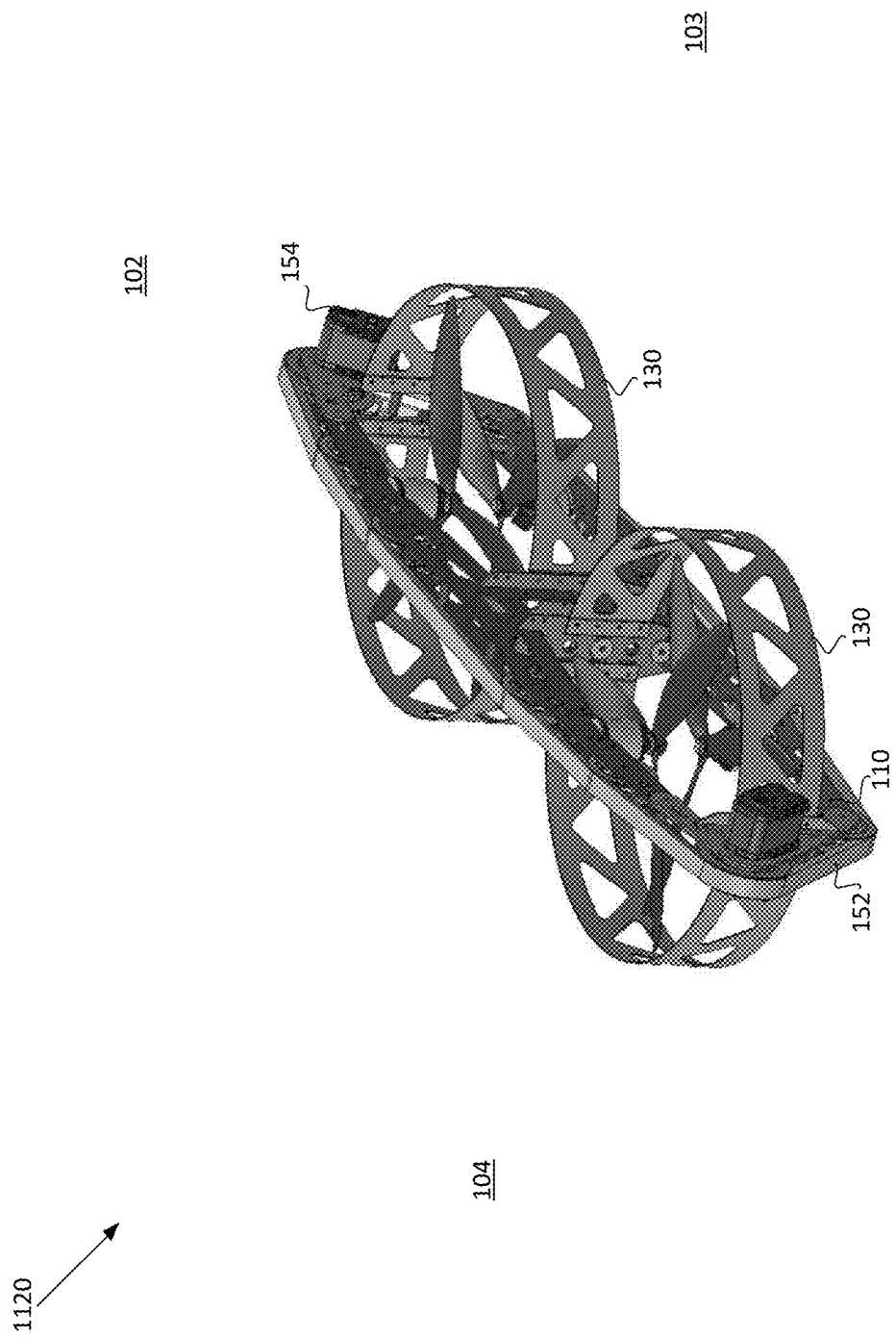
FIG. 23 shows a side assembly that is independently operable apart from a center assembly according to some embodiments.

FIG. 23 shows the side assembly 1120 that is independently operable apart from the center assembly 1110 according to some embodiments. With reference to FIGS. 1-23, the side assembly 1120 may contain components as described for other embodiments of the side assembly 1120, including: the frame 110, the aerial propulsion devices 130, the continuous track 152, and the continuous track motors 154. In addition, the side assembly 1120 may contain sufficient electronic components to allow the side assembly 1120 to operate without being under control of an electronics module provided in the center assembly 1110.

The side assembly 1120 of FIG. 23 may be a side assembly that is independently detachable from the center assembly 1110, as described. For example, the case may arise wherein the center assembly 1110 is no longer operative (or otherwise needed). However, the side assembly 1120 may still be operative. In addition, the unmanned aerial vehicle 100 containing the center assembly 1110 and the side assembly 1120 may not be in a location immediately accessible by humans or another machine. As such, a controller provided in the side assembly 1120 may cause the attachment components 2230 to detach the side assembly 1120 from the center assembly 1110. The side assembly 1120 may then use ground movement or aerial movement to travel to some other location, such as a garage or headquarters location.

Figure 24:
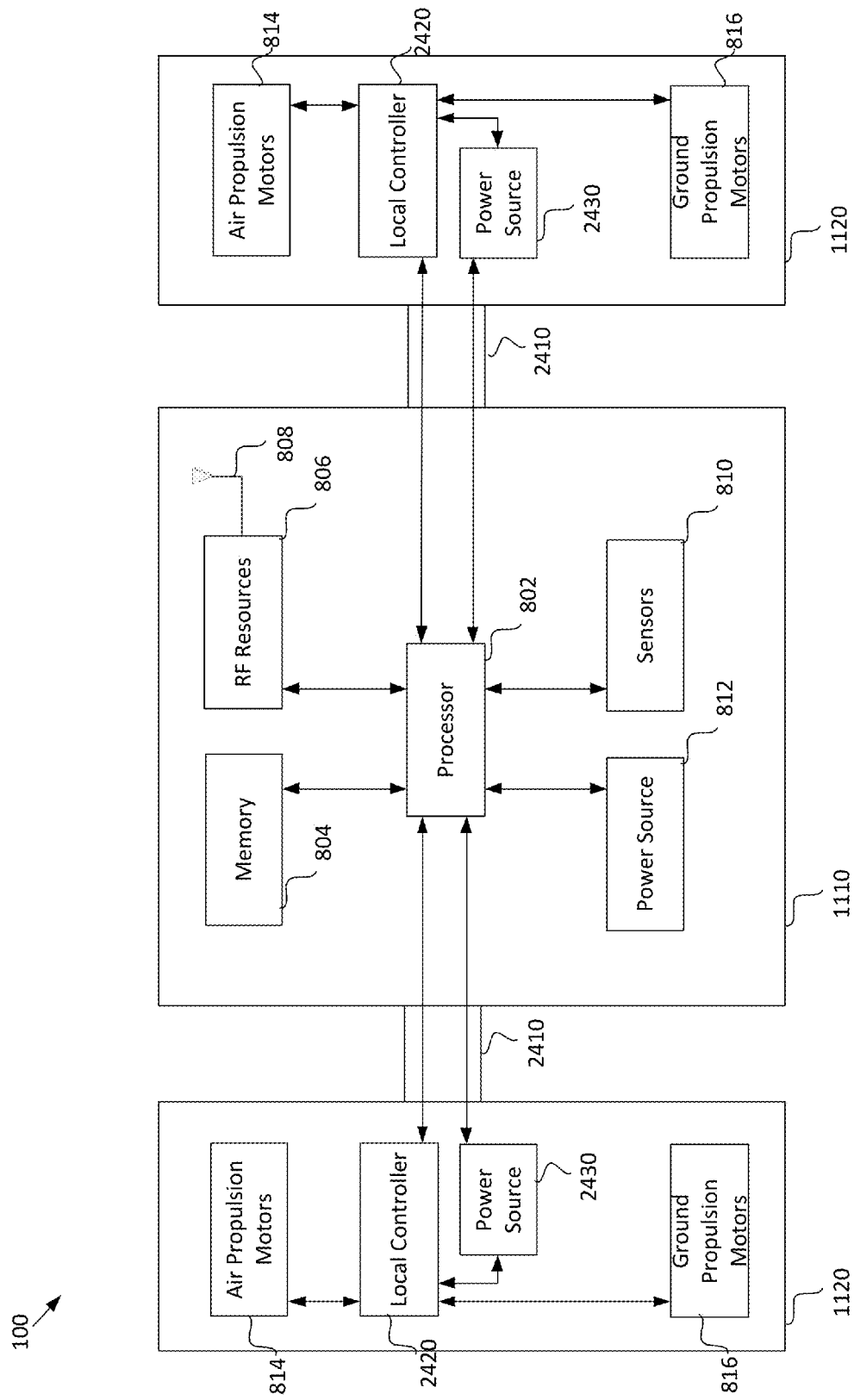
FIG. 24 shows a schematic diagram of various components of an unmanned aerial vehicle according to some embodiments.

FIG. 24 shows a schematic diagram of various components of the unmanned aerial vehicle 100 according to some embodiments. In particular, schematic layout of FIG. 24 may be used for embodiments where the side assembly 1120 is independently operable apart from the center assembly 1110, as described with respect to FIG. 23. In addition, schematic layout of FIG. 24 may be used in various embodiments other than those described with respect to FIG. 23, as the schematic layout of FIG. 24 may be used to provide redundancy in the components of the unmanned aerial vehicle 100. This may be advantageous in that the unmanned aerial vehicle 100 may be able to continue operating even if an electrical component fails, wherein a redundant backup component exists. As an example, a Global Positioning System module may be provided in the left assembly 1120 and the right assembly 1120, thereby providing redundancy for this component. The components of FIG. 24 may be provided the same as like-numbered components described with respect to FIG. 8, except as now noted.

With reference to FIGS. 1-24, in various embodiments, the center assembly 1110 may include one or more components such as (but not limited to) the processor 802, the memory 804, the RF resources 806, the antenna 808, the power source 812, and the sensors 810.

Each of the side assemblies 1120 may include one or more components such as (but not limited to) a local controller 2420, power source 2430, the air propulsion motors 814, and the ground propulsion motors 816. The air propulsion motors 814 and the ground propulsion motors 816 may be provided substantially the same as described (e.g., with respect to FIG. 8). Power sources 2430 may be provided substantially the same as described (e.g., with respect to the power source 812 of FIG. 8). The local controllers 2420 may be provided as a processor with memory, RF resources, and other components (e.g., as described with respect to the processor 802, the memory 804, and the RF resources 806 of FIG. 8). The local controllers 2420 may be controllers that generally operate under the control of the processor 802 when the side assemblies 1120 are attached to the center assembly 1110. However, when the side assembly 1120 detaches form the center assembly 1110, then the local controller 2420 may be effective to control the air propulsion motors 814 and the ground propulsion motors 816 in order to operate the side assembly 1120 independent of the center assembly 1110.

Figure 25:
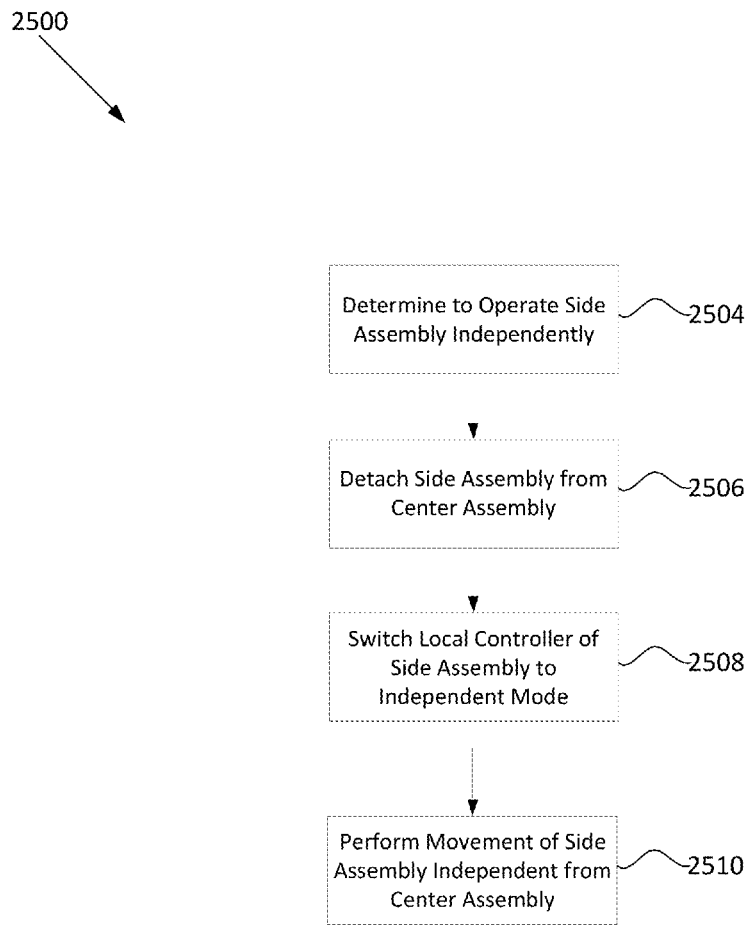
FIG. 25 shows a flow diagram of a process for operating an unmanned aerial vehicle according to some embodiments.

FIG. 25 shows a flow diagram of a process 2500 for operating the unmanned aerial vehicle 100 according to some embodiments. With reference to FIGS. 1-25, the process 2500 may be used for embodiments where the side assembly 1120 is independently operable apart from the center assembly 1110.

At block 2504, a determination is made to operate the side assembly 1120 independently of the center assembly 1110. The block 2504 may involve the side assembly 1120 determining that the center assembly 1110 is no longer operable, and that the side assembly 1120 must therefore continue to operate on its own.

At block 2506, the side assembly 1120 is detached from the center assembly 1110. The block 2506 may involve the side assembly 1120 causing the attachment components 2230 to decouple the attachment components 2220 from the attachment components 2210.

At block 2508, the local controller 2420 of the side assembly 1120 is switched to independent mode. The block 2508 may involve the local controller 2420 beginning to operate in an independent mode in controlling the air propulsion motors 814 and/or ground propulsion motors 816, whereas the local controller 2420 previously operated under the control of the processor 802 of the center assembly 1110.

At block 2510, the side assembly 1120 performs movement independent from the center assembly 1110. The block 2510 may involve the side assembly 1120 performing aerial movement as a tandem rotor aerial craft while the center assembly 1110 remains stationary at a previous location.

Figure 26:
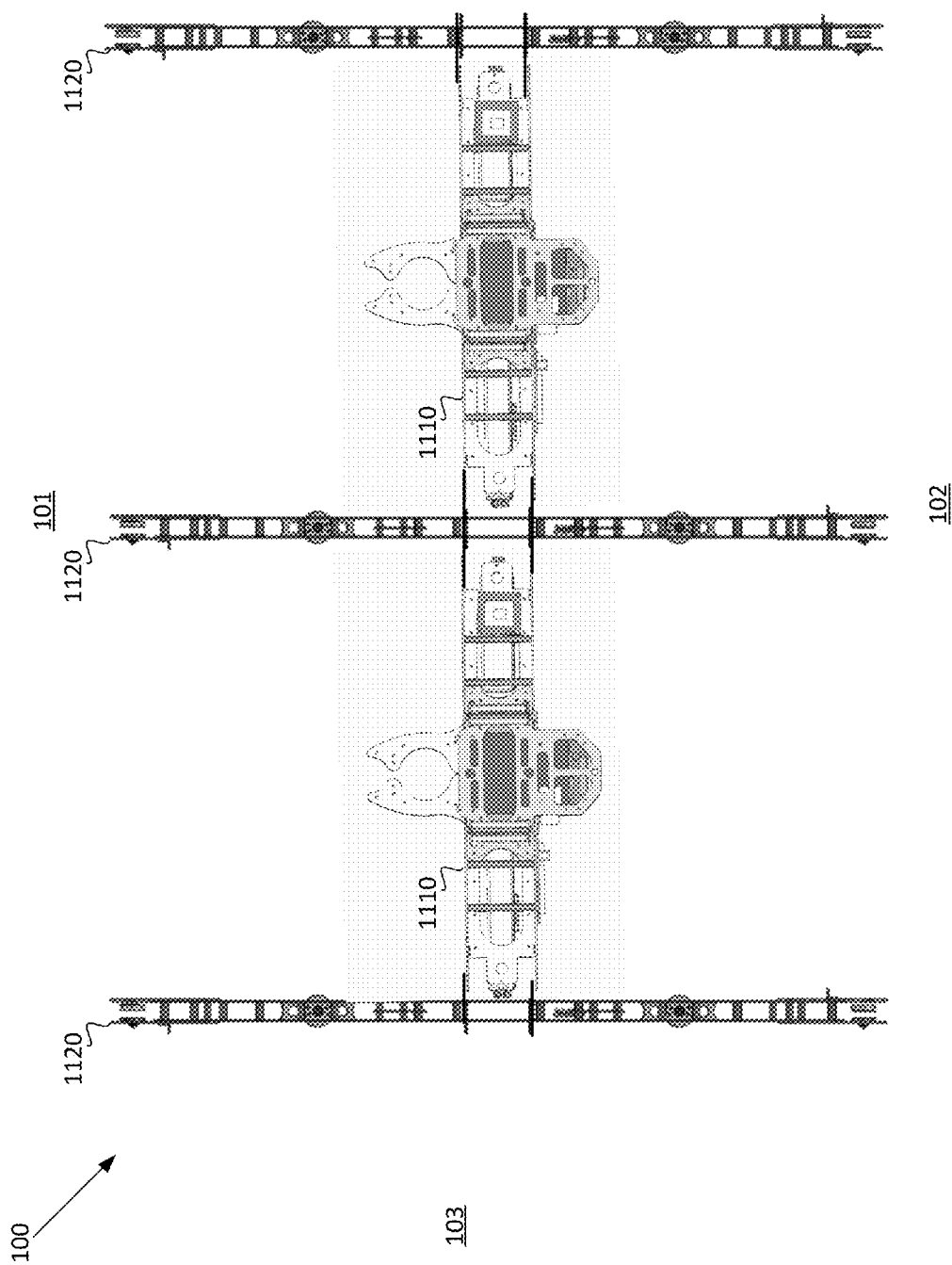
FIG. 26 shows a top view of an unmanned aerial vehicle according to some embodiments.

FIG. 26 shows a top view of the unmanned aerial vehicle 100 according to some embodiments. With reference to FIGS. 1-26, the unmanned aerial vehicle 100 may include three (or more) side assemblies 1120 and/or two (or more) center assemblies 1110. FIG. 26 demonstrates that the modularity of the side assemblies 1120 with respect to connecting to and disconnecting from the center assemblies 1110 allows configurations other than the two-side assemblies and one-side assembly configurations as discussed.

Figure 27:
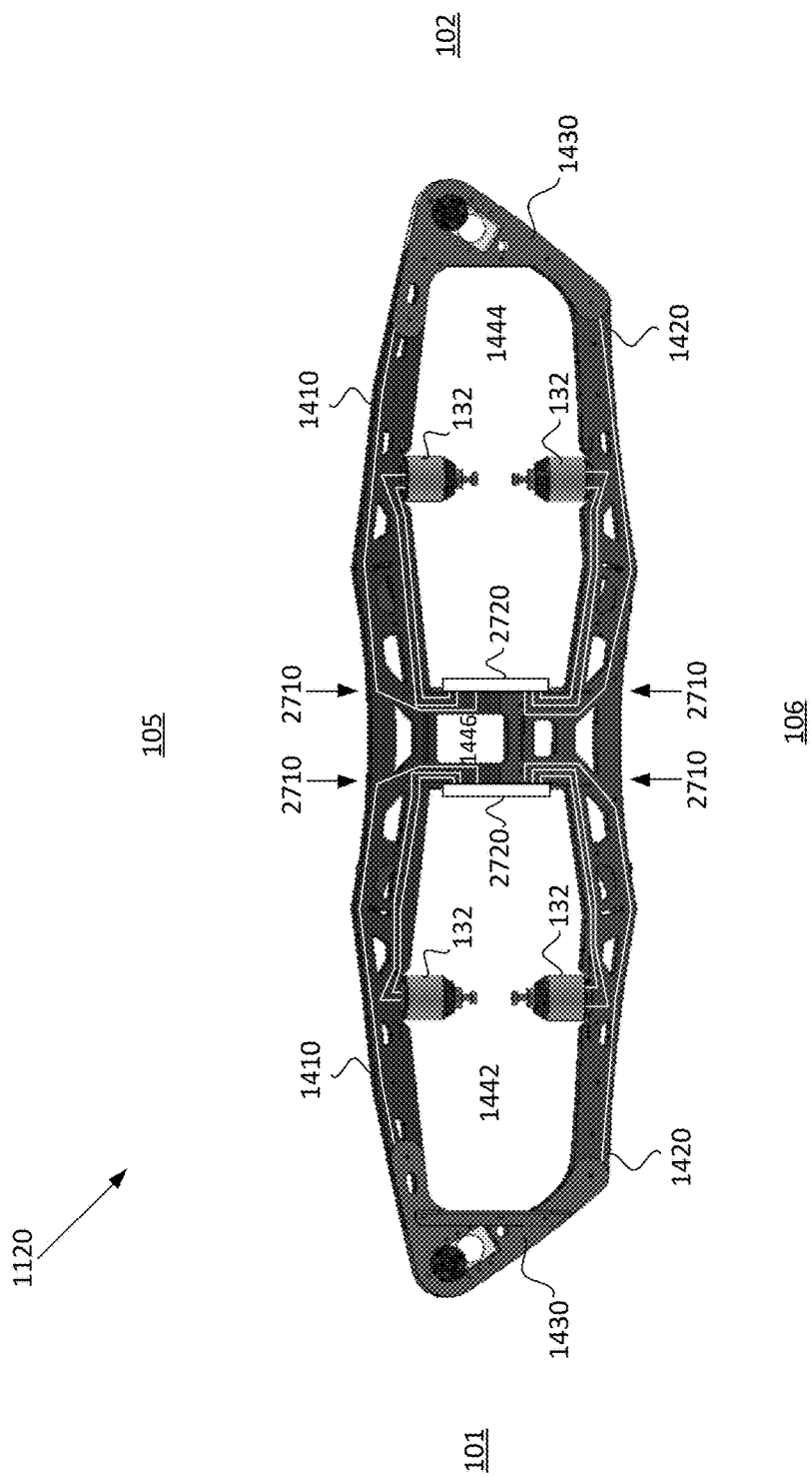
FIG. 27 shows a left view of a side assembly according to some embodiments.

FIG. 27 shows a left view of the side assembly 1120 according to some embodiments. With reference to FIGS. 1-27, the frame 110 may including the frame pieces 1410, 1420, and 1430 may be made of printed circuit board material. In such embodiments, the frame 110 may have conductive tracks 2710 (shown as white lines on the frame pieces 1410 and 1420) printed onto the material that makes up the frame 110. The conductive tracks 2710 may provide electrical connections between various components provided on the side assembly 1120. For example, the conductive tracks 2710 may provide electrical connections between the rotor motors 132 as well as the continuous track motors 154 and attachment points 2720. The attachment points 2720 may be provided as embodiments of or parts of attachment components described elsewhere (e.g., the attachment components 2210). The attachment points 2720 may create electrical connections to the center assembly 1110 and the processor 802 provided thereon. In this way, the use of printed circuit board material for the frame 110 may allow the conductive lines 2710 to provide electrical connections from a central processor of the center assembly 1110 to various aerial and ground propulsion devices of the side assembly 1120. This may allow a significant reduction in weight and space usage by replacing copper wires or other conductive wires that would otherwise be used for the connections.

The attachment points 2720 may be provided as any form of coupling of the side assembly 1120 to the center assembly 1110. In addition, the attachment points 2720 may provide electrical connections between components of the side assemblies 1120 and the center assembly 1110. The attachment points 2720 may be embodiments of the group of the attachment components 2210, 2220, and 2230.

Figure 28:
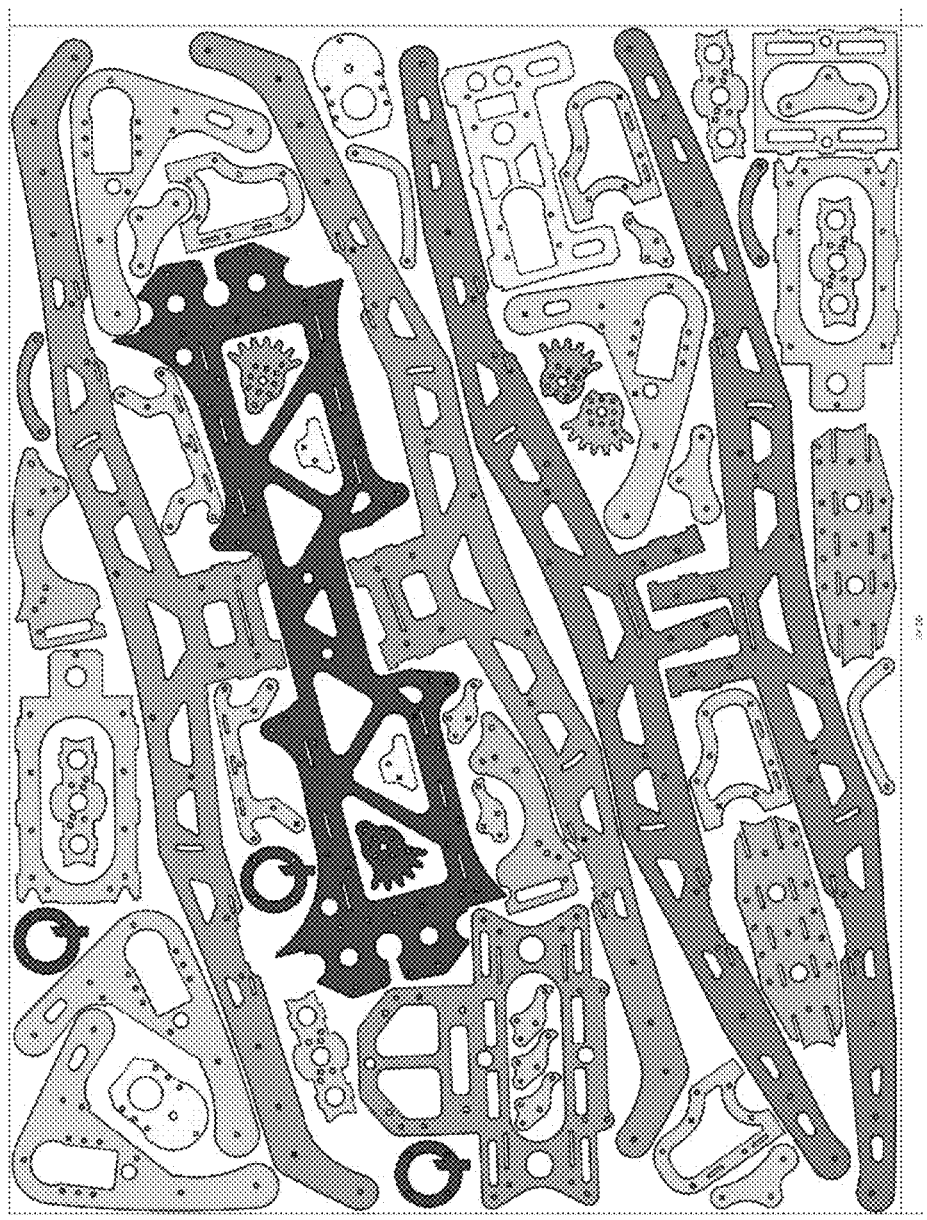
FIG. 28 shows a cutting template for pieces of a frame according to some embodiments.

FIG. 28 shows a cutting template 2800 for pieces of the frame 110 according to some embodiments. With reference to FIGS. 1-28, the cutting template 2800 may provide a template for cutting pieces of the frame 110 from a sheet of source material. In some embodiments, the source material may be a sheet of printed circuit board. The configuration of the frame 110 as described may be based on the assembly of numerous smaller pieces into the double wall structures of the side assemblies 1120 and the center assembly 1110. In particular embodiments, substantially all pieces of the frame 110 may be cut from a single sheet of source material with very little wasted, scrap material. This approach may be beneficial in reducing the overall cost of constructing the unmanned aerial vehicle 100.

In some embodiments, the center assembly 1110 and the side assemblies 1120 may be fabricated using other techniques. For example, the center assembly 1110 and the side assemblies 1120 may be cut from a single sheet of source material that is not printed circuit board. As another example, the center assembly 1110 and the side assemblies 1120 may be fabricated using 3D printing. As another example, the center assembly 1110 and the side assemblies 1120 may be fabricated using injection molding.

Figure 29A:
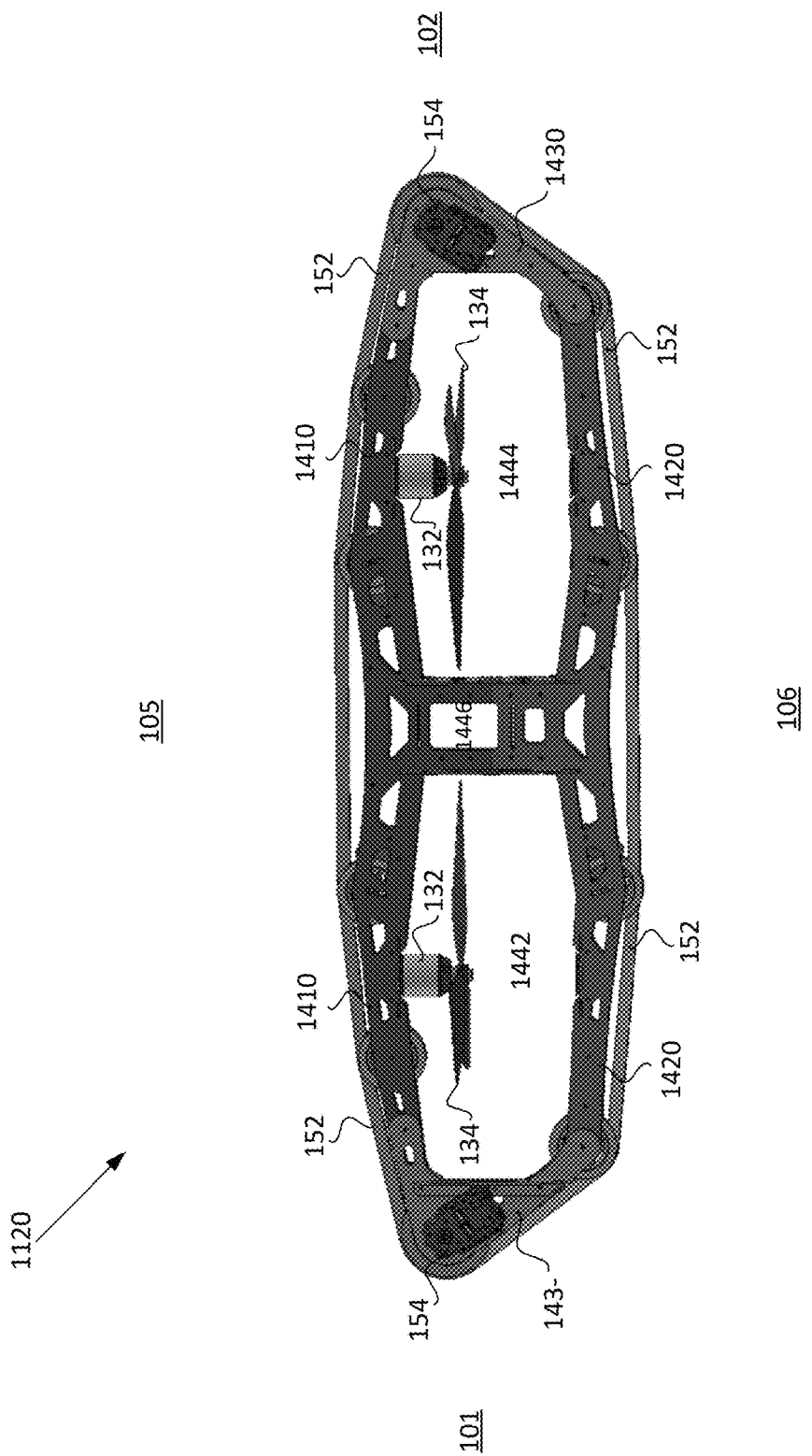
FIG. 29A shows a left view of a side assembly according to some embodiments.

FIG. 29A shows a left view of the side assembly 1120 according to some embodiments. With reference to FIGS. 1-29A, a configuration of the side assembly 1120 where a single, downward-facing rotor motor 132/propellers 134 assembly is used in each of the annular portions 1442 and 1444. Such a configuration may be preferable where the redundancy of the paired, opposing rotor motor 132/propellers 134 assemblies in each of the annular portions 1442 and 1444 is considered less important than the total cost of constructing the unmanned aerial vehicle 100.

Figure 29B:
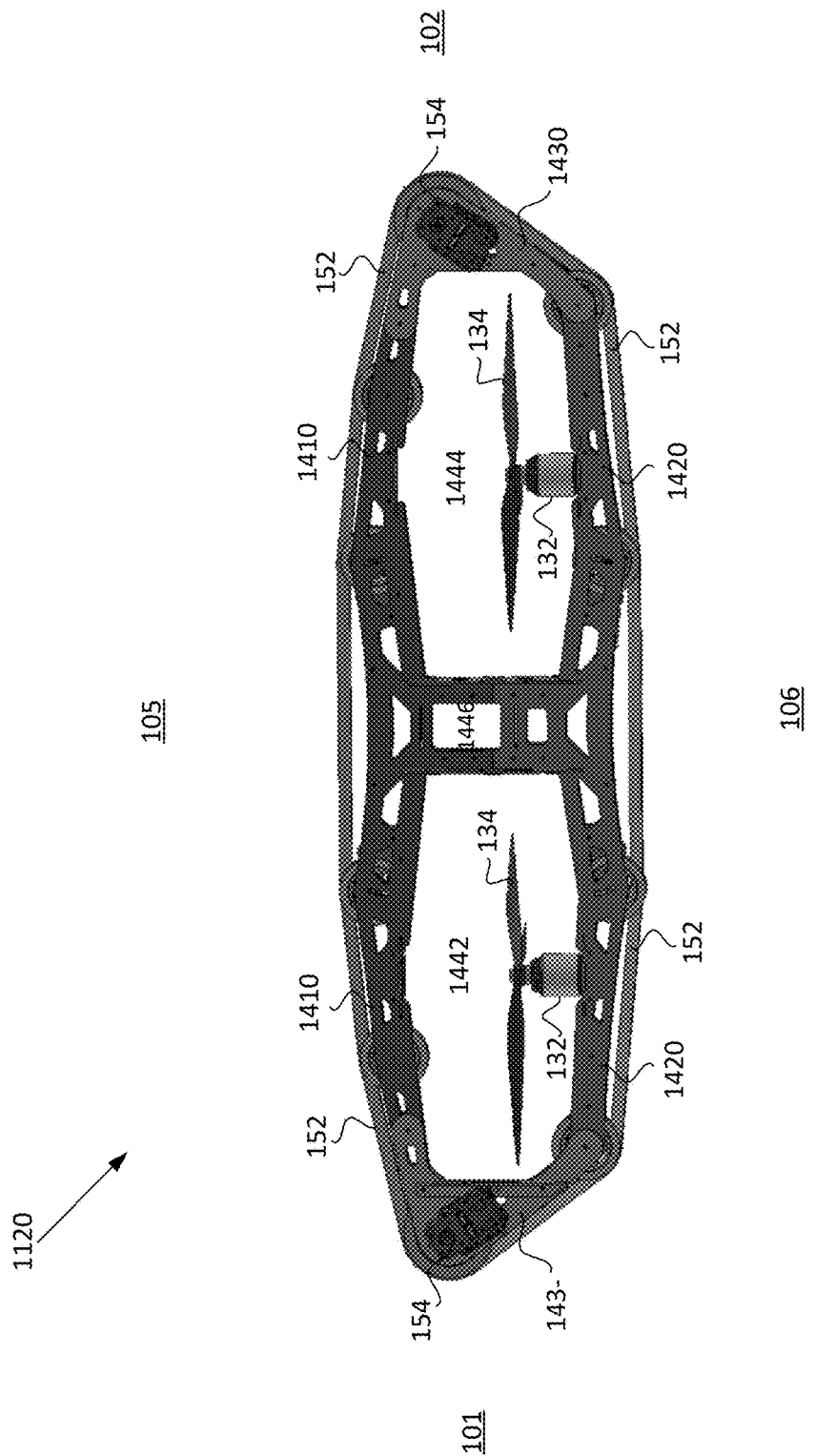
FIG. 29B shows a left view of a side assembly according to some embodiments.

FIG. 29B shows a left view of the side assembly 1120 according to some embodiments. With reference to FIGS. 1-29B, a configuration of the side assembly 1120 where a single, upward-facing rotor motor 132/propellers 134 assembly is used in each of the annular portions 1442 and 1444. Such a configuration may be preferable where the redundancy of the paired, opposing rotor motor 132/propellers 134 assemblies in each of the annular portions 1442 and 1444 is considered less important than the total cost of constructing the unmanned aerial vehicle 100.

Figure 29C:
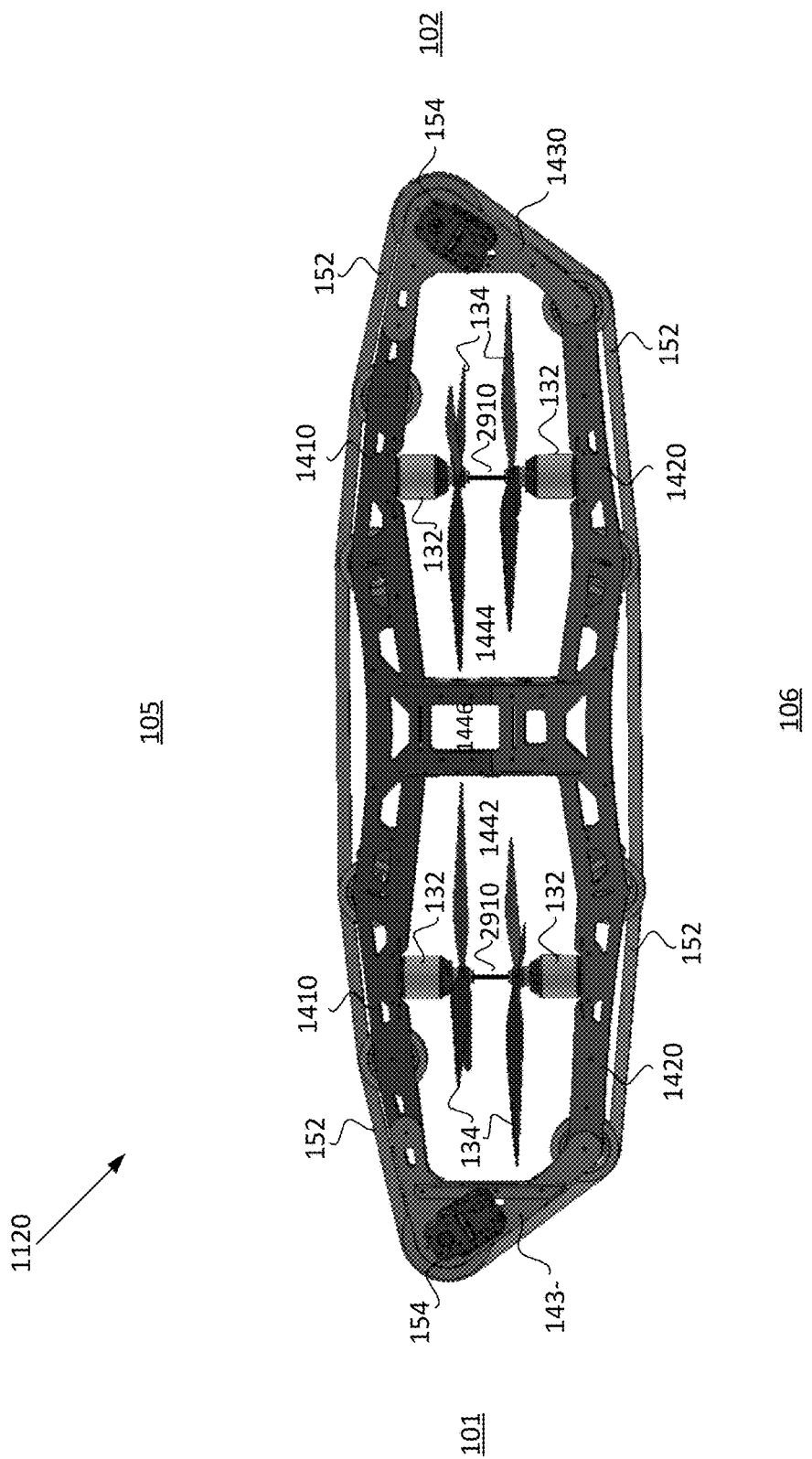
FIG. 29C shows a left view of a side assembly according to some embodiments.

FIG. 29C shows a left view of the side assembly 1120 according to some embodiments. With reference to FIGS. 1-29C, a bearing 2910 may be provided connecting each pair of opposing rotors of the rotor motor 132/propellers 134 assemblies. In some cases, a device reversing the direction of rotation of the bearing 2910 may be used on one end of the bearing 2910. Such a configuration may be preferable where it is determined that additional structural stability is preferred across each of the annular portions 1442 and 1444.

Figure 29D:
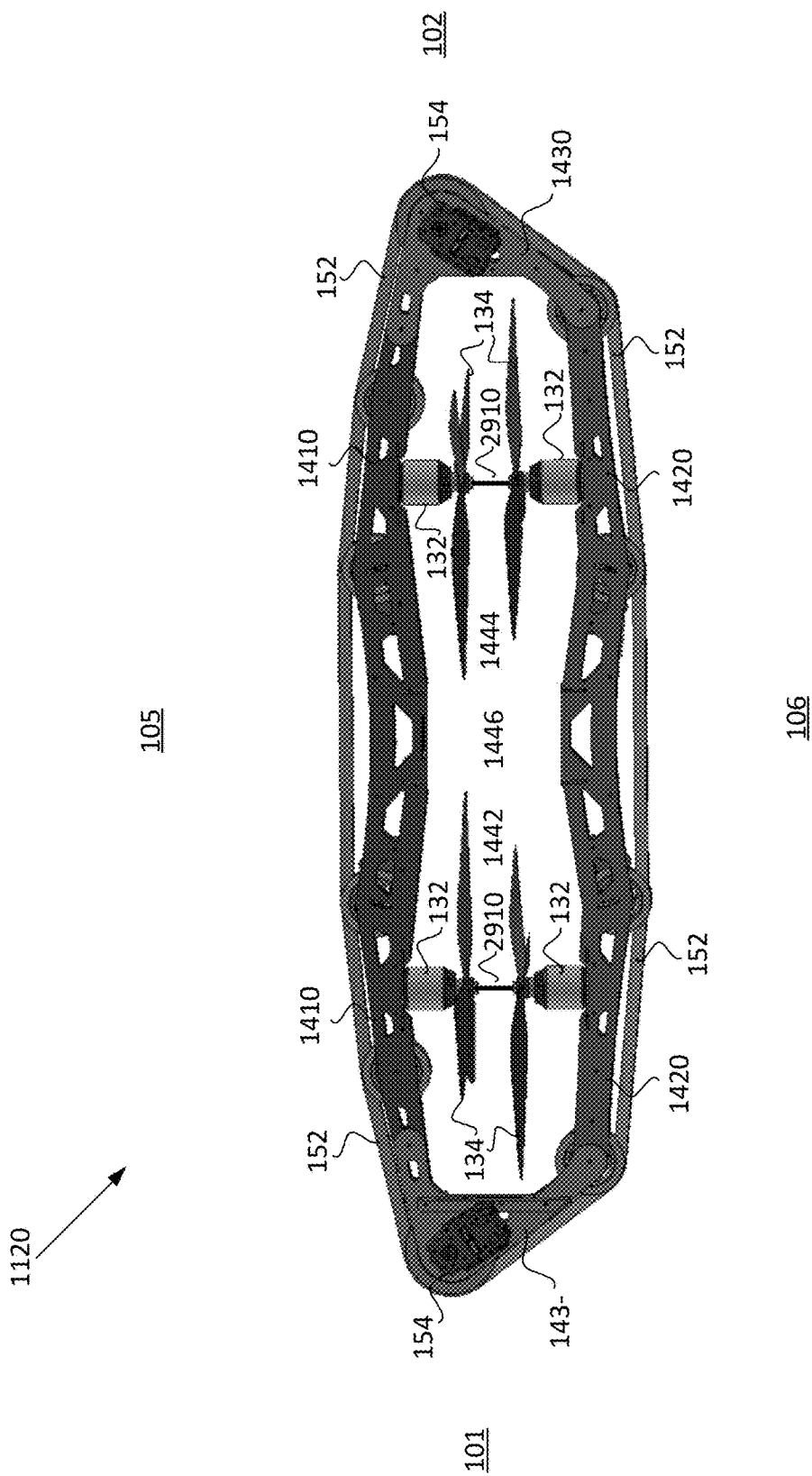
FIG. 29D shows a left view of a side assembly according to some embodiments.

FIG. 29D shows a left view of the side assembly 1120 according to some embodiments. With reference to FIGS. 1-29B, the bearing 2910 may be provided connecting each pair of opposing rotors of the rotor motor 132/propellers 134 assemblies. In some cases, a device reversing the direction of rotation of the bearing 2910 may be used on one end of the bearing 2910. The configuration of FIG. 29D may be preferable where it is determined that the structural stability provided by the bearing 2910 is sufficient to no longer need the vertical frame piece forming the third annular portion 1446 as shown in other embodiments of the side assembly 1120. Instead, if the center assembly 1110 is attached to the side assembly 1120 along the frame pieces 1410 or 1420, then the lack of the vertical frame piece forming the third annular portion 1446 may allow improved access to the interior channel of the center assembly 1110 as well as overall reduced weight of the unmanned aerial vehicle 100.

Figure 30:
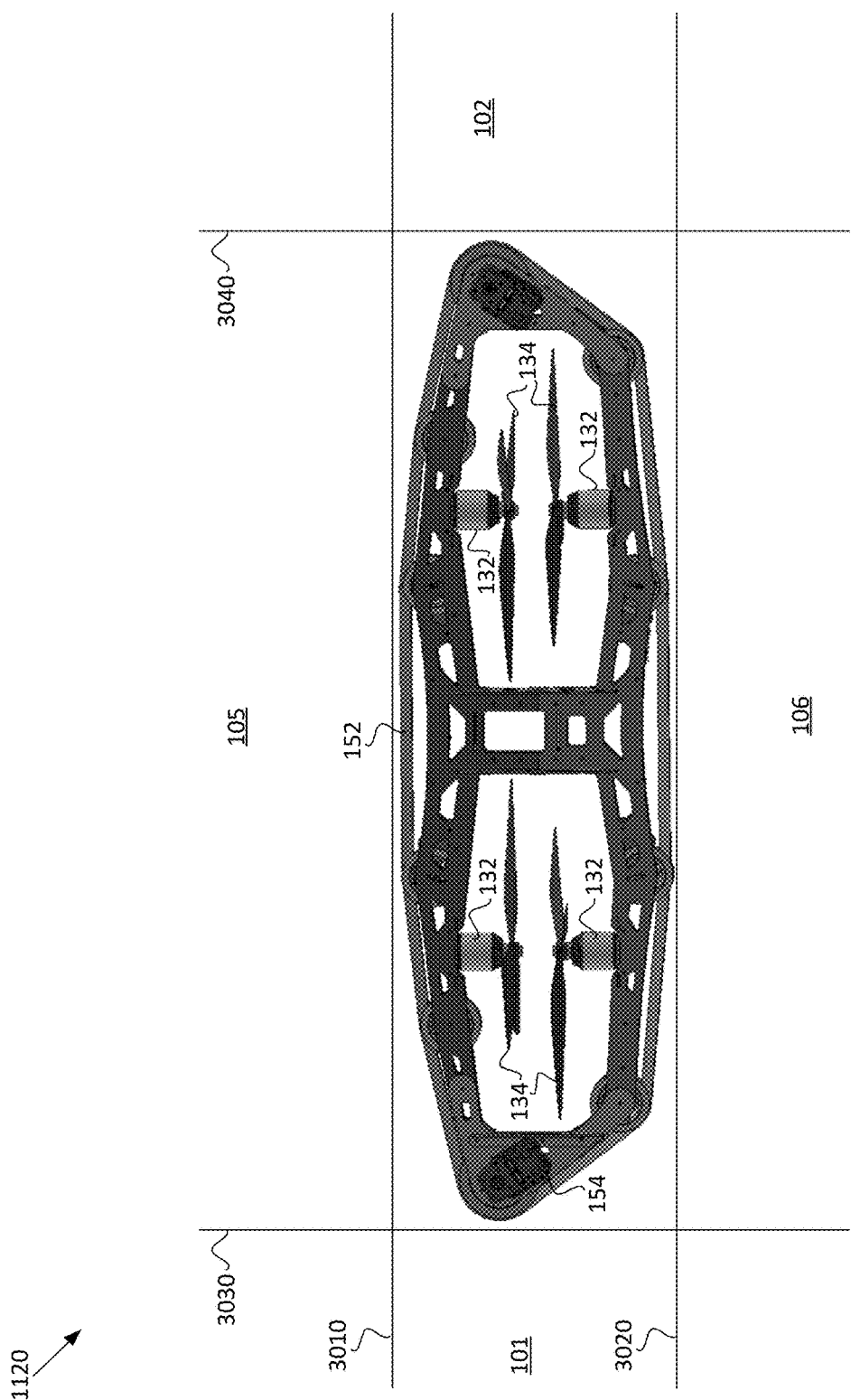
FIG. 30 shows a left view of a side assembly according to some embodiments.

FIG. 30 shows a left view of the side assembly 1120 according to some embodiments. FIG. 30 illustrates four planes 3010, 3020, 3030, and 3040. With reference to FIGS. 1-30, the plane 3010 is a top plane contacted by the side assembly 1120. The continuous track 152 may be provided so that the continuous track 152 forms a top-most surface of the side assembly 1120 (and the unmanned aerial vehicle 100) and thus contacts the top plane 3010. The plane 3020 is a bottom plane contacted by the side assembly 1120. The continuous track 152 may be provided so that the continuous track 152 forms a bottom-most surface of the side assembly 1120 (and the unmanned aerial vehicle 100) and thus contacts the bottom plane 3020. The plane 3030 is a front plane contacted by the side assembly 1120. The continuous track 152 may be provided so that the continuous track 152 forms a front-most surface of the side assembly 1120 (and the unmanned aerial vehicle 100) and thus contacts the front plane 3030. The plane 3040 is a rear plane contacted by the side assembly 1120. The continuous track 152 may be provided so that the continuous track 152 forms a rear-most surface of the side assembly 1120 (and the unmanned aerial vehicle 100) and thus contacts the rear plane 3040. Such a configuration may be advantageous in that the continuous track 152 allows the continuous track 152 to apply a ground propulsion force to planes on four different sides of the side assembly 1120 and the unmanned aerial vehicle 100. This in turn may provide the unmanned aerial vehicle 100 with a high degree of maneuverability when moving along a fixed plane such as the ground.

Figure 31:
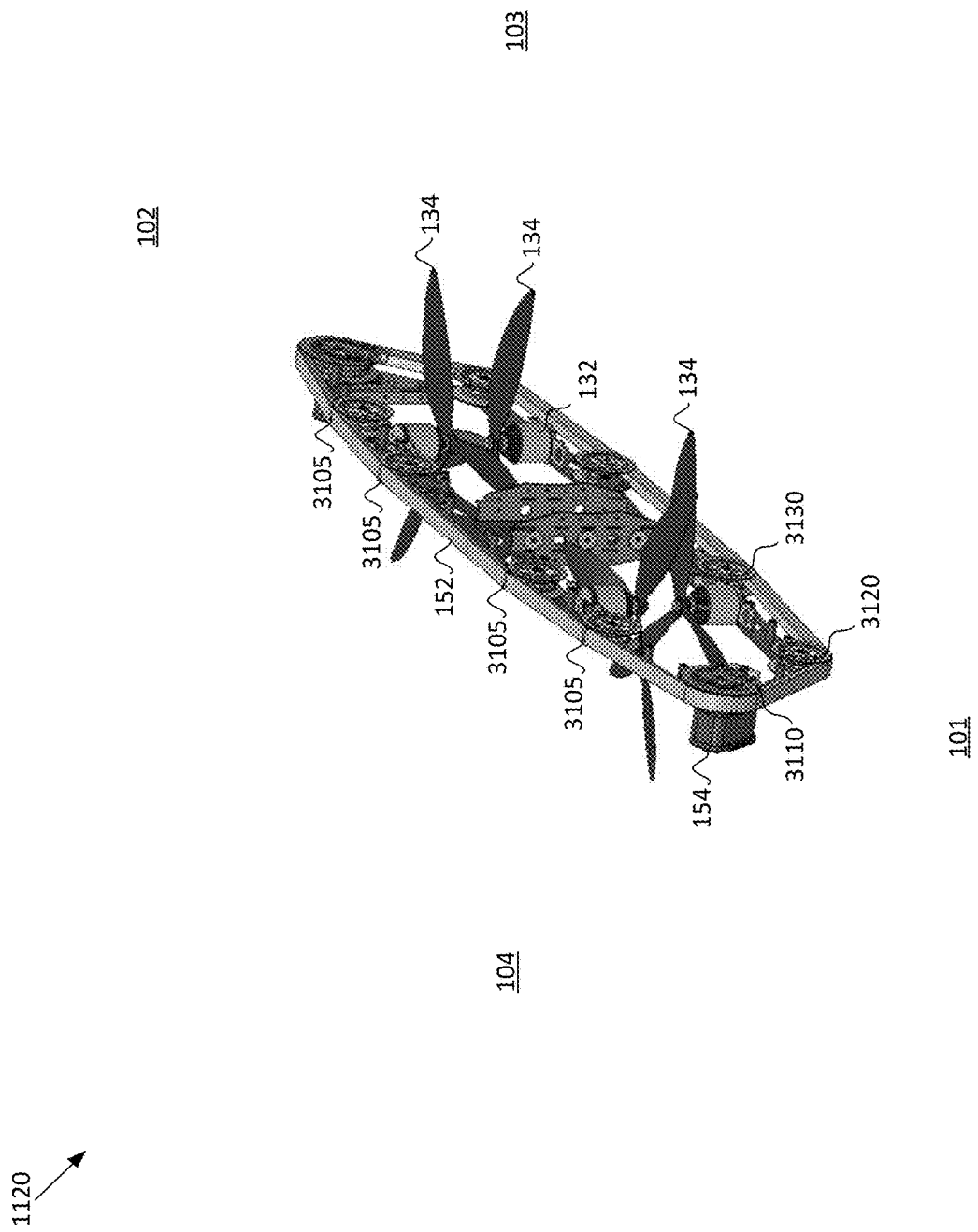
FIG. 31 shows a perspective view of a side assembly according to some embodiments.
Figure 32:
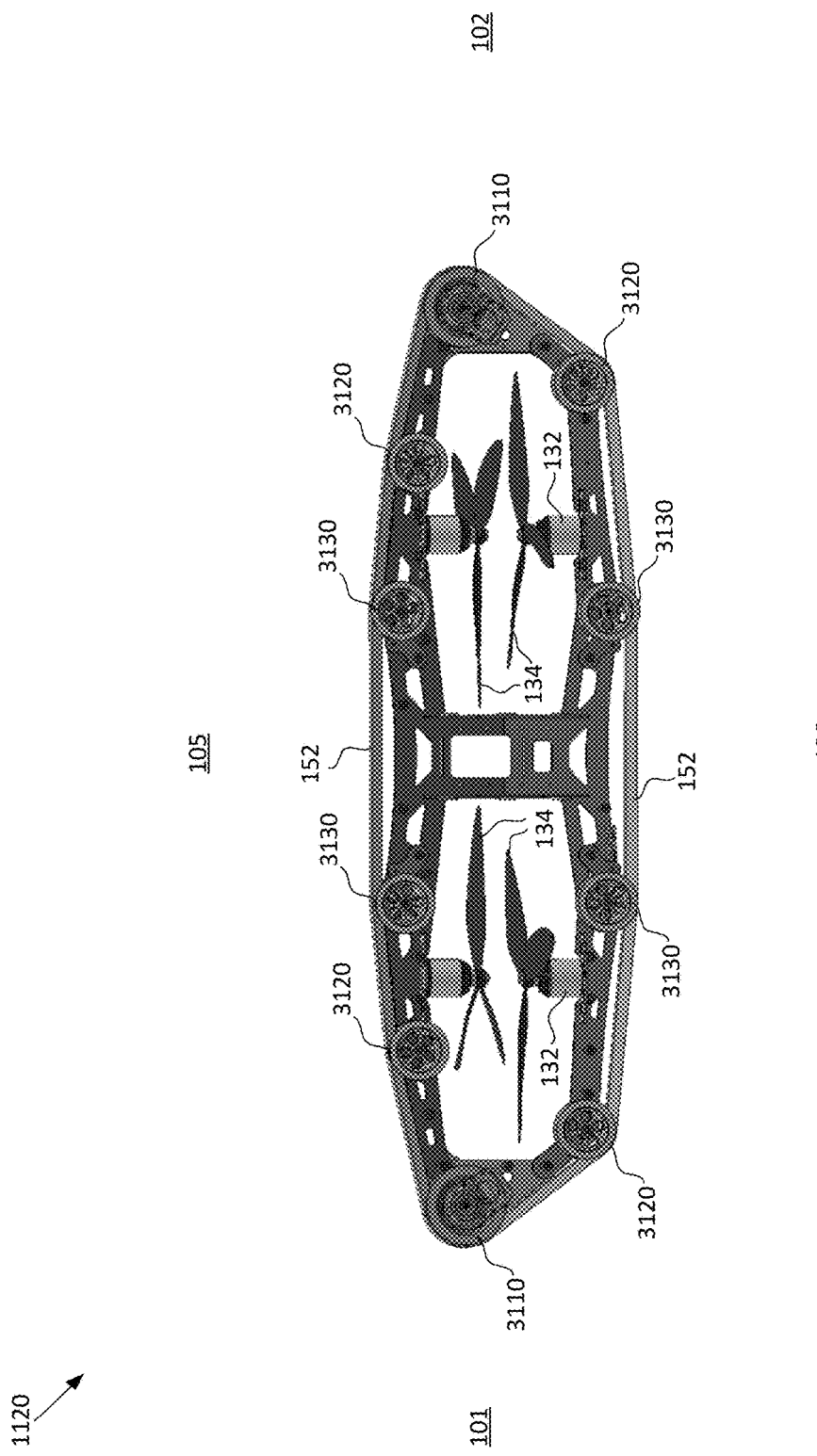
FIG. 32 shows a left view of a side assembly according to some embodiments.
Figure 33:
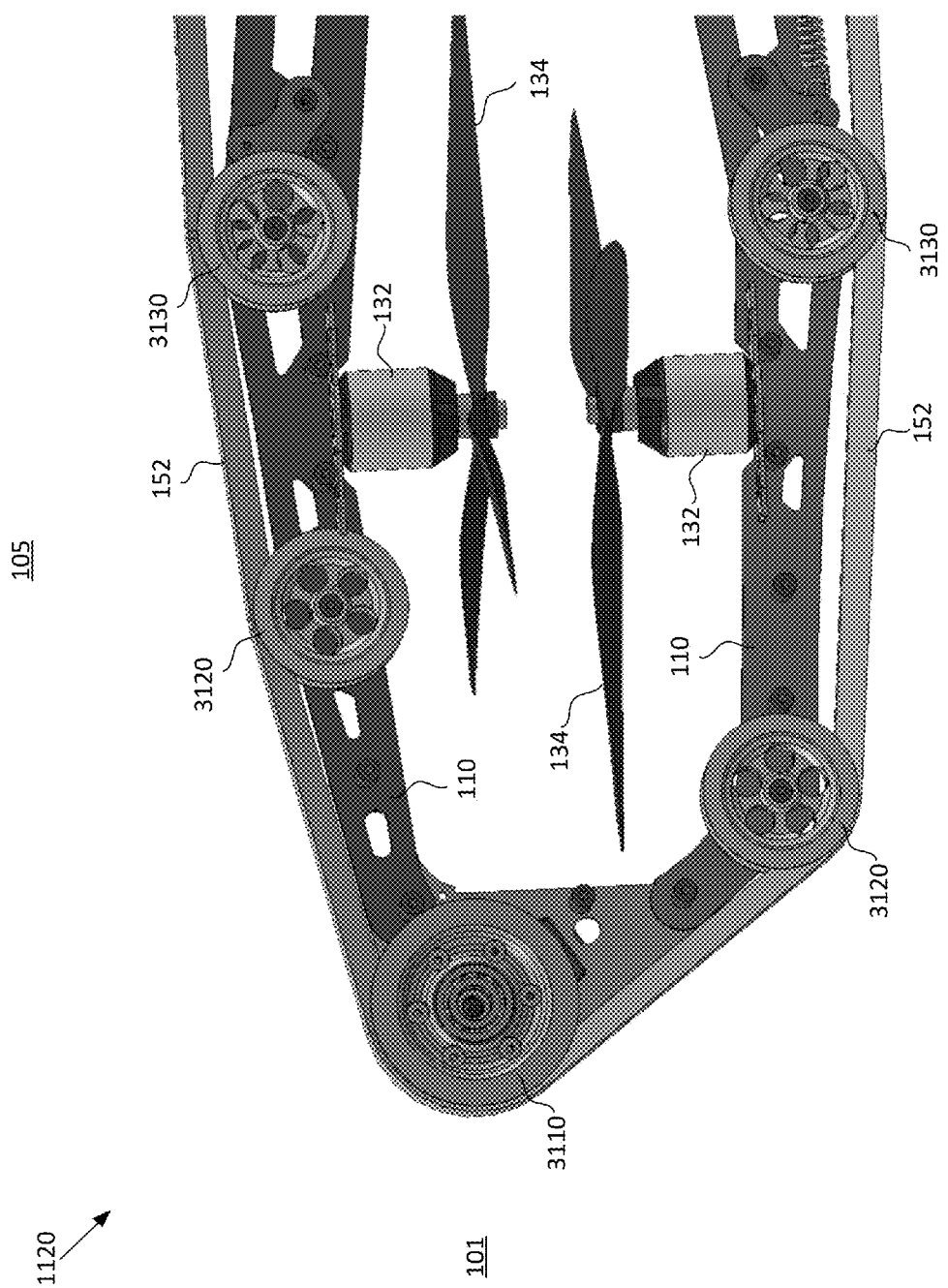
FIG. 33 shows a left view of a side assembly according to some embodiments.

FIG. 31 shows a perspective view of the side assembly 1120 according to some embodiments. In FIG. 31, one wall of the double wall structure of the side assembly 1120 is shown, while the other wall has been removed in order to better demonstrate various features related to the ground propulsion devices. In other words, either of the first frame wall 1310 or the second frame wall 1320 is shown in FIG. 31, while the other has been omitted. FIG. 32 shows a left view of the side assembly 1120 according to some embodiments. FIG. 33 shows a left view of the side assembly 1120 according to some embodiments. In FIG. 33, the features of the side assembly 1120 are enlarged as compared to FIG. 32 in order to better illustrate details of drive wheels 3110, fixed tensioning wheels 3120, and sprung tensioning wheels 3130.

With reference to FIGS. 1-33, the side assembly 1120 may include lateral indentations 3105, the drive wheels 3110, the fixed tensioning wheels 3120, and the sprung tensioning wheels 3130. The lateral indentations 3105 may be provided as slight depressions in the continuous track 152 running laterally across the width of the continuous track 152. The lateral indentations 3105 may allow the continuous track 152 to more easily flex around the curves created by the frame 110 of the side assembly 1120 and the various wheels 3110, 3120, and 3130. The drive wheels 3110 may be wheels connected to the continuous track motors 154 for applying a driving force to the continuous track 152. It may be through the rotation of the drive wheels 3110 that the continuous track motors 154 cause the continuous track 152 to revolve. The fixed tensioning wheels 3120 may be wheels fixedly mounted on the frame 110 of the side assembly 1120. The fixed tensioning wheels 3120 may rotate freely and provide a path over which the continuous track 152 revolves. The sprung tensioning wheels 3130 may be wheels mounted on a sprung portion of the frame 110 of the side assembly 1120. The sprung tensioning wheels 3130 may rotate freely and provide a path over which the continuous track 152 revolves similar to the fixed tensioning wheels 3120. However, the sprung tensioning wheels 3130 may absorb the initial force of impacting a surface as the side assembly 1120 and the unmanned aerial vehicle 100 make initial contact with the surface. In addition, the sprung tensioning wheels 3130 may absorb the minor forces caused by slight variations in surface features for a surface over which the side assembly 1120 and the unmanned aerial vehicle 100 are moving. In both these ways, the sprung tensioning wheels 3130 may provide a sort of shock absorption or suspension function for the side assembly 1120 and the unmanned aerial vehicle 100. The tensioning wheels 3120 and 3130 may be referred to as "pulleys" in some situations.

Figure 34:
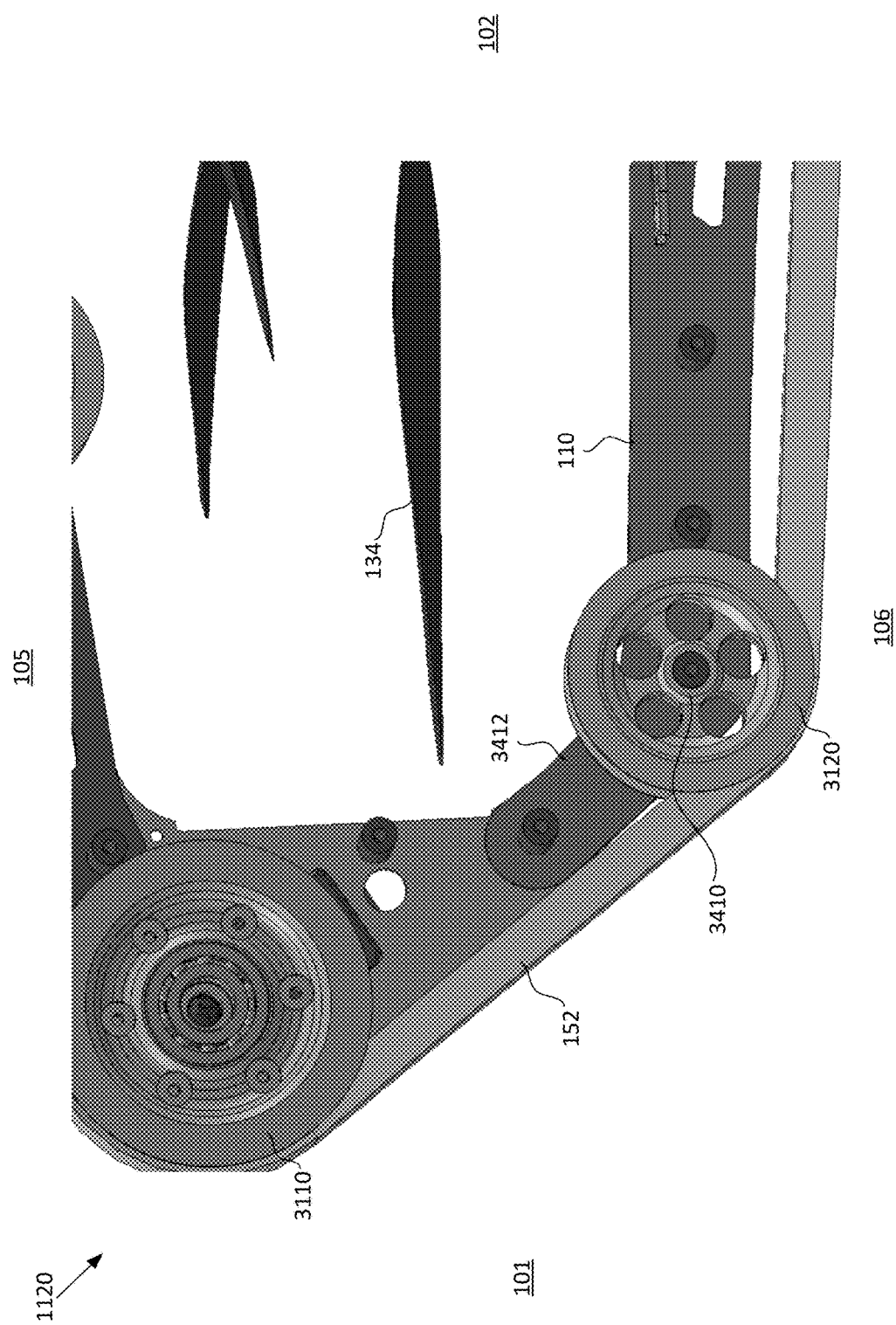
FIG. 34 shows a left view of a side assembly according to some embodiments.

FIG. 34 shows a left view of the side assembly 1120 according to some embodiments. In FIG. 34, the features of the side assembly 1120 are enlarged as compared to both FIG. 32 and FIG. 33 in order to better illustrate details of the fixed tensioning wheel 3120. With reference to FIGS. 1-34, the fixed tensioning wheel 3120 maybe centrally mounted at a point 3410 on a fixed frame piece 3412 of the frame 110. The fixed tensioning wheel 3120 may be mounted with a rivet, pin, or other similar fastening element at the point 3410. The fixed tensioning wheel 3120 may be able to rotate freely around the point 3410 in both clockwise and counterclockwise directions. However, the fixed tensioning wheel 3120 may not be a driven wheel, so the fixed tensioning wheel 3120 may not directly apply any force to the continuous track 152 in order to cause the continuous track 152 to revolve. However, the fixed tensioning wheel 3120 may provide a path or guide along which the continuous track 152 revolves. The fixed frame piece 3412 may be any piece of the frame 110 that does not substantially move with respect to other fixed pieces of the frame 110.

Figure 35:
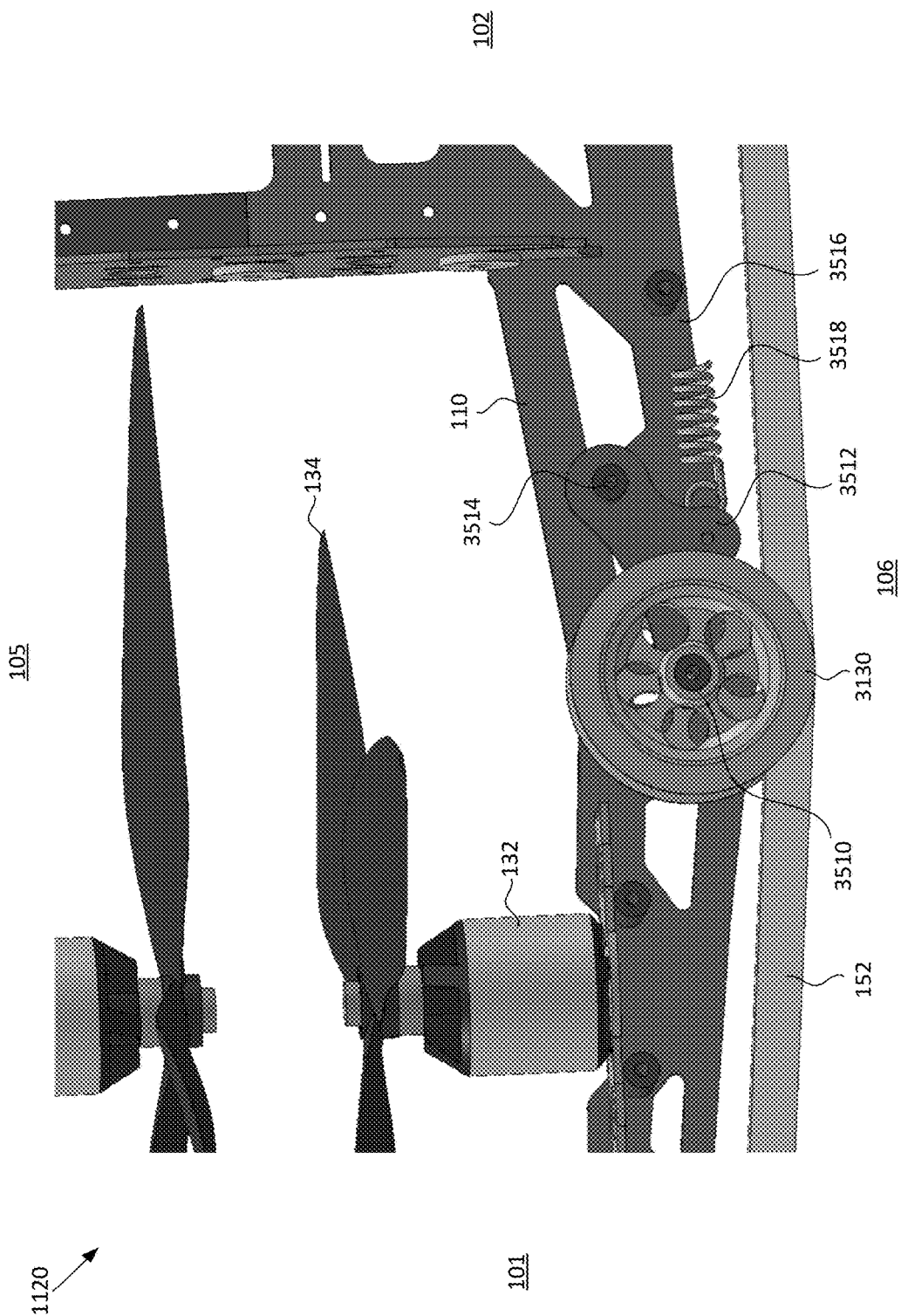
FIG. 35 shows a left view of a side assembly according to some embodiments.

FIG. 35 shows a left view of the side assembly 1120 according to some embodiments. In FIG. 35, the features of the side assembly 1120 are enlarged as compared to both FIG. 32 and FIG. 33 in order to better illustrate details of the sprung tensioning wheel 3130. With reference to FIGS. 1-35, the sprung tensioning wheel 3130 may be centrally mounted at a point 3510 on a mobile frame piece 3512 of the frame 110. The mobile frame piece 3512 is mounted at a point 3514 onto a fixed frame piece 3516 of the frame 110. A spring 3518 is connected between the mobile frame piece 3512 and the fixed frame piece 3516. The sprung tensioning wheel 3130 may be mounted with a rivet, pin, or other similar fastening element at the point 3510. The sprung tensioning wheel 3130 may be able to rotate freely around the point 3510 in both clockwise and counterclockwise directions. However, the sprung tensioning wheel 3130 may not be a driven wheel, so the sprung tensioning wheel 3130 may not directly apply any force to the continuous track 152 in order to cause the continuous track 152 to revolve. However, the sprung tensioning wheel 3130 may provide a path or guide along which the continuous track 152 revolves.

The mounting of the sprung tensioning wheel 3130 on the mobile frame piece 3512 may allow the sprung tensioning wheel 3130 to move with respect to fixed pieces of the frame 110. For example, the mobile frame piece 3512 may rotate around the point 3514, which in turn may cause the sprung tensioning wheel 3130 to move in and out (back and forth between the top direction 105 and the bottom direction 106) of the frame 110. The range of motion of the mobile frame piece 3512 may be limited by the attachment of the spring 3518 between the mobile frame piece 3512 and the fixed frame piece 3516. In addition, the attachment of the spring 3518 between the mobile frame piece 3512 and the fixed frame piece 3516 may cause the mobile frame piece 3512 and thus the sprung tensioning wheel 3130 to return to a particular position of rest along their respective ranges of motion.

The configuration of the sprung tensioning wheel 3130 on the mobile frame piece 3512 may allow the sprung tensioning wheel 3130 to perform a shock absorption or suspension shock absorption or suspension function for the side assembly 1120 and the unmanned aerial vehicle 100. For example, when the side assembly 1120 and the unmanned aerial vehicle 100 initially contact a bottom plane on the bottom direction 106 of the side assembly 1120 and the unmanned aerial vehicle 100, the sprung tensioning wheel 3130 may initially move inward (in the top direction 105) instead of passing the received force on to the fixed portions of the frame 110 and thus the rest of the side assembly 1120 and the unmanned aerial vehicle 100. This may allow a more controlled landing on the bottom plane (e.g., the bottom plane 3020 of FIG. 30) as well as reducing the risk of the transmitted force causing damage to components, such as electronic components, provided on the unmanned aerial vehicle 100.

Figure 36:
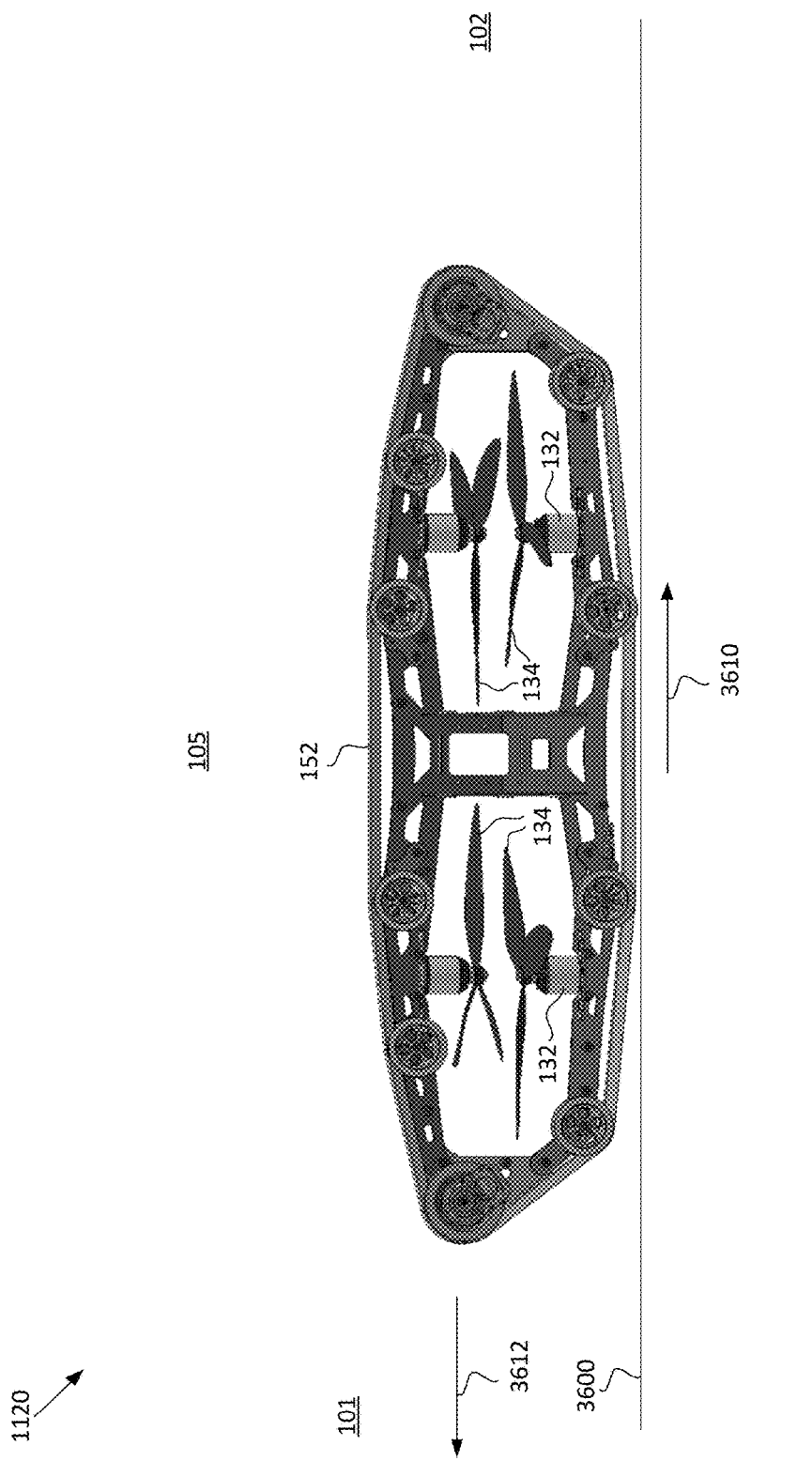
FIG. 36 shows a left view of a side assembly according to some embodiments.

FIG. 36 shows a left view of the side assembly 1120 according to some embodiments. FIG. 36 illustrates various forces that cause the side assembly 1120 and the unmanned aerial vehicle 100 to move along a bottom plane 3600 (e.g., the bottom plane 3020 of FIG. 30) on which the unmanned aerial vehicle 100 is positioned. Force vectors 3610 and 3612 are shown. With reference to FIGS. 1-36, the force vector 3610 demonstrates a force applied by the continuous track 152 against the bottom plane 3600. The application of the force vector 3610 against the bottom plane 3600 may cause the side assembly 1120 and the unmanned aerial vehicle 100 to travel in the direction indicated by the force vector 3612.

Figure 37:
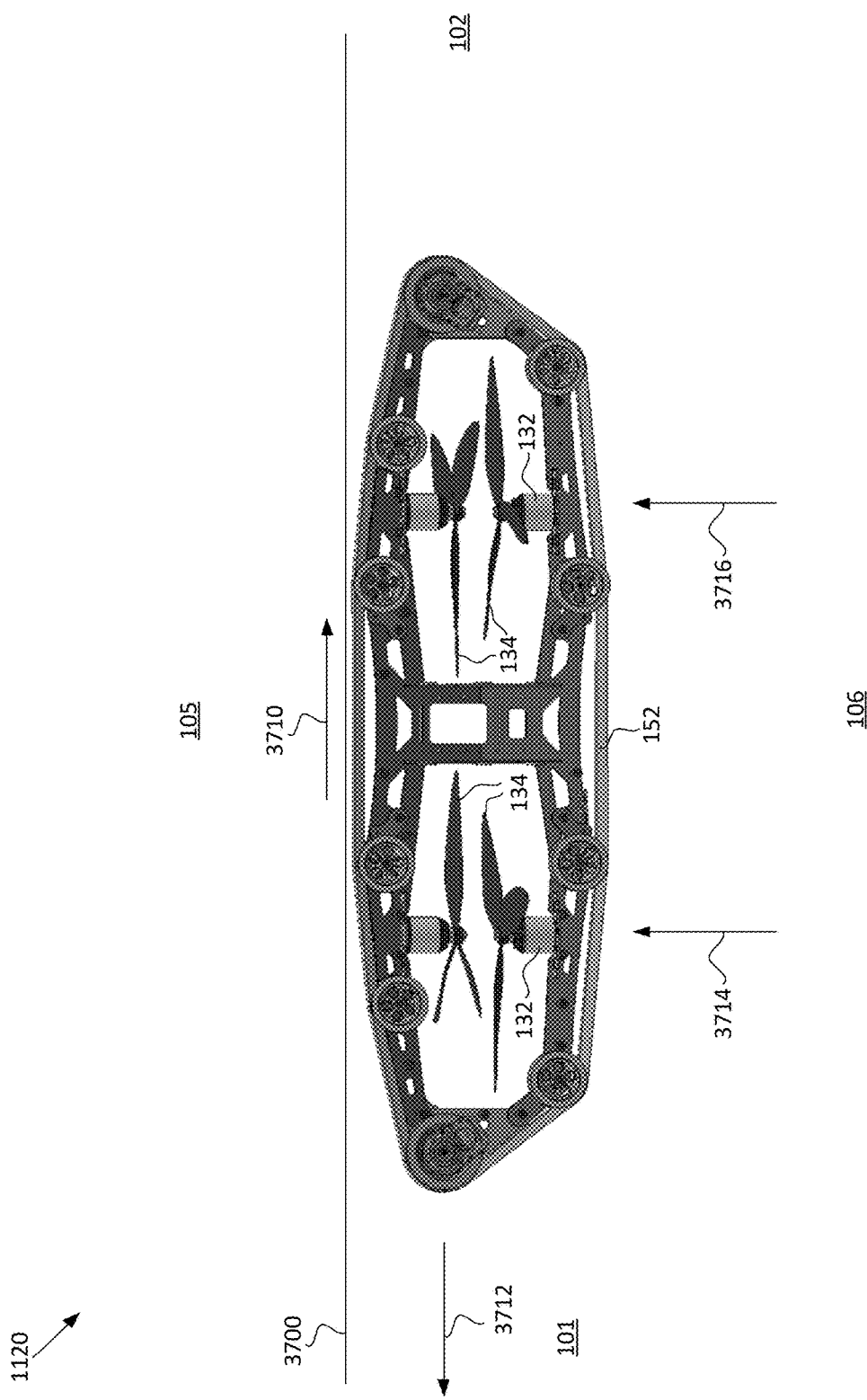
FIG. 37 shows a left view of a side assembly according to some embodiments.

FIG. 37 shows a left view of the side assembly 1120 according to some embodiments. FIG. 37 illustrates various forces that cause the side assembly 1120 and the unmanned aerial vehicle 100 to move along a top plane 3700 (e.g., the top plane 3010 of FIG. 30) on which the unmanned aerial vehicle 100 is positioned. Force vectors 3710, 3712, 3714, and 3716 are shown. With reference to FIGS. 1-37, the force vector 3714 demonstrates a lifting force created by the propellers 134 in a front annular opening of the side assembly 1120. The force vector 3716 demonstrates a lifting force created by the propellers 134 in a rear annular opening of the side assembly 1120. The combination of the lifting force vectors 3714 and 3716 may cause the side assembly 1120 and the unmanned aerial vehicle 100 to remain firmly positioned against the top plane 3700. The force vector 3710 demonstrates a force applied by the continuous track 152 against the top plane 3700. The application of the force vector 3710 against the top plane 3700 may cause the side assembly 1120 and the unmanned aerial vehicle 100 to travel in the direction indicated by the force vector 3712. In this way, the side assembly 1120 and the unmanned aerial vehicle 100 may be able to use ground propulsion in combination with aerial propulsion to "drive" or otherwise move across a fixed plane provided above the side assembly 1120 and the unmanned aerial vehicle 100.

FIGS. 38A, 38B, 38C, and 38D show left views of the side assembly 1120 according to some embodiments. FIGS. 38A-38D show a series of forces created by the side assembly 1120 and the unmanned aerial vehicle 100 in order to pitch the side assembly 1120 and the unmanned aerial vehicle 100 from a bottom plane 3800 (e.g., the bottom plane 3020 of FIG. 30) up onto a vertical plane 3802 (e.g., the front plane 3030 of FIG. 30) and then move up the vertical plane 3802.

With reference to FIGS. 1-38D, a force vector 3810 demonstrates a lifting force created by the propellers 134 in a rear annular opening of the side assembly 1120. In this situation, no lifting force is generated by the propellers 134 in a front annular opening of the side assembly 1120.

Figure 38A:
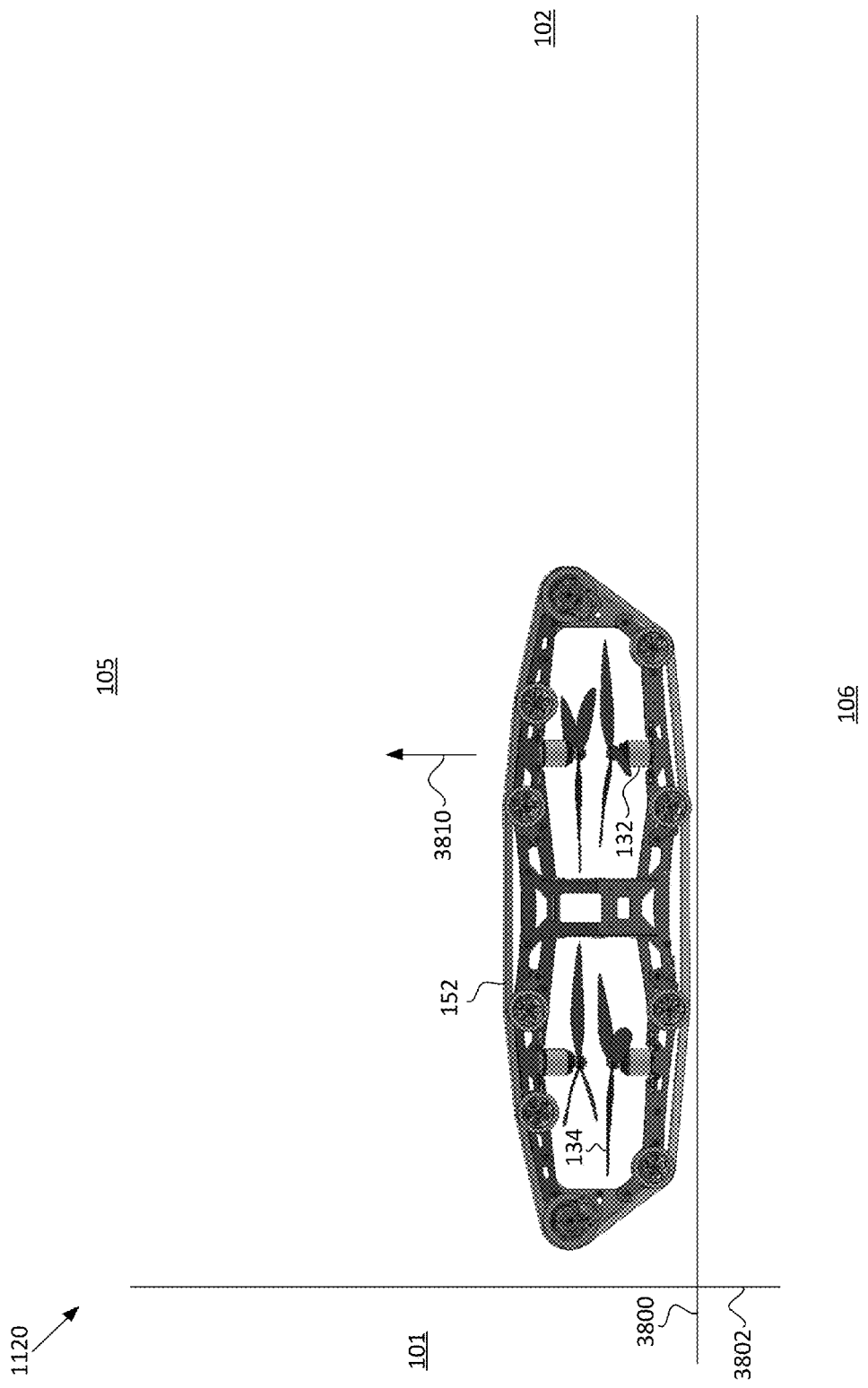
FIG. 38A shows a left view of a side assembly according to some embodiments.
Figure 38B:
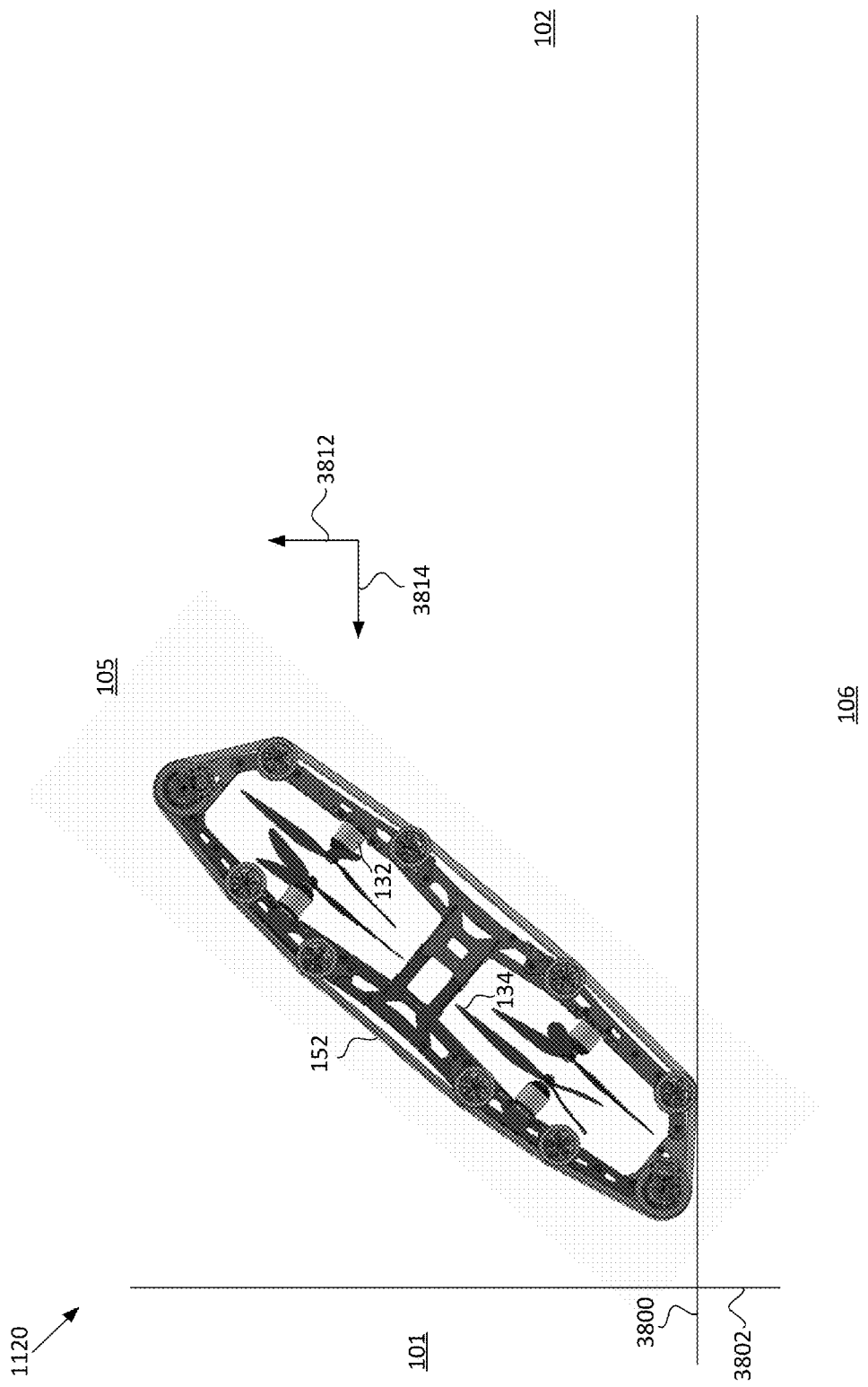
FIG. 38B shows a left view of a side assembly according to some embodiments.

FIG. 38B shows the result of having applied the lifting force vector 3810. In particular, With reference to FIGS. 1-38B, the rear portion of the side assembly 1120 and the unmanned aerial vehicle 100 has begun to lift off the bottom plane 3800 while the front portion of the side assembly 1120 and the unmanned aerial vehicle 100 remains stationary on the bottom plane 3800. The combination of the force vectors 3812 and 3814 demonstrate that the lifting force created by the rear propellers creates forces in both the vertical and horizontal direction. In particular, the force vector 3812 shows a lifting force that lifts the side assembly 1120 and the unmanned aerial vehicle 100 up and away from the bottom plane 3800. The force vector 3814 shows a lifting force that pulls the side assembly 1120 and the unmanned aerial vehicle 100 in towards the front plane 3802.

FIG. 38C shows the result of having applied the force vectors 3812 and 3814. In particular, With reference to FIGS. 1-38C, the side assembly 1120 and the unmanned aerial vehicle 100 is positioned vertically along the front plane 3802. At this point, both front and rear propellers are used to generate the force vectors 3816 and 3818, respectively. The force vectors 3816 and 3818 may be effective to cause the side assembly 1120 and the unmanned aerial vehicle 100 to be "sucked onto" the front plane 3802. That is, the force vectors 3816 and 3818 may be effective to cause the side assembly 1120 and the unmanned aerial vehicle 100 to remain up against the front plane 3802 instead of falling away from the front plane 3802.

In FIG. 38D, the side assembly 1120 and the unmanned aerial vehicle 100 begin to move up the front plane 3802. With reference to FIGS. 1-38D, the continuous track 152 applies the force vector 3820 against the front plane 3802, causing the side assembly 1120 and the unmanned aerial vehicle 100 to move in the direction indicated by force vector 3822. The force vectors 3816 and 3818 are maintained so that the side assembly 1120 and the unmanned aerial vehicle 100 do not fall away from the front plane 3802.

Figure 39A:
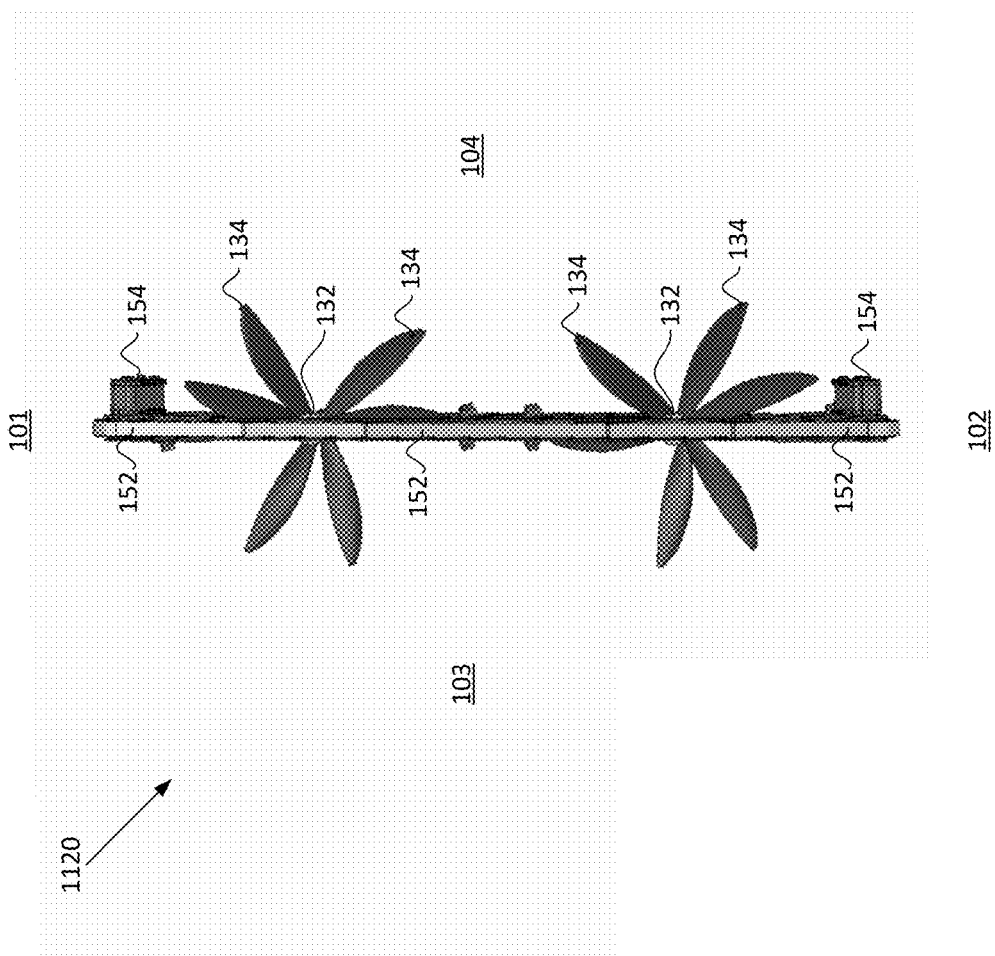
FIG. 39A shows a top view of a side assembly according to some embodiments.

FIG. 39A shows a top view of the side assembly 1120 according to some embodiments. With reference to FIGS. 1-39A, in some embodiments, two continuous track motors 154 may be attached to the side assembly 1120. One continuous track motor 154 is provided towards a front direction of the side assembly 1120, while the other continuous track motor 154 is provided towards a rear direction of the side assembly 1120. The two continuous track motors 154 may provide redundant driving power to the continuous track 152, so that the continuous track 152 can still be revolved even if one of the two continuous track motors 154 fails.

Figure 39B:
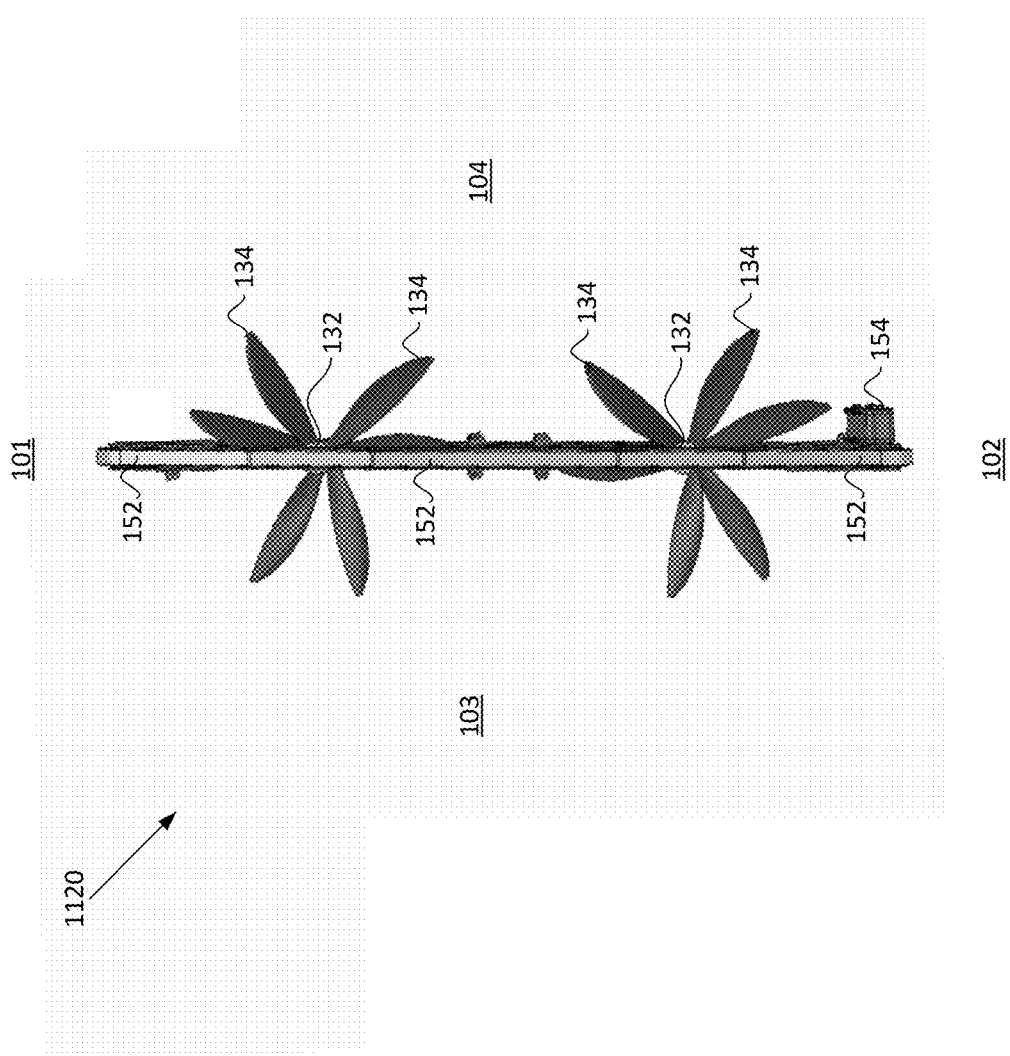
FIG. 39B shows a top view of a side assembly according to some embodiments.

FIG. 39B shows a top view of the side assembly 1120 according to some embodiments. With reference to FIGS. 1-39B, in some embodiments, one continuous track motor 154 may be attached to the side assembly 1120. One continuous track motor 154 is provided towards a rear direction of the side assembly 1120. Such a configuration may be preferable wherein the additional cost and weight of including a second continuous track motor 154 is not preferred despite the redundant drive support that the second continuous track motor 154 would provide.

Figure 39C:
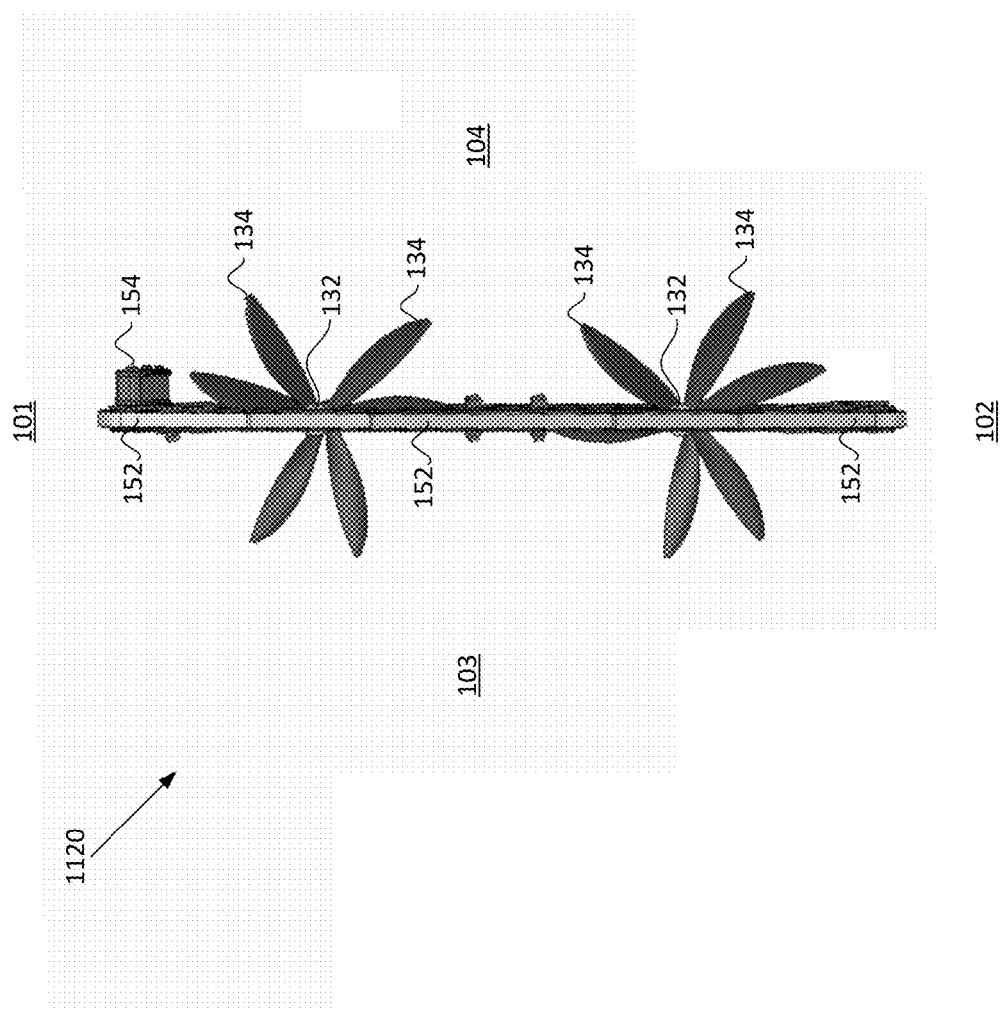
FIG. 39C shows a top view of a side assembly according to some embodiments.

FIG. 39C shows a top view of the side assembly 1120 according to some embodiments. With reference to FIGS. 1-39C, in some embodiments, one continuous track motors 154 may be attached to the side assembly 1120. One continuous track motor 154 is provided towards a front direction of the side assembly 1120. Such a configuration may be preferable wherein the additional cost and weight of including a second continuous track motor 154 is not preferred despite the redundant drive support that the second continuous track motor 154 would provide.

Figure 40:
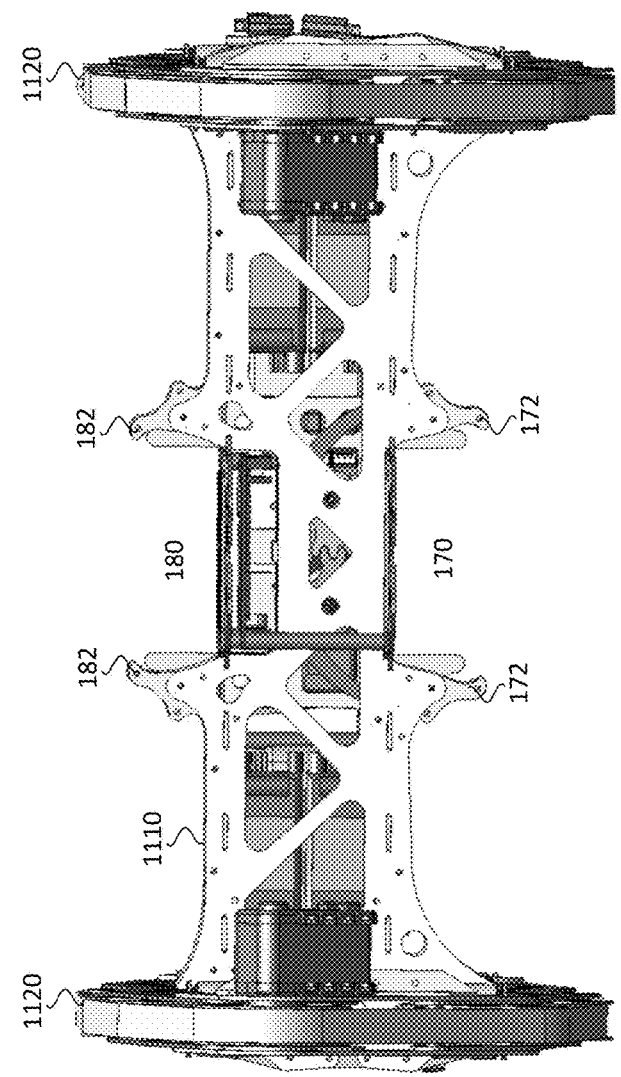
FIG. 40 shows a front view of an unmanned aerial vehicle according to some embodiments.

FIG. 40 shows a front view of the unmanned aerial vehicle 100 according to some embodiments. FIG. 40 shows the side assemblies 1120 and the center assembly 1110 of the unmanned aerial vehicle 100. In addition, FIG. 40 shows the payload interfaces 170 and 180 and the gripper fingers 172 and 182 as discussed.

Figure 41:
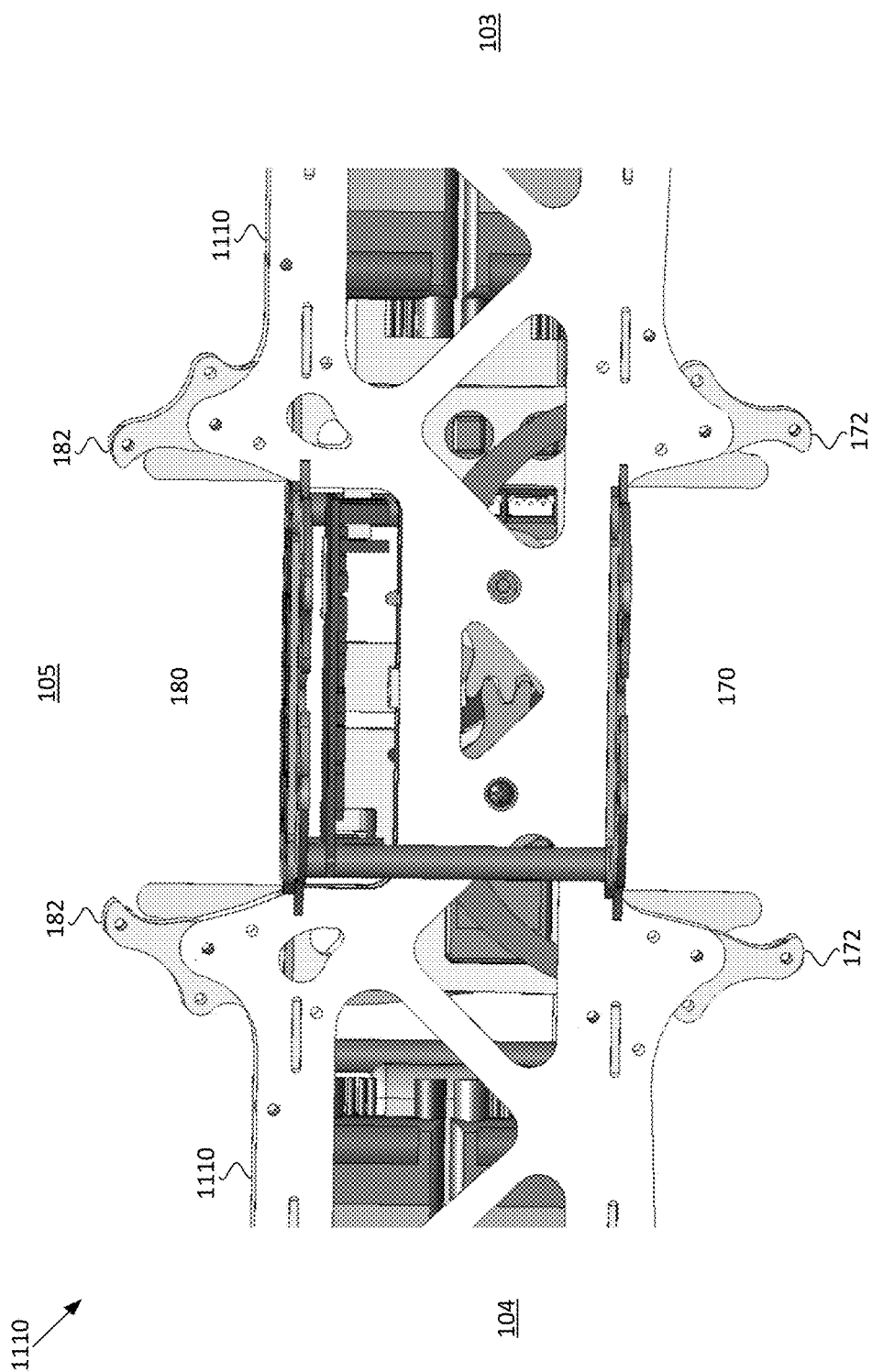
FIG. 41 shows a front view of an unmanned aerial vehicle according to some embodiments.

FIG. 41 shows a front view of the unmanned aerial vehicle 100 according to some embodiments. FIG. 41 shows the same view as FIG. 40, however the portion of the center assembly 1110 around the payload interfaces 170 and 180 is enlarged for more distinct viewing of those and related features. The payload interfaces 170 and 180 may be designed to engage with various payload objects. Engaging with payload objects may include gripping the payload objects in order to lift them up or pull them down and carry them away. Engaging with payload objects may include gripping the payload objects may further include establishing electrical connections between the payload interface 170 or 180 and the payload object.

Figure 42:
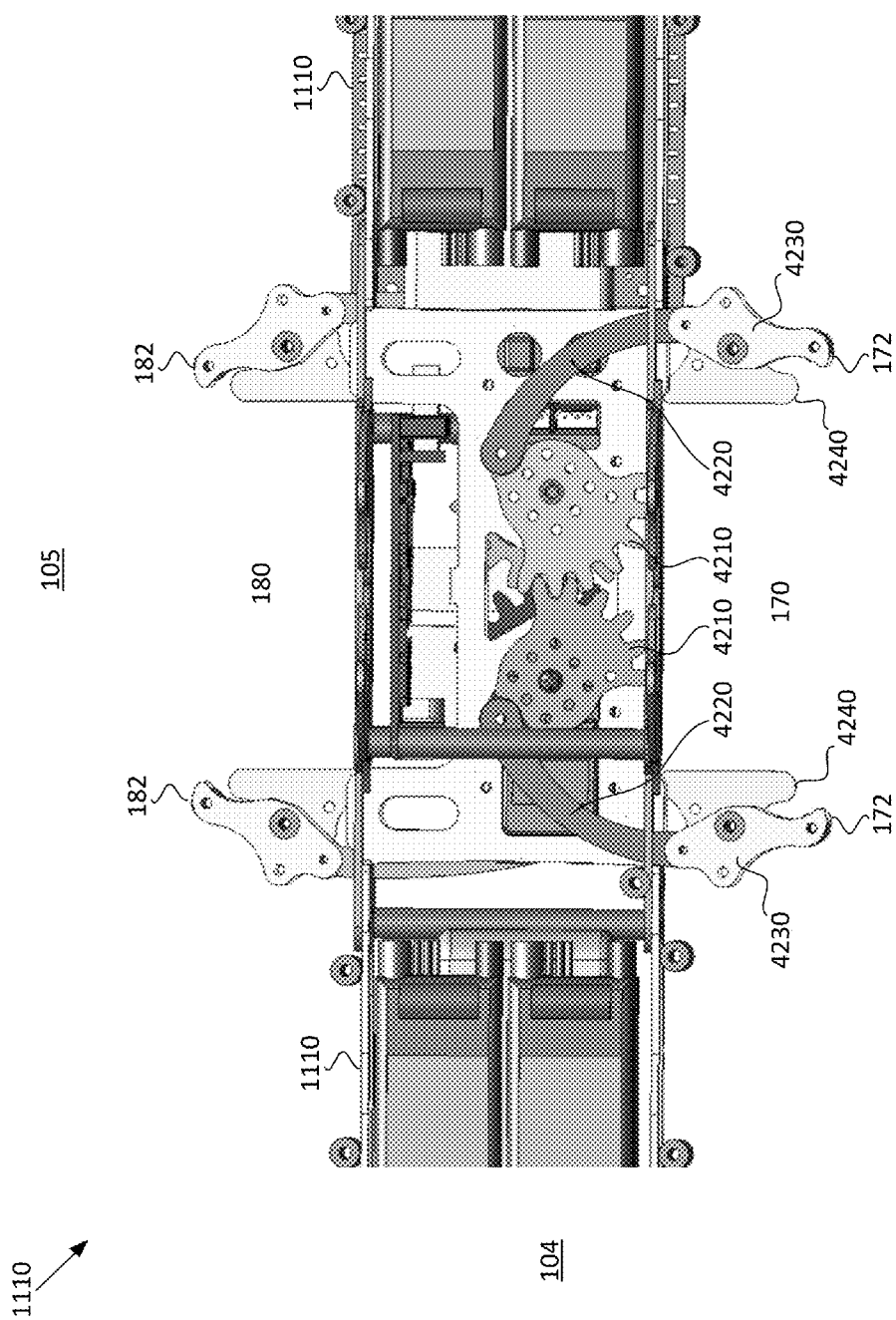
FIG. 42 shows a front view of an unmanned aerial vehicle according to some embodiments.

FIG. 42 shows a front view of the unmanned aerial vehicle 100 according to some embodiments. FIG. 42 shows essentially the same view as FIG. 41. However, in FIG. 42, a portion of the frame 110 of the center assembly 1110 has been removed to allow further illustration of features inside the center assembly 1110. In particular, the front frame wall 1710 has been removed from FIG. 42.

With reference to FIGS. 1-42, the unmanned aerial vehicle 100 may include gears 4210, levers 4220, and gripper hand pieces 4230. The gears 4210 may be coupled to payload interface motors (not shown) provided in the center assembly 1110. Payload interface motors may be servomotors or other electronically controlled motors controllable by the processor 802 of unmanned aerial vehicle 100. As the gears 4210 rotate about central pivots, the levers 4220 are caused to move essentially up and down (between the top direction 105 and the bottom direction 106). As the levers 4220 move essentially up and down, the gripper hand pieces 4230 are caused to rotate around a fixed pivot, thereby causing the gripper fingers 172 to move from the displayed position to and from a position with the gripper fingers 172 up and in towards the center of the first payload interface 170.

Tabs 4240 may be configured to interact with a feature of a payload object or payload clip in order to assist the first payload interface 170 in aligning the gripper fingers 172 with the object to be engaged. Further illustration of the tabs 4240 and corresponding payload object features are shown elsewhere in the present description.

Figure 43:
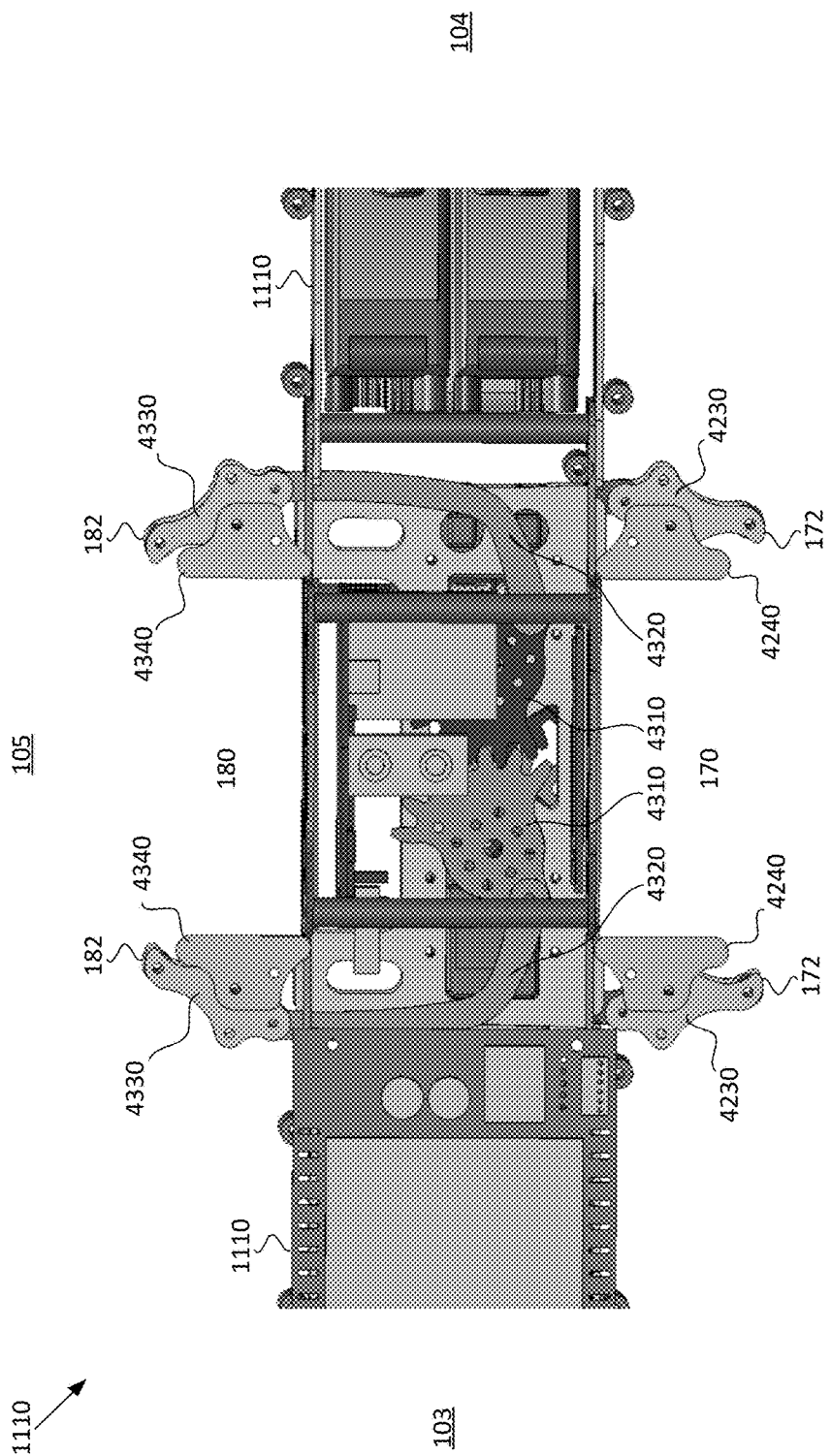
FIG. 43 shows a rear view of an unmanned aerial vehicle according to some embodiments.

FIG. 43 shows a rear view of unmanned aerial vehicle 100 according to some embodiments. FIG. 43 shows a rear portion of center assembly 1110. However, in FIG. 43, a portion of frame 110 of center assembly 1110 has been removed to allow further illustration of features inside center assembly 1110. In particular, rear frame wall 1720 has been removed from FIG. 43.

With reference to FIGS. 1-43, the unmanned aerial vehicle 100 may include gears 4310, levers 4320, and gripper hand pieces 4330. The gears 4310 may be coupled to payload interface motors (not shown) provided in the center assembly 1110. Payload interface motors may be servomotors or other electronically controlled motors controllable by the processor 802 of the unmanned aerial vehicle 100. As the gears 4310 rotate about central pivots, the levers 4320 are caused to move essentially up and down (between the top direction 105 and the bottom direction 106). As the levers 4320 move essentially up and down, the gripper hand pieces 4330 are caused to rotate around a fixed pivot, thereby causing the gripper fingers 182 to move from the displayed position to and from a position with the gripper fingers 182 down and in towards the center of the second payload interface 180.

Tabs 4340 may be configured to interact with a feature of a payload object or payload clip in order to assist the second payload interface 180 in aligning the gripper fingers 182 with the object to be engaged. Further illustration of the tabs 4340 and corresponding payload object features are shown elsewhere in the present description.

Figure 44:
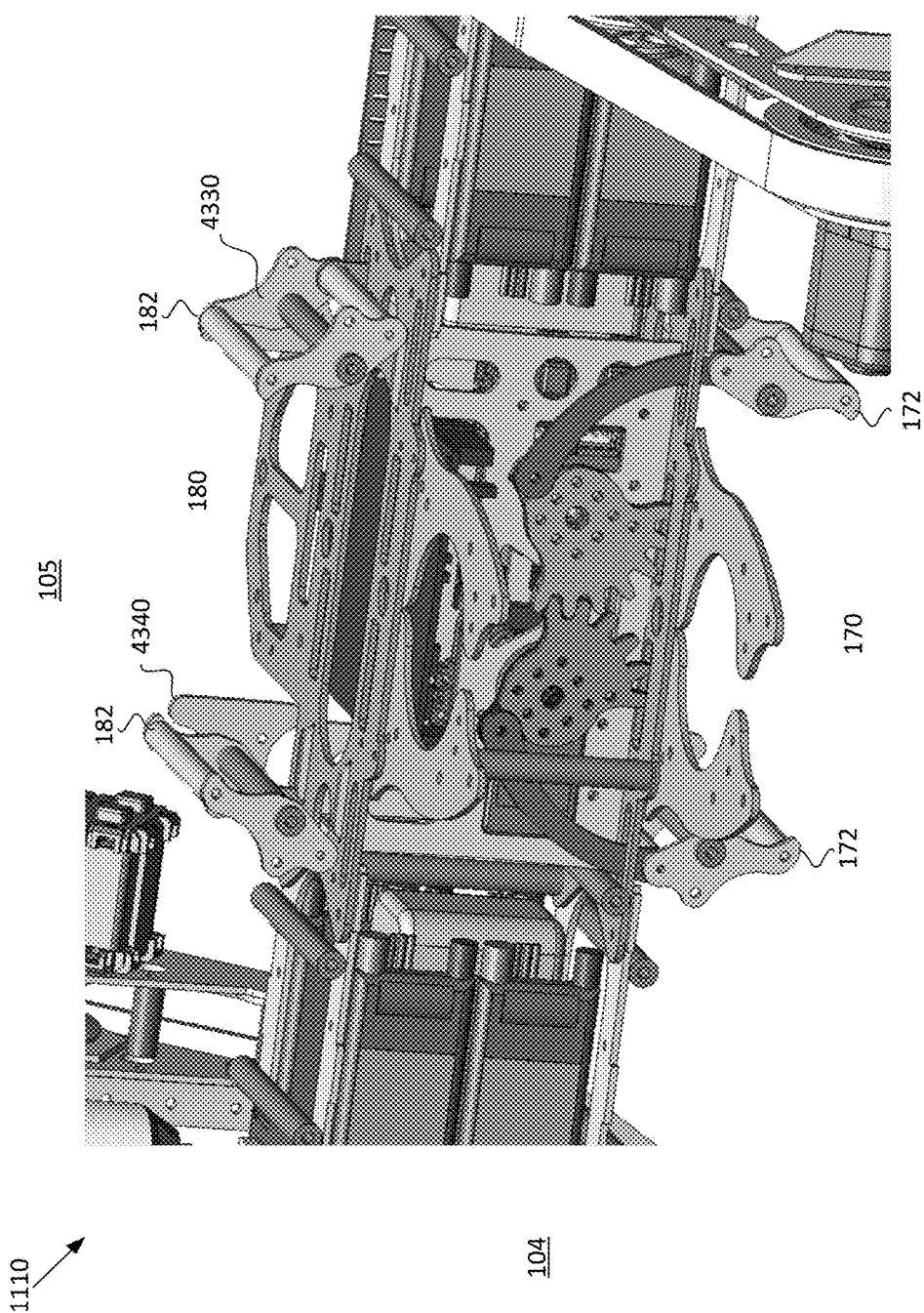
FIG. 44 shows a top perspective view of an unmanned aerial vehicle according to some embodiments.

FIG. 44 shows a top perspective view of the unmanned aerial vehicle 100 according to some embodiments. FIG. 44 shows features similar to those of FIG. 42. However, the perspective view allows clearer illustration of various features of the payload interfaces 170 and 180.

With reference to FIGS. 1-44, the tabs 4340 provided as part of the second payload interface 180 may be provided only on a rear portion of the second payload interface 180. The tabs 4340 may be used by having the unmanned aerial vehicle 100 maneuver under a payload object to be engaged from front to rear. The tabs 4340, being somewhat closer in to the center of the second payload interface 180, may prevent the unmanned aerial vehicle 100 from moving past the payload object by the tabs 4340 contacting and pushing against the rear of the payload object. In this way, the tabs 4340 may allow the unmanned aerial vehicle 100 to align the rear of the second payload interface 180 with the rear of a payload object to be engaged. The tabs 4240 for the first payload interface 170 may be similarly used for payload objects disposed under the first payload interface 170 and the unmanned aerial vehicle 100.

In addition, the gripper fingers 182 may be provided in a long form (as in from front to rear of the center assembly 1110), such as with a spacer element. By providing the gripper fingers 182 in a longer form, the gripper fingers 182 may have a greater likelihood of contacting a feature on a payload object that is designed to be gripped by the gripper fingers 182. In some embodiments, instead of a single long gripper finger 182 on each of left side and right side of the second payload interface 180, numerous individually articulating fingers may be provided in parallel on each of left side and right side of the second payload interface 180. Other configurations of the gripper fingers 182 than that just described are possible in other embodiments.

Figure 45:
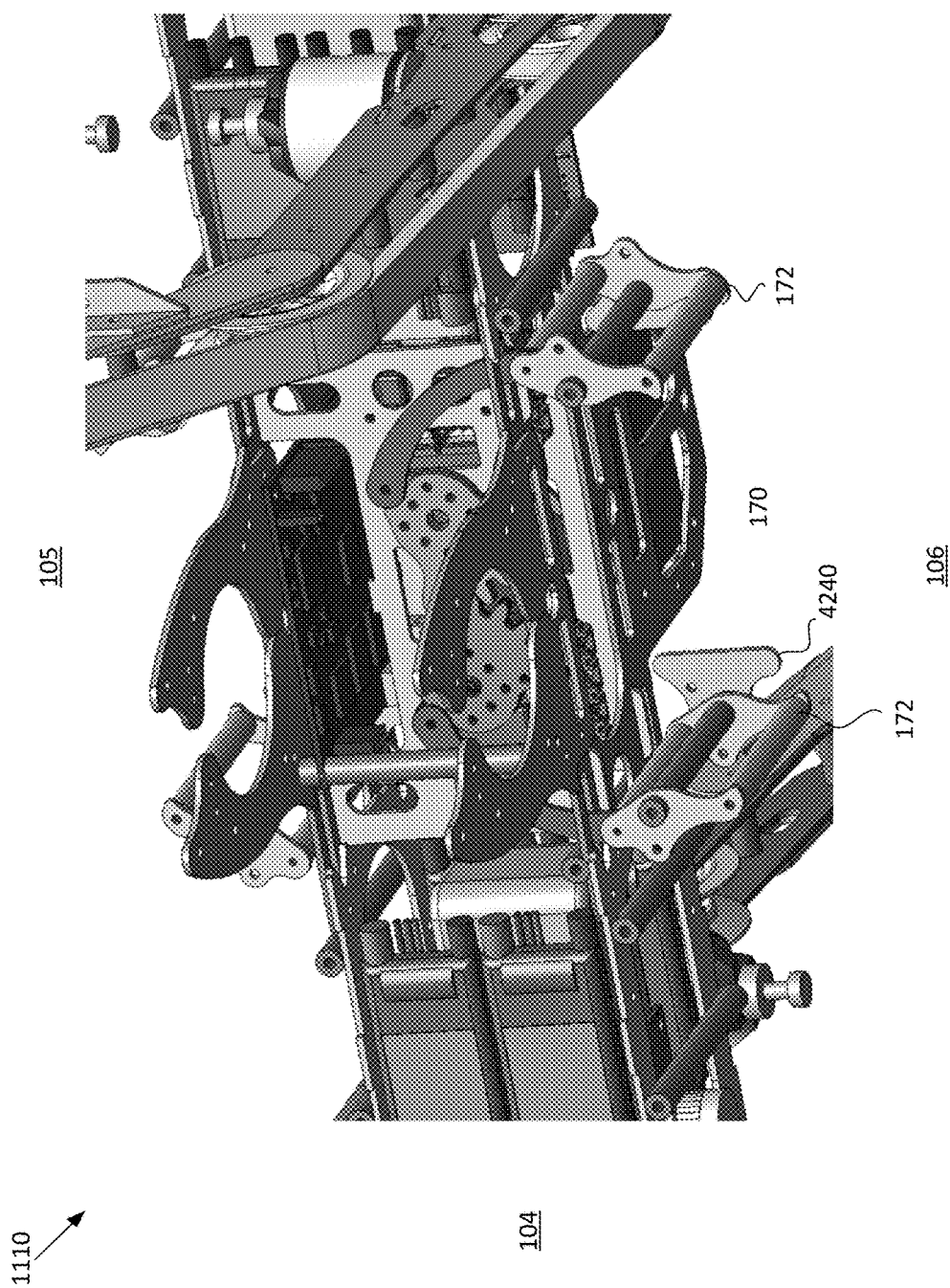
FIG. 45 shows a bottom perspective view of an unmanned aerial vehicle according to some embodiments.

FIG. 45 shows a bottom perspective view of the unmanned aerial vehicle 100 according to some embodiments. FIG. 45 shows features similar to those of FIG. 42. However, the perspective view allows clearer illustration of various features of the payload interfaces 170 and 180.

With reference to FIGS. 1-45, the tabs 4240 provided as part of the first payload interface 170 may be provided only on a rear portion of the first payload interface 170. The provision and use of the tabs 4240 may be substantially the same as with the tabs 4340 (e.g., as described with respect to FIG. 44), but for payload objects disposed under the unmanned aerial vehicle 100.

In addition, in some embodiments, the gripper fingers 172 may be provided in a long form (as in from front to rear of the center assembly 1110). The gripper fingers 172 may be provided and used in substantially the same way as described for the gripper fingers 182 (e.g., with respect to FIG. 44). Other configurations of the gripper fingers 172 than that just described are possible in other embodiments.

Figure 46:
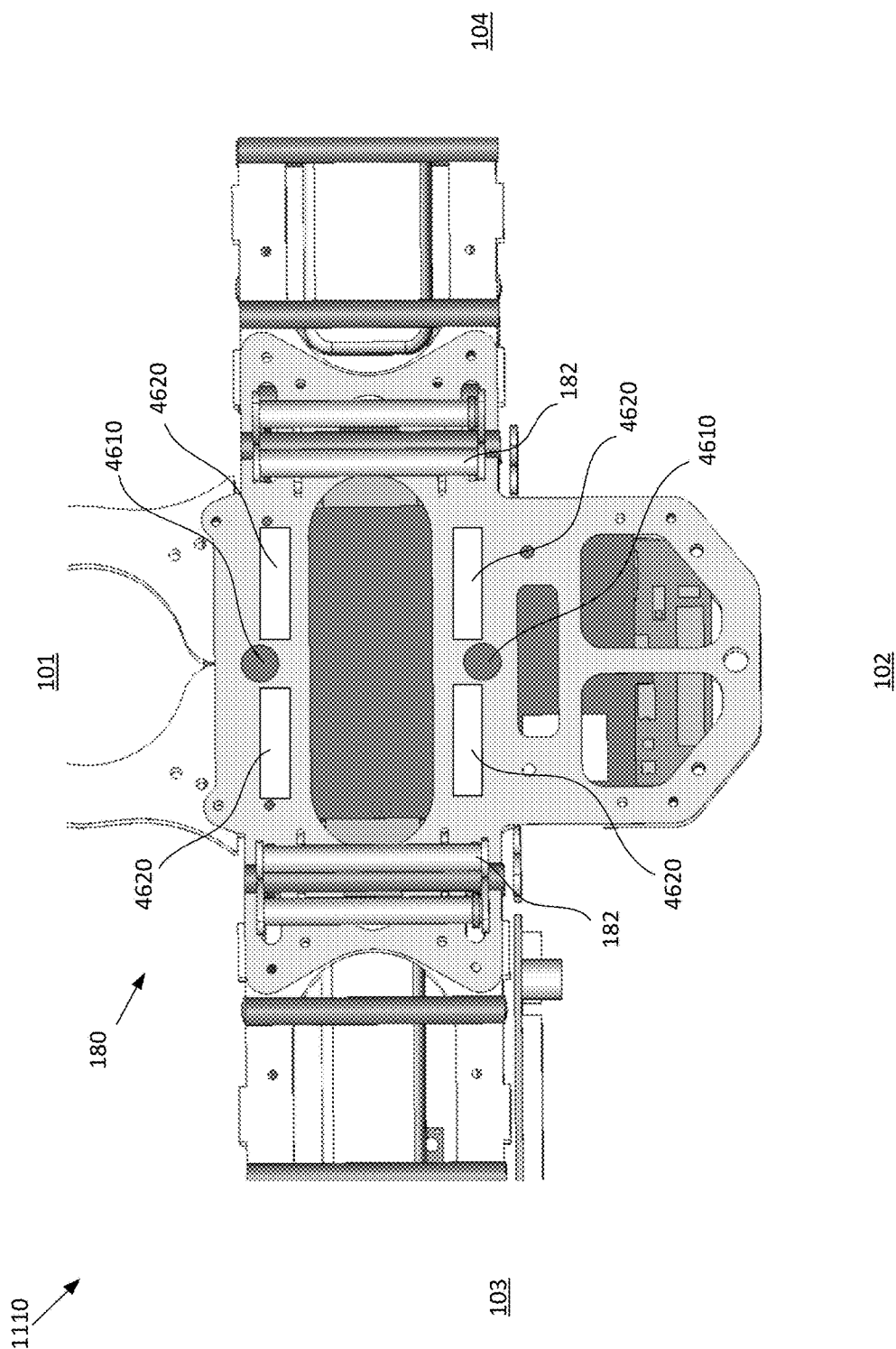
FIG. 46 shows a top view of a center assembly according to some embodiments.

FIG. 46 shows a top view of the center assembly 1110 according to some embodiments. With reference to FIGS. 1-46, in various embodiments, the second payload interface 180 may have a contact surface. The contact surface of the second payload interface 180 may include slots 4610 and electrical contacts 4620.

The slots 4610 may be holes or other depressions in the surface of the second payload interface 180 designed to align with a protrusion on a surface of a payload object. While the tabs 4240 or 4340 and/or imaging sensors may be used to generally align the second payload interface 180 and the gripper fingers 182 to a payload object to be engaged, there may remain some slight error in the alignment. Therefore, the payload object may be provided with protrusions matching the slots 4610 so that as the gripper fingers 182 pull the payload object onto the contact surface of the second payload interface 180, the protrusions of the payload object and the slots 4610 naturally self align.

The electrical contacts 4620 may be electrical connection points on the surface of the second payload interface 180. In particular, the electrical contacts 4620 may be designed to align with corresponding electrical contacts on a surface of a payload object that is engaged by the gripper fingers 182. As the gripper fingers 182 pull the payload object onto the surface of the second payload interface 180, a closed electrical circuit may be formed between electronic components of the payload object and electronics of the unmanned aerial vehicle 100, via the electrical contacts 4620. In this way, data signals and/or electrical power may be transferred between the payload object and the unmanned aerial vehicle 100 via the second payload interface 180.

Figure 47:
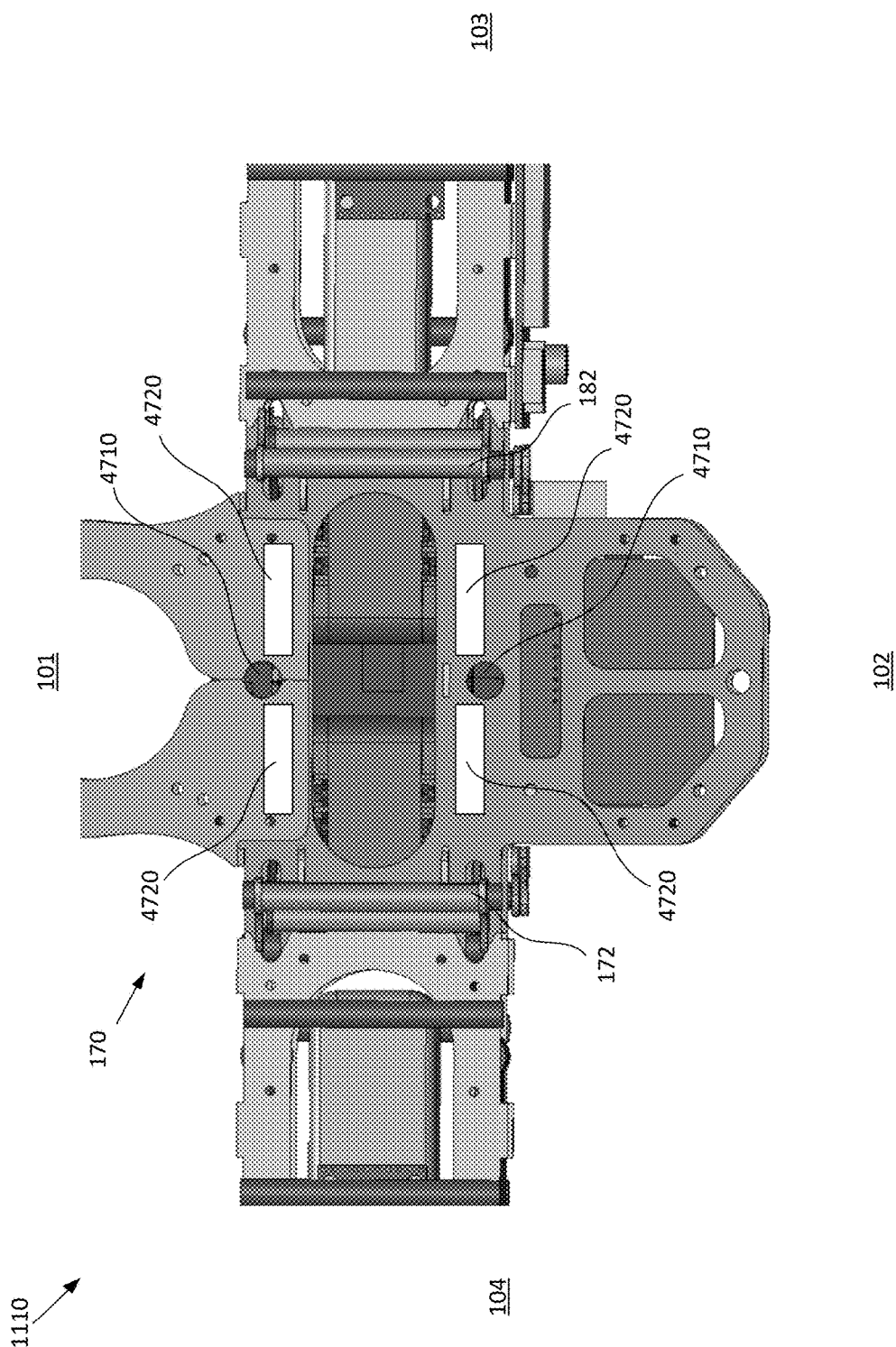
FIG. 47 shows a bottom view of a center assembly according to some embodiments.

FIG. 47 shows a bottom view of the center assembly 1110 according to some embodiments. With reference to FIGS. 1-47, in various embodiments, the first payload interface 170 may have a contact surface. The contact surface of the second payload interface 180 may include slots 4710 and electrical contacts 4720.

The slots 4710 may be holes or other depressions in the surface of the first payload interface 170 designed to align with a protrusion on a surface of a payload object. While the tabs 4240 or 4340 and/or imaging sensors may be used to generally align the first payload interface 170 and the gripper fingers 172 to a payload object to be engaged, there may remain some slight error in the alignment. Therefore, the payload object may be provided with protrusions matching the slots 4710 so that as the gripper fingers 172 pull the payload object onto the contact surface of the first payload interface 170, the protrusions of the payload object and the slots 4710 naturally self align.

The electrical contacts 4720 may be electrical connection points on the surface of the first payload interface 170. In particular, the electrical contacts 4720 may be designed to align with corresponding electrical contacts on a surface of a payload object that is engaged by the gripper fingers 172. As the gripper fingers 172 pull the payload object onto the surface of the first payload interface 170, a closed electrical circuit may be formed between electronic components of the payload object and electronics of the unmanned aerial vehicle 100, via the electrical contacts 4720. In this way, data signals and/or electrical power may be transferred between the payload object and the unmanned aerial vehicle 100 via the first payload interface 170.

Figure 48:
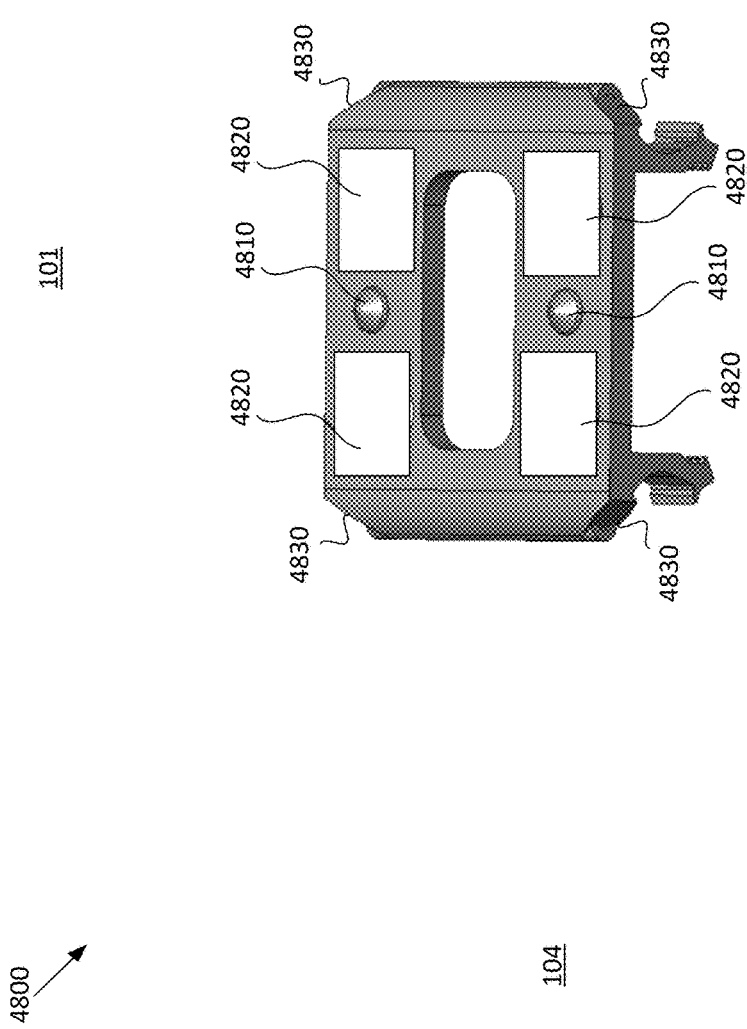
FIG. 48 shows a top view of a payload clip according to some embodiments.

FIG. 48 shows a top view of a payload clip 4800 according to some embodiments. With reference to FIGS. 1-48, the payload clip 4800 may be a payload object designed to be engaged by the first payload interface 170 and/or the second payload interface 180. In some embodiments, the payload clip 4800 may have nubs 4810 and electrical contacts 4820. The nubs 4810 may be substantially conical in shape and designed to fit into the slots 4610 or 4710 of the payload interface 180 or 170, respectively. The electrical contacts 4820 may be designed to align with the electrical contacts 4620 or 4720 of the payload interface 180 or 170, respectively. In this way, the payload clip 4800 may provide a top surface that is designed to be engaged by and align with the payload interface 170 and/or 180 of the unmanned aerial vehicle 100. The payload clip 4800 may have notches 4830. The notches 4830 may be designed to contact the tabs 4240 or 4340 of the payload interface 170 or 180, respectively. Based on the angled nature of the notches 4830, the notches 4830 may be able to gradually contact the tabs 4240 or 4340 to provide the rough alignment function as described.

Figure 49:
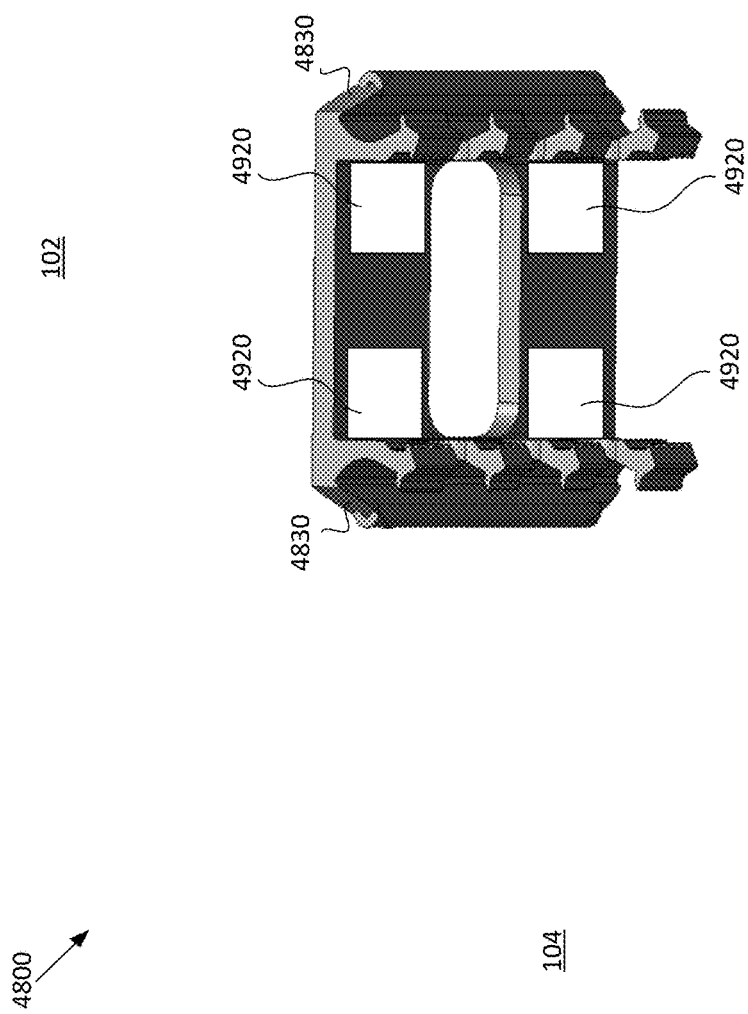
FIG. 49 shows a bottom view of a payload clip according to some embodiments.

FIG. 49 shows a bottom view of the payload clip 4800 according to some embodiments. With reference to FIGS. 1-49, the payload clip 4800 may include electrical contacts 4920. The electrical contacts 4920 may be designed to align with electrical contacts provided on a payload object with which the bottom of the payload clip 4800 engages. In particular, the electrical contacts 4920 may have electrical connections to the corresponding electrical contacts 4820. In this way, the payload clip 4800 may be able to provide an electrical connection between the unmanned aerial vehicle 100 and a cargo object to which the payload clip 4800 is attached, via the electrical contacts 4820 and 4920. In some embodiments, the payload clip 4800 may act as a simple electrical pass-through device in order to pass data signals and/or electrical between the unmanned aerial vehicle 100 (via the payload interface 170 or 180) and a payload object to which the payload clip 4800 is attached.

Figure 50:
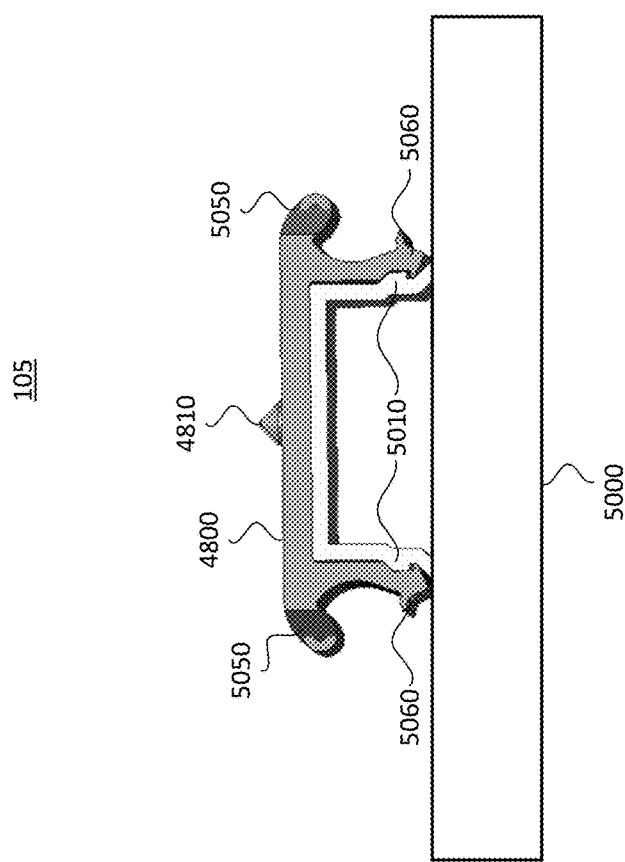
FIG. 50 shows a front view of a payload clip attached to a payload object according to some embodiments.

FIG. 50 shows a front view of the payload clip 4800 attached to a payload object 5000 according to some embodiments.

With reference to FIGS. 1-50, in some embodiments, the payload clip 4800 may include rims 5050 and clip arms 5060. The rims 5050 may be designed to be gripped by the gripper fingers 172 or 182 of the payload interface 170 or 180, respectively. The clip arms 5060 may be designed to wrap around and clip onto a surface of the payload object 5000 in order to attach the payload clip 4800 to the payload object 5000.

In some embodiments, the payload object 5000 may include clip notches 5010. The clip notches 5010 may be designed to engage the clip arms 5060 of the payload clip 4800. In this way, the payload clip 4800 may be attached to the payload object 5000 by the sliding clip arms 5060 over the clip notches 5060. The payload object 5000 may be any object that is to be carried as payload by the unmanned aerial vehicle 100. Through the present description, "payload" and "cargo" and related titled and phrases are used interchangeably.

Figure 51:
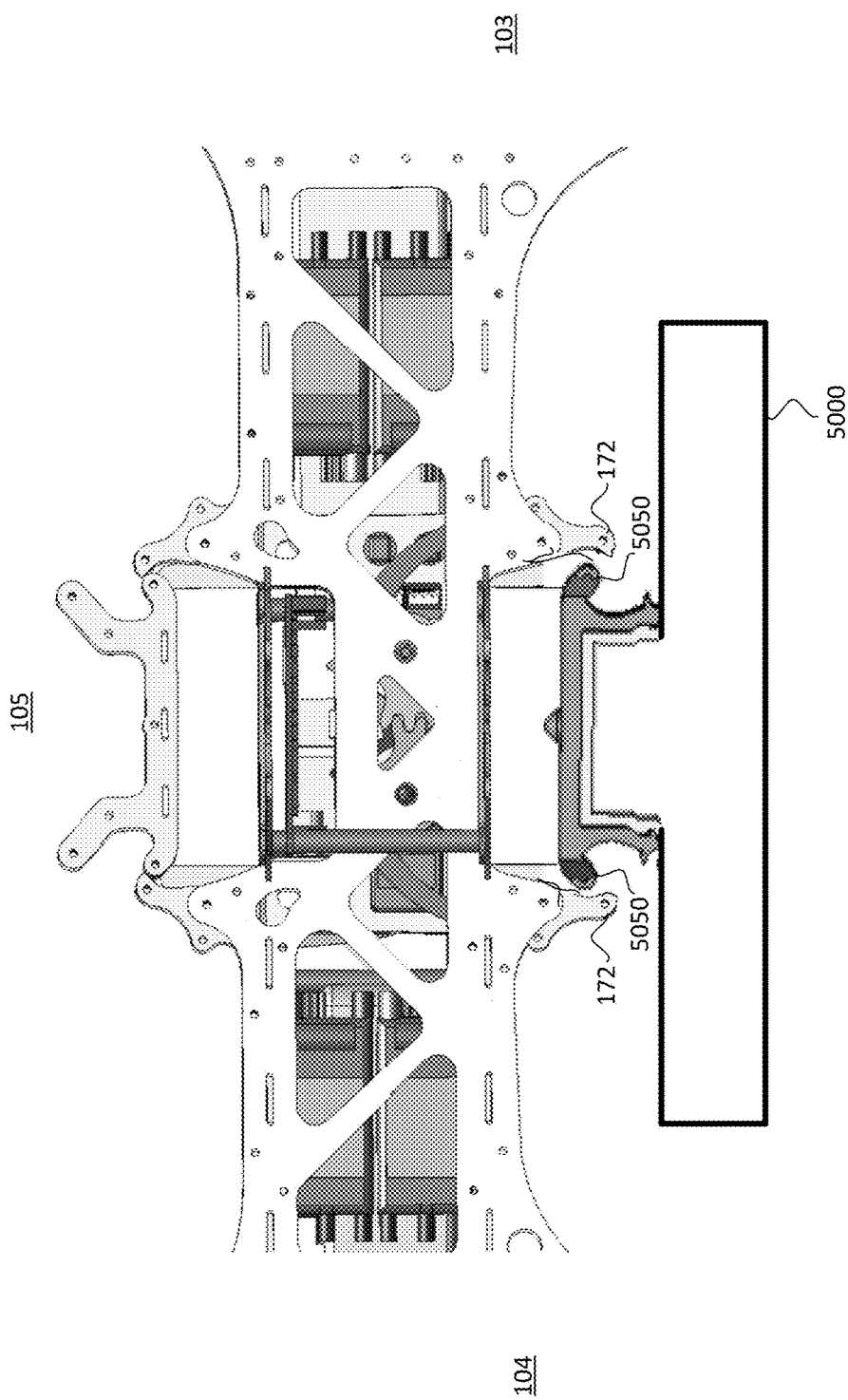
FIG. 51 shows a front view of an unmanned aerial vehicle, a payload clip, and a payload object according to some embodiments.

FIG. 51 shows a front view of the unmanned aerial vehicle 100, the payload clip 4800, and the payload object 5000 according to some embodiments.

With reference to FIGS. 1-51, the payload clip 4800 may be attached to the payload object 5000. Further, the payload clip 4800 may be aligned under the first payload interface 170 of the unmanned aerial vehicle 100. The tabs 4240 may have contacted a rear of the payload clip 4800 at the notches 4830 as the unmanned aerial vehicle 100 moved over the payload clip 4800 from rear to front, thereby causing the first payload interface 170 to be roughly aligned with the payload clip 4800. The gripping fingers 172 may be aligned with the rims 5050. Upon activation of payload interface motors for the first payload interface 170, the gripping fingers 172 may move upwards and inwards so as to grip underneath the rims 5050, thereby pulling the payload clip 4800 (along with the payload object 5000) upwards toward the first payload interface 170 and the unmanned aerial vehicle 100. In this way, the first payload interface 170 may mechanically engage the payload clip 4800 and the payload object 5000. As part of engaging the payload clip 4800, one or more electrical circuits may be created between electronic components of the unmanned aerial vehicle 100 and the payload clip 4800. Such electrical circuits, if formed, may continue to the payload object 5000. For example, if the payload object 5000 is a battery, the payload object 5000 may provide electrical power to the unmanned aerial vehicle 100 after being mechanically engaged by the first payload interface 170. As another example, if the payload object 5000 is a an imaging sensor, the processor 802 of the unmanned aerial vehicle 100 may send control signals to the payload object 5000 in order to control an image sensing function of the payload object 5000. In addition, imaging data generated by the payload object 5000 may be transmitted to the processor 802 for storage in the memory 804 of the unmanned aerial vehicle 100.

Figure 52:
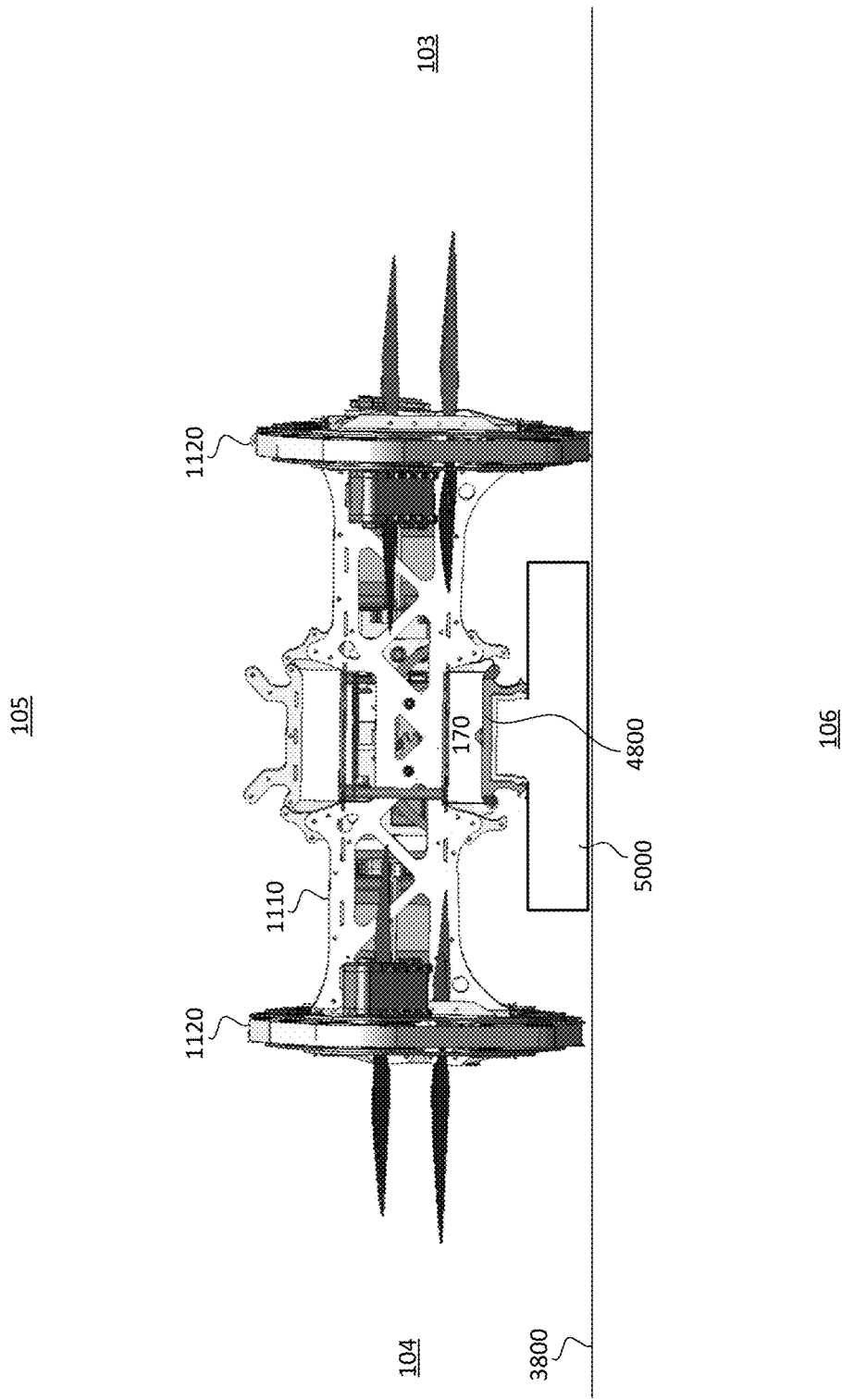
FIG. 52 shows a front view of an unmanned aerial vehicle, a payload clip, and a payload object according to some embodiments.

FIG. 51 shows a front view of the unmanned aerial vehicle 100, the payload clip 4800, and the payload object 5000 according to some embodiments. FIG. 52 shows generally the same features as FIG. 51. However, the features of FIG. 51 are reduced in size in FIG. 52 so that a full view of the unmanned aerial vehicle 100 is possible in FIG. 52. In addition, the bottom plane 3800 (such as a ground surface) is shown. With reference to FIGS. 1-52, the unmanned aerial vehicle 100 may be aligned such that the first payload interface 170 is over top of the payload clip 4800 and the payload object 5000, the latter of which is resting on the bottom plane 3800. In this way, the unmanned aerial vehicle 100 may have used ground propulsion to maneuver on top of the payload clip 4800 and the payload object 5000, at which point the first payload interface 170 may mechanically engage the payload clip 4800 and thereby pick up the payload object 5000 for transport to some other location.

Figure 53:
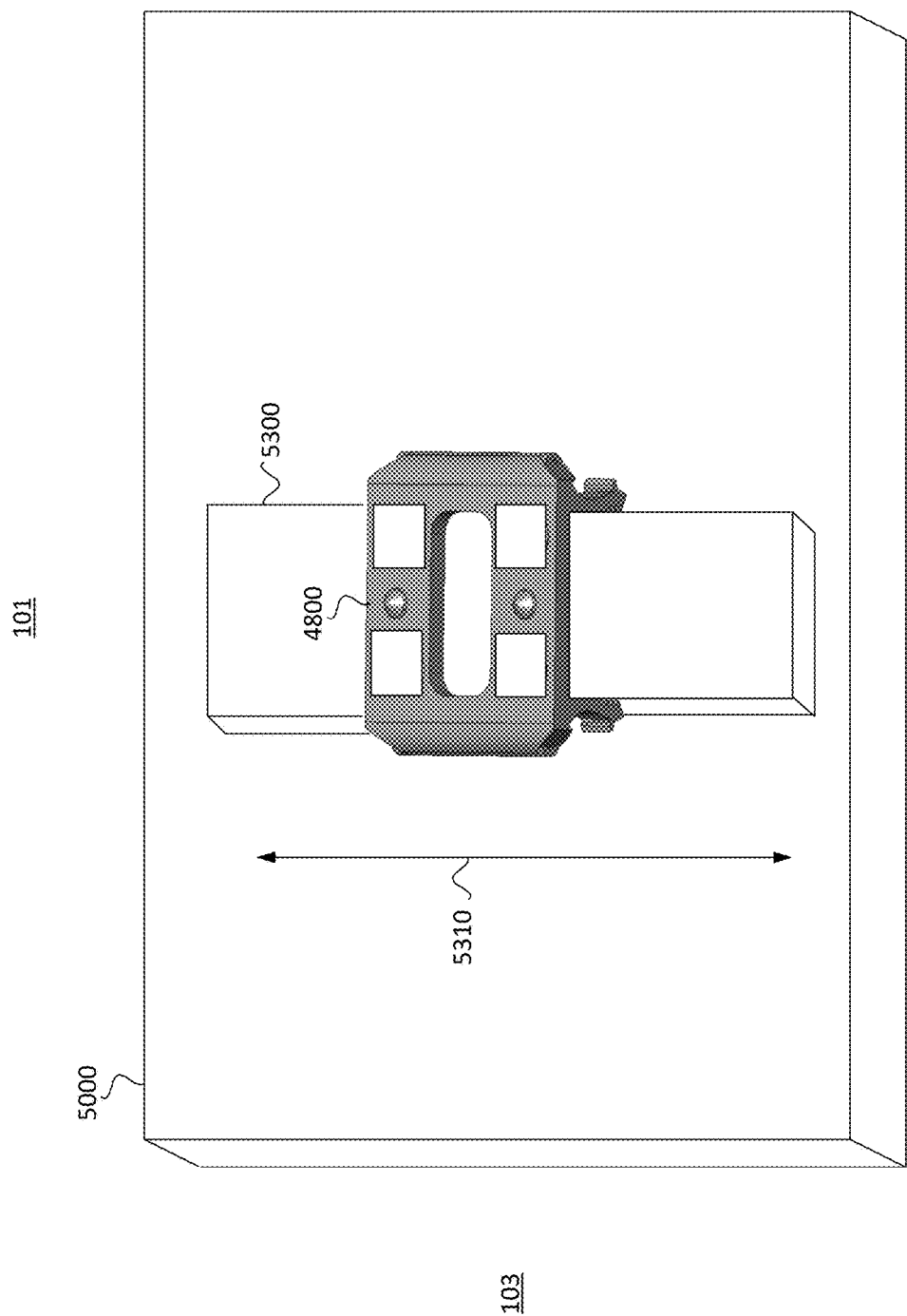
FIG. 53 shows a top perspective view of a payload clip attached to a payload object according to some embodiments.

FIG. 53 shows a top view of the payload clip 4800 attached to the payload object 5000 according to some embodiments.

With reference to FIGS. 1-53, the payload object 5000 may have a mounting point 5300. The mounting point 5300 may be a physical fixture of the payload object 5000 designed for being attached to the payload clip 4800. In this way, the clip notches 5010 (e.g., described with respect to FIG. 50) may be examples of the mounting point 5300. In various embodiments, the payload clip 4800 is capable of being attached anywhere along the mounting point 5300 in a lengthwise direction 5310. Namely, a person or machine attaching the payload clip 4800 to the mounting point 5300 may choose to attach the payload clip 4800 to the mounting point 5300 anywhere from the front most end of the mounting point 5300 to the rear most end of the mounting point 5300. This configuration may be advantageous in allowing the payload clip 4800 to be attached to the payload object 5000 so as to have the weight of the payload object 5000 balanced to the front and rear of the payload clip 4800. Namely, a location along the mounting point 5300 may be chosen for attaching the payload clip 4800 so that an even amount of weight is to the front end of the payload clip 4800 as is to the rear end of the payload clip 4800. This approach may allow better balancing of weight by the unmanned aerial vehicle 100 and thus more efficient aerial and ground movement.

Figure 54:
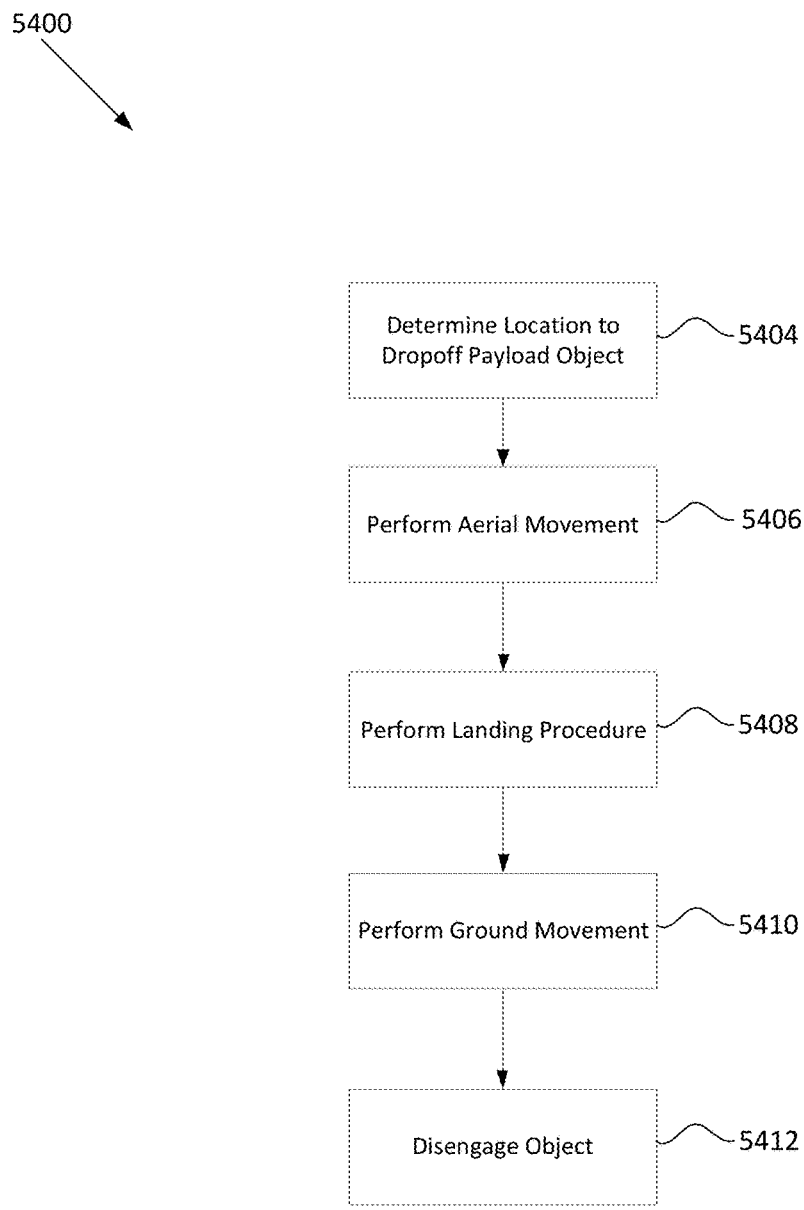
FIG. 54 shows a flow diagram of a process for operating an unmanned aerial vehicle to drop-off a payload according to some embodiments.

FIG. 54 shows a flow diagram of a process 5400 for operating the unmanned aerial vehicle 100 to drop-off the payload object 5000 according to some embodiments. The process 5400 is described with reference to FIGS. 1-54

At block 5404, a determination is made as to a location to drop-off payload object 5000. The block 5404 may involve the unmanned aerial vehicle 100 receiving a signal indicating a geographic location that the payload object 5000, already carried by the unmanned aerial vehicle 100, should be dropped off.

At block 5406, the unmanned aerial vehicle 100 performs aerial movement. The block 5406 may involve the unmanned aerial vehicle 100 moving through the air based on propulsion from the aerial propulsion devices 130 to a location generally close to the determined location to drop-off the payload object 5000.

At block 5408, the unmanned aerial vehicle 100 performs a landing procedure. The block 5408 may involve unmanned aerial vehicle landing on a ground surface. The unmanned aerial vehicle 100 may perform a landing procedure in order to transition from aerial movement to ground movement.

At block 5410, the unmanned aerial vehicle 100 performs ground movement. The block 5410 may involve the unmanned aerial vehicle 100 moving along a ground surface based on propulsion from ground propulsion devices (such as the ground propulsion device 150 with the continuous track 152 and the continuous track motor 154) as described. The block 5410 may be performed in order to allow the unmanned aerial vehicle 100 to arrive at a location more close to the particular determined location for drop-off of the payload object 5000. It may be that the precise location determined to be the location for drop-off of the payload object 5000 is not easily reachable by using only aerial movement.

At block 5412, the unmanned aerial vehicle 100 disengages the payload object 5000. The block 5412 may involve the unmanned aerial vehicle 100 mechanically disengaging the payload object 5000 by releasing the gripper fingers 172 to an open/disengaged position.

Figure 55:
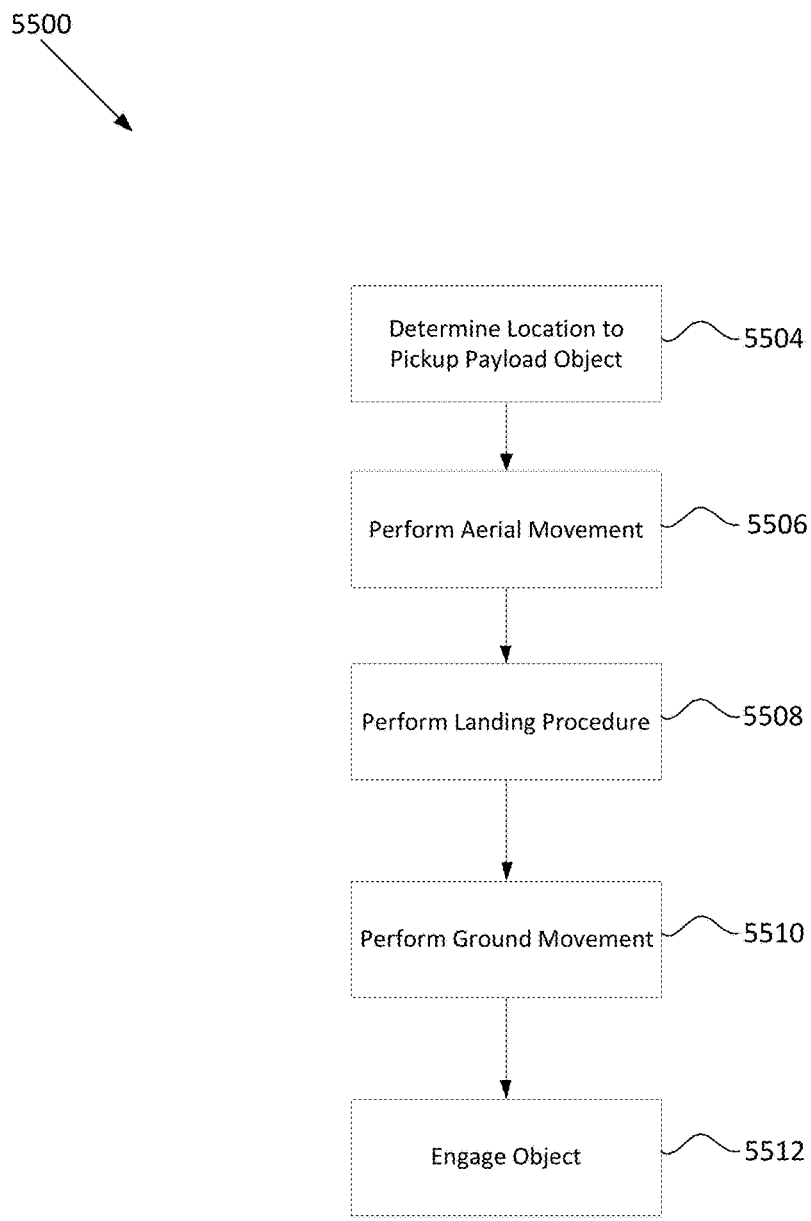
FIG. 55 shows a flow diagram of a process for operating an unmanned aerial vehicle to pick up a payload according to some embodiments.

FIG. 55 shows a flow diagram of a process 5500 for operating the unmanned aerial vehicle 100 to pick up the payload object 5000 according to some embodiments. The process 5500 is described with reference to FIGS. 1-55.

At block 5504, a determination is made as to a location to pick up the payload object 5000. The block 5504 may involve the unmanned aerial vehicle 100 receiving a signal indicating a geographic location where the payload object 5000 is presently located.

At block 5506, the unmanned aerial vehicle 100 performs aerial movement. The block 5506 may involve the unmanned aerial vehicle 100 moving through the air based on propulsion from the aerial propulsion devices 130 to a location generally close to the determined location to pick up the payload object 5000.

At block 5508, the unmanned aerial vehicle 100 performs a landing procedure. The block 5508 may involve unmanned aerial vehicle landing on a ground surface. The unmanned aerial vehicle 100 may perform a landing procedure in order to transition from aerial movement to ground movement.

At block 5510, the unmanned aerial vehicle 100 performs ground movement. The block 5510 may involve the unmanned aerial vehicle 100 moving along a ground surface based on propulsion from ground propulsion devices (such as the ground propulsion device 150 with the continuous track 152 and the continuous track motor 154) as described. The block 5510 may be performed in order to allow the unmanned aerial vehicle 100 to arrive at a precise location determined to be the location for pickup of the payload object 5000. It may be that the precise location determined to be the location for pickup of the payload object 5000 is not easily reachable by using only aerial movement.

At block 5512, the unmanned aerial vehicle 100 engages the payload object 5000. The block 5512 may involve the unmanned aerial vehicle 100 maneuvering over top of the payload object 5000 and mechanically engaging the payload object 5000 by causing the gripper fingers 172 to move to a closed/engaged position.

Figure 56:
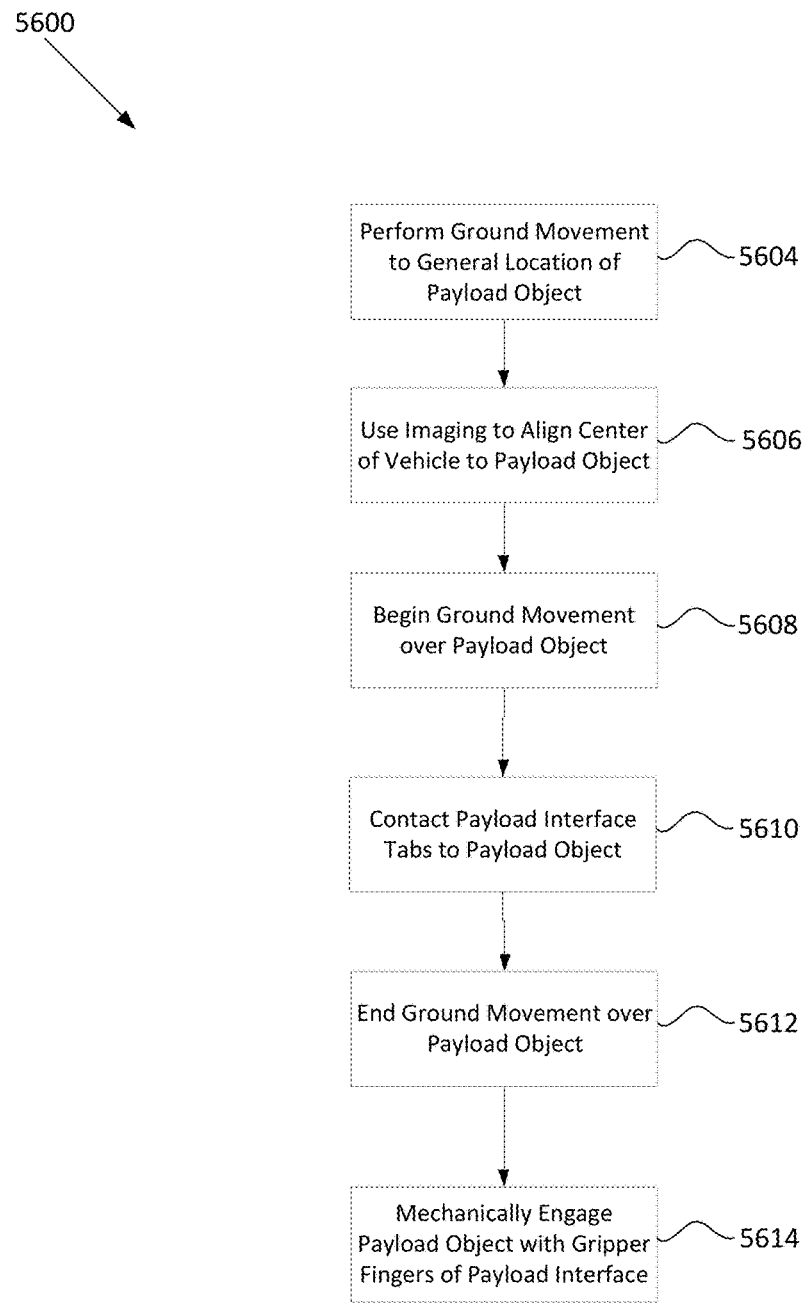
FIG. 56 shows a flow diagram of a process for operating an unmanned aerial vehicle to engage a payload according to some embodiments.

FIG. 56 shows a flow diagram of a process 5600 for operating the unmanned aerial vehicle 100 to engage the payload object 5000 according to some embodiments. The process 5600 is described with reference to FIGS. 1-56.

At block 5604, the unmanned aerial vehicle 100 performs ground movement to a general location of the payload object 5000. Prior to the block 5604, the unmanned aerial vehicle 100 may have already performed aerial movement. The block 5604 may involve the unmanned aerial vehicle 100 performing ground movement to a location near a location indicated as a place to pick up the payload object 5000. The block 5604 may terminate when an imaging sensor (or other sensor) provided on the unmanned aerial vehicle 100 detects the presence of the payload object 5000.

At block 5606, the unmanned aerial vehicle 100 uses an imaging sensor to align the unmanned aerial vehicle 100 centrally to the payload object 5000. The block 5606 may involve the unmanned aerial vehicle 100 using the image sensor to determine an orientation of the payload object 5000. The block 5606 may involve the unmanned aerial vehicle 100 using the imaging sensor to roughly align the unmanned aerial vehicle 100 with one side assembly 1120 to the left of the payload object 5000 and one side assembly 1120 to the right of the payload object 5000.

At block 5608, the unmanned aerial vehicle 100 begins ground movement over the payload object 5000. The block 5608 may involve the unmanned aerial vehicle 100 moving over the payload object 5000 based on the rough alignment performed as part of the block 5606.

At block 5610, the tabs 4240 of the first payload interface 170 contact the payload object 5000. The block 5610 may involve the unmanned aerial vehicle 100 moving over the payload object 5000 until the tabs 4240 at a rear of the first payload interface 170 contact a rear of the payload object 5000. The block 5610 may involve detecting that the tabs 4240 contact the payload object 5000, such as by detecting a greater resistance to movement of the unmanned aerial vehicle 100, detecting contact using the imaging sensor, or detecting contact using an force sensor attached to the tabs 4240.

At block 5612, the unmanned aerial vehicle 100 begins ground movement over the payload object 5000. The block 5612 may be performed based on the unmanned aerial vehicle 100 being generally aligned over the payload object 5000 as determined by the contact of the block 5610.

At block 5514, the unmanned aerial vehicle 100 engages the payload object 5000. The block 5514 may involve the unmanned aerial vehicle 100 mechanically engaging the payload object 5000 by causing the gripper fingers 172 to move to a closed/engaged position, thereby gripping a rim or other surface on the payload object 5000.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The invention claimed:

1. An unmanned aerial vehicle comprising:
    a frame portion comprising a first assembly, a second assembly, and a third assembly;
    two or more air propulsion devices arranged on the first assembly, the air propulsion devices configured to propel the frame portion through the air; and
    one or more ground propulsion devices configured to propel the frame portion along the ground;
    wherein:
        the third assembly is disposed between the first assembly and the second assembly;
        the third assembly is coupled to the first assembly at a location of the first assembly between two of the air propulsion devices on the first assembly;
        the first assembly comprises a generally rigid frame section that supports the two or more air propulsion devices at a fixed spacing relative to each other;
        the first assembly has at least one annular shape; and
        the two or more air propulsion devices are disposed in at least one opening in the at least one annular shape of the first assembly.

2. The unmanned aerial vehicle of claim 1,
    wherein the third assembly is substantially perpendicular to the first assembly and the second assembly; and
    wherein the first assembly and the second assembly are substantially parallel to one another.

3. The unmanned aerial vehicle of claim 2,
    wherein the third assembly has a longitudinal dimension; and
    wherein the longitudinal dimension of the third assembly is perpendicular to a first axis on which the air propulsion devices of the first assembly are supported.

4. The unmanned aerial vehicle of claim 2,
    wherein the third assembly has a longitudinal dimension; and
    wherein the longitudinal dimension of the third assembly is perpendicular to a second axis on which the air propulsion devices of the second assembly are supported.

5. The unmanned aerial vehicle of claim 1,
    wherein at least one of the one or more ground propulsion devices is coupled to the first assembly; and
    wherein at least one of the one or more ground propulsion devices is coupled to the second assembly.

6. The unmanned aerial vehicle of claim 5, further comprising:
    two or more further air propulsion devices arranged on the second assembly; and
    the third assembly is coupled to the second assembly at a location between two of the further air propulsion devices.

7. The unmanned aerial vehicle of claim 6,
    wherein a first air propulsion device of the two or more air propulsion devices is provided on a first end of the at least one annular shape of the first assembly in a front direction;
    wherein a second air propulsion device of the two or more air propulsion devices is provided on a second end of the at least one annular shape of the first assembly in a rear direction;
    wherein a third air propulsion device of the two or more air propulsion devices is provided on a first end of the at least one annular shape of the second assembly in a front direction; and wherein a fourth air propulsion device of the two or more air propulsion devices is provided on a second end of the at least one annular shape of the second assembly in a rear direction.

8. The unmanned aerial vehicle of claim 5,
wherein the second assembly has at least one annular shape and wherein the two or more further air propulsion devices are disposed in at least one opening in the at least one annular shape of the second assembly.

9. The unmanned aerial vehicle of claim 8,
wherein the at least one of the one or more ground propulsion devices coupled to the first assembly comprises a continuous track disposed around the at least one annular shape of the first assembly; and
wherein the at least one of the one or more ground propulsion devices coupled to the second assembly comprises a continuous track disposed around the at least one annular shape of the second assembly.

10. The unmanned aerial vehicle of claim 9,
wherein the first assembly is formed in at least a second annular shape on at least the first plane; and
wherein the second assembly is formed in at least a second annular shape on at least the second plane.

11. The unmanned aerial vehicle of claim 9, wherein the continuous track of the first assembly is around the two or more air propulsion devices of the first assembly; and
the continuous track of the second assembly is around the two or more air propulsion devices of the second assembly.

12. The unmanned aerial vehicle of claim 8,
wherein the at least one annular shape of the first assembly and the at least one annular shape of the second assembly are configured to receive a battery inserted through an opening of the respective annular shape of the first assembly and the annular shape of the second assembly.

13. The unmanned aerial vehicle of claim 5,
wherein the at least one of the one or more ground propulsion devices coupled to the first assembly comprises a continuous track disposed around the first assembly; and
wherein the at least one of the one or more ground propulsion devices coupled to the second assembly comprises a continuous track disposed around the second assembly.

14. The unmanned aerial vehicle of claim 1,
wherein the first assembly is attachable to and detachable from the third assembly; and
wherein the second assembly is attachable to and detachable from the third assembly.

15. The unmanned aerial vehicle of claim 1,
wherein the first assembly is formed as a double wall structure;
wherein the second assembly is formed as a double wall structure;
wherein the first assembly supports wheels of at least one of the one or more ground propulsion devices between two walls of the double wall structure of the first assembly; and
wherein the second assembly supports wheels of at least one of the one or more ground propulsion devices between two walls of the double wall structure of the second assembly.

16. The unmanned aerial vehicle of claim 1,
wherein component pieces of the frame assembly are from a single sheet of a rigid source material; and
wherein the rigid source material is printed circuit board.

17. The unmanned aerial vehicle of claim 16,
wherein one or more of the component pieces of the frame assembly include conductive tracks printed on the pieces; and
wherein the conductive tracks provide an electrical connection between at least one of the air propulsion devices and a controller provided as part of the unmanned aerial vehicle.

18. The unmanned aerial vehicle of claim 1, wherein the third assembly is coupled to the second assembly at a location of the second assembly between two additional air propulsion devices on the second assembly.

19. The unmanned aerial vehicle of claim 1, wherein:
each of the one or more ground propulsion devices comprises a continuous track configured to move along an annular path having at least one axis;
the third assembly has a first dimension and a second dimension, the first dimension of the third assembly being greater than the second dimension of the third assembly; and
the first dimension of the third assembly is transverse to the at least one axis of the annular path.

20. The unmanned aerial vehicle of claim 1, wherein:
each of the one or more ground propulsion devices is configured to propel the frame portion in at least one first direction along the ground;
the first assembly has a lengthwise dimension extending along the first direction; and
the two or more air propulsion devices are spaced apart along the first direction, and the third assembly being coupled to the first assembly at the location along the first direction, between the spaced apart air propulsion devices.

21. The unmanned aerial vehicle of claim 1, wherein the first assembly comprises a generally rigid frame section that supports the two or more air propulsion devices at a fixed spacing relative to each other, the second assembly comprises a generally rigid frame section that supports two or more air propulsion devices at a fixed spacing relative to each other, and the third assembly is connected to each of the first and second assemblies at a location within a space between the two or more air propulsion devices on each of the first and second assemblies.

22. A method of manufacturing an unmanned aerial vehicle comprising:
providing a frame portion that comprises a first assembly, a second assembly, and a third assembly;
providing two or more air propulsion devices arranged on the first assembly configured to propel the frame portion through the air; and
providing one or more ground propulsion devices, the one or more ground propulsion devices configured to propel the frame portion along the ground;
wherein:
the third assembly is disposed between and coupled to the first assembly and the second assembly;
the third assembly is coupled to the first assembly at a location of the first assembly between two of the air propulsion devices on the first assembly;
the first assembly comprises a generally rigid frame section that supports the two or more air propulsion devices at a fixed spacing relative to each other;
the first assembly has at least one annular shape; and
the two or more air propulsion devices are disposed in at least one opening in the at least one annular shape of the first assembly.

23. The method of manufacturing an unmanned aerial vehicle of claim 22,
wherein at least one of the one or more ground propulsion devices is coupled to the first assembly;
wherein at least one of the one or more ground propulsion devices is coupled to the second assembly;
wherein the first assembly is formed in at least one annular shape on at least a first plane; and
wherein the second assembly is formed in at least one annular shape on at least a first plane.

24. The method of manufacturing an unmanned aerial vehicle of claim 23,
wherein the two or more air propulsion devices are disposed in an opening of the at least one annular shape of the first assembly.

25. The method of manufacturing an unmanned aerial vehicle of claim 22,
wherein the at least one of the one or more ground propulsion devices coupled to the first assembly comprises a continuous track disposed around the first assembly.

26. An unmanned aerial vehicle comprising:
frame means comprising a first assembly, a second assembly, and a third assembly;
air propulsion means comprising two or more air propulsion devices arranged on the first assembly, the air propulsion devices configured to propel the frame means through the air; and
ground propulsion means for propelling the frame means along the ground;
wherein:
the third assembly is disposed between the first assembly and the second assembly;
the third assembly is coupled to the first assembly at a location of the first assembly between two of the air propulsion means on the first assembly;
the first assembly comprises a generally rigid frame section that supports the two or more air propulsion devices at a fixed spacing relative to each other
the first assembly has at least one annular shape; and
the two or more air propulsion devices are disposed in at least one opening in the at least one annular shape of the first assembly.

27. An unmanned aerial vehicle comprising:
a frame portion comprising a first assembly, a second assembly, and a third assembly;
two or more air propulsion devices arranged on the first assembly, the air propulsion devices configured to propel the frame portion through the air; and
one or more ground propulsion devices configured to propel the frame portion along the ground;
wherein:
the third assembly is disposed between the first assembly and the second assembly;
the third assembly is coupled to the first assembly at a location of the first assembly between two of the air propulsion devices on the first assembly
a first propeller of a first air propulsion device of the two or more air propulsion devices on the first assembly defines a first circular area of rotation;
a second propeller of a second air propulsion device of the two or more air propulsion devices on the first assembly defines a second circular area of rotation;
the location at which the third assembly is coupled to the first assembly is between and outside of the first circular area of rotation and the second circular area of rotation
the first assembly has at least one annular shape; and
at least one of the first circular area of rotation or the second circular area of rotation is disposed in at least one opening in the at least one annular shape of the first assembly.

28. An unmanned aerial vehicle comprising:
a frame portion comprising a first assembly, a second assembly, and a third assembly;
two or more air propulsion devices arranged on the first assembly, the air propulsion devices configured to propel the frame portion through the air; and
one or more ground propulsion devices configured to propel the frame portion along the ground;
wherein:
the third assembly is disposed between the first assembly and the second assembly;
the third assembly is coupled to the first assembly at a location of the first assembly between two of the air propulsion devices on the first assembly
a first air propulsion device of the two or more air propulsion devices on the first assembly comprises a first propeller guard;
a second air propulsion device of the two or more air propulsion devices on the first assembly comprises a second propeller guard; and
the location at which the third assembly is coupled to the first assembly is between the first propeller guard and the second propeller guard
the first assembly has at least one annular shape; and
at least one of the first propeller guard or the second propeller guard is disposed in at least one opening in the at least one annular shape of the first assembly.

29. The unmanned aerial vehicle of claim 28, wherein the third assembly contacts one or more of the first propeller guard and the second propeller guard.

* * * * *